United States Patent
Perez Lafuente

(10) Patent No.: US 12,400,209 B2
(45) Date of Patent: Aug. 26, 2025

(54) DYNAMIC MULTILAYER SECURITY FOR INTERNET MOBILE-RELATED TRANSACTIONS

(71) Applicant: AFIRMA CONSULTING & TECHNOLOGIES, S.L., Madrid (ES)

(72) Inventor: Carlos A. Perez Lafuente, Madrid (ES)

(73) Assignee: Afirma Consulting & Technologies, S. L., Madrid (ES)

( * ) Notice: Subject to any disclaimer, the term of this patent is extended or adjusted under 35 U.S.C. 154(b) by 0 days.

(21) Appl. No.: 14/947,366

(22) Filed: Nov. 20, 2015

(65) Prior Publication Data

US 2017/0148009 A1    May 25, 2017

(51) Int. Cl.
*G06Q 20/32* (2012.01)
*G06Q 20/38* (2012.01)
(Continued)

(52) U.S. Cl.
CPC ..... *G06Q 20/3223* (2013.01); *G06Q 20/3821* (2013.01); *G06Q 20/4012* (2013.01);
(Continued)

(58) Field of Classification Search
CPC .................................................. G06Q 20/401
(Continued)

(56) References Cited

U.S. PATENT DOCUMENTS 7,813,822 B1 * 10/2010 Hoffberg ................ H04N 7/163
    381/73.1
8,553,883 B2 * 10/2013 Salmela .............. H04W 12/068
    380/247
(Continued)

FOREIGN PATENT DOCUMENTS

| WO | WO-2012100677 A1 * | 8/2012 | ............. G06F 21/31 |
| WO | WO-2013096949 A1 * | 6/2013 | ............. G06F 21/31 |
| WO | WO-2014117833 A1 * | 8/2014 | ............. G06F 21/34 |

OTHER PUBLICATIONS

* European Central Bank. "Assessment Guide for the Security of Internet Payments." (Feb. 2014). Retrieved online May 6, 2025. https://www.ecb.europa.eu/pub/pdf/other/assessmentguidesecurityinternetpayments201402en.pdf (Year: 2014).*

(Continued)

*Primary Examiner* — James A Reagan
(74) *Attorney, Agent, or Firm* — CRGO Global; Steven M. Greenberg

(57) ABSTRACT

Methods and apparatus to authenticate internet transactions upon a set of authentications of user's mobile device generated dynamic credentials. A mobile device generates dynamic authentication credentials and a transaction terminal transmits at least part of them. One or more providers of authentication services receives from the transaction terminal a first dynamic authentication credential generated by the mobile device using a user's PIN, one or more additional dynamic authentication credentials, calculated by the mobile device upon a different input data, and at least one identifier, and authenticates the first dynamic authentication credential and further authenticates, based on authentication rules and associated authentication parameters, one or more of the one or more additional dynamic authentication credentials, sending the result of the authentication, and the internet transaction being authorized or denied based upon that authentication result, where the transaction being authorized always requires a successful result of the authentication of the first dynamic authentication credential.

24 Claims, 8 Drawing Sheets

(51) Int. Cl.
*G06Q 20/40* (2012.01)
*H04L 9/40* (2022.01)
*H04W 12/06* (2021.01)

(52) U.S. Cl.
CPC ...... *H04L 63/0846* (2013.01); *H04L 63/0861* (2013.01); *H04L 63/12* (2013.01); *H04L 63/20* (2013.01); *H04W 12/068* (2021.01); *H04L 2463/082* (2013.01)

(58) Field of Classification Search
USPC .................................................. 705/64, 75
See application file for complete search history.

(56) References Cited

U.S. PATENT DOCUMENTS

| | | | | |
|---|---|---|---|---|
| 8,839,367 | B2* | 9/2014 | Rathbun | G06Q 20/3276 726/3 |
| 8,864,022 | B2* | 10/2014 | Hernandez | G06Q 20/3223 235/375 |
| 9,112,702 | B2* | 8/2015 | Steeves | H04L 9/3234 |
| 9,246,904 | B2* | 1/2016 | Rajagopal | H04L 63/08 |
| 9,253,639 | B1 | 2/2016 | Lafuente | |
| 9,380,026 | B2* | 6/2016 | Baca | H04L 63/0861 |
| 9,438,575 | B2* | 9/2016 | Shi | H04L 63/18 |
| 9,438,597 | B1* | 9/2016 | Taylor | H04L 63/0853 |
| 9,635,018 | B2* | 4/2017 | Guo | H04L 9/3226 |
| 9,646,303 | B2* | 5/2017 | Karpenko | G06Q 20/3829 |
| 9,710,634 | B2* | 7/2017 | Fort | H04L 63/0838 |
| 9,794,287 | B1* | 10/2017 | Koster | G06F 21/552 |
| 9,990,486 | B2* | 6/2018 | Taniguchi | G06K 19/06 |
| 10,574,662 | B2* | 2/2020 | Wolf | H04L 63/08 |
| 10,706,380 | B2* | 7/2020 | Sheets | G06Q 10/08 |
| 10,762,505 | B1* | 9/2020 | Morris | G06Q 20/401 |
| 11,032,309 | B2* | 6/2021 | Petry | H04L 63/1408 |
| 11,100,572 | B1* | 8/2021 | Hecht | H04W 12/06 |
| 11,356,411 | B2* | 6/2022 | Petry | H04L 63/083 |
| 2003/0105964 | A1* | 6/2003 | Brainard | G06Q 20/385 713/178 |
| 2005/0080731 | A1* | 4/2005 | Dnyaneshwar | G06Q 20/108 705/42 |
| 2005/0097046 | A1* | 5/2005 | Singfield | G06Q 20/1085 705/42 |
| 2006/0005008 | A1* | 1/2006 | Kao | H04L 63/166 713/153 |
| 2006/0104441 | A1* | 5/2006 | Johansson | G06F 21/31 380/44 |
| 2008/0109884 | A1* | 5/2008 | Kulkarni | G06F 21/31 726/5 |
| 2009/0259588 | A1* | 10/2009 | Lindsay | G06F 21/31 705/40 |
| 2009/0282258 | A1* | 11/2009 | Burke | G06F 21/6281 713/184 |
| 2010/0088227 | A1 | 4/2010 | Belamant | |
| 2011/0238573 | A1* | 9/2011 | Varadarajan | G06Q 20/3263 705/43 |
| 2012/0069131 | A1* | 3/2012 | Abelow | G06Q 30/02 345/589 |
| 2012/0144203 | A1* | 6/2012 | Albisu | G06F 21/35 713/184 |
| 2012/0292388 | A1* | 11/2012 | Hernandez | G06Q 20/3223 235/379 |
| 2014/0040147 | A1* | 2/2014 | Varadarajan | G06Q 20/4016 713/168 |
| 2014/0129445 | A1* | 5/2014 | Yang | G06Q 20/4012 705/44 |
| 2014/0282985 | A1* | 9/2014 | Joseph | G06F 21/42 726/9 |
| 2015/0058923 | A1* | 2/2015 | Rajagopal | H04L 63/1433 726/1 |
| 2015/0264574 | A1* | 9/2015 | Dong | H04W 12/06 455/411 |
| 2015/0324736 | A1* | 11/2015 | Sheets | G06Q 10/08 705/330 |
| 2016/0050203 | A1* | 2/2016 | Hefetz | H04L 51/18 726/7 |
| 2016/0086108 | A1* | 3/2016 | Abelow | G06Q 30/02 705/7.29 |
| 2016/0241544 | A1* | 8/2016 | Guo | G06F 21/85 |
| 2016/0277380 | A1* | 9/2016 | Wagner | H04W 12/069 |

OTHER PUBLICATIONS

• Cisco Systems, Inc. "Authentication Authorization and Accounting Configuration Guide Cisco IOS XE Release 3S." (2015). Retrieved online May 6, 2025. https://www.cisco.com/c/en/us/td/docs/ios-xml/ios/sec_usr_aaa/configuration/xe-3s/sec-usr-aaa-xe-3s-book.pdf (Year: 2015).*

• PCi. "Information Supplement: PCI DSS E-commerce Guidelines." (2013). Retrieved online May 6, 2025. https://www.pcisecuritystandards.org/pdfs/PCI_DSS_v2_eCommerce_Guidelines.pdf (Year: 2013).*

* cited by examiner

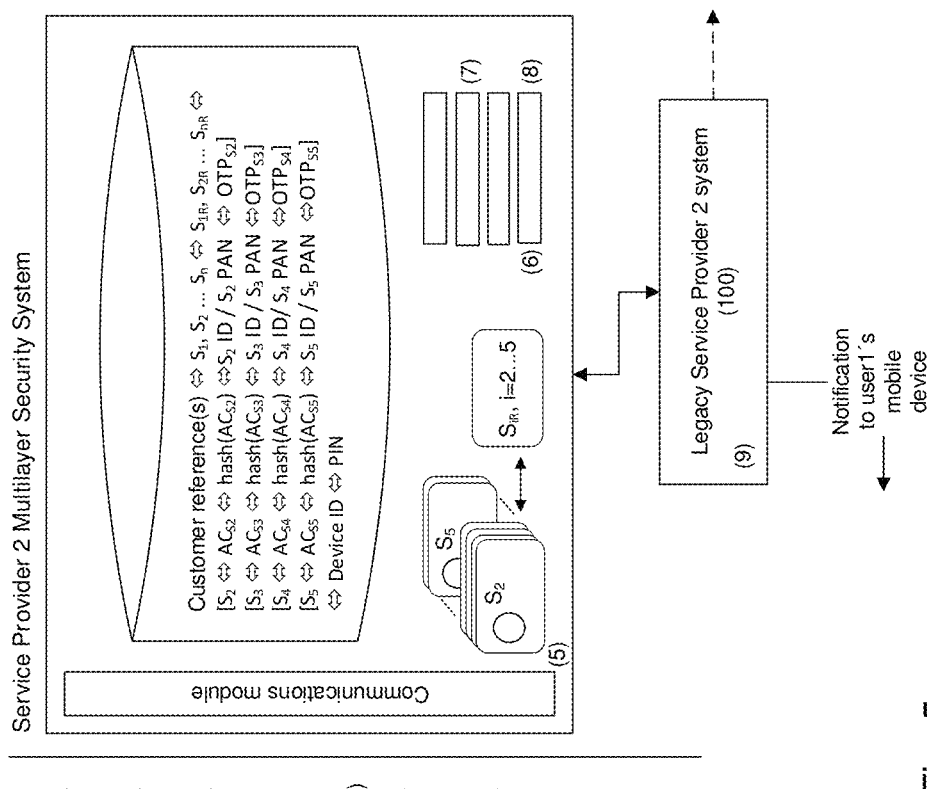
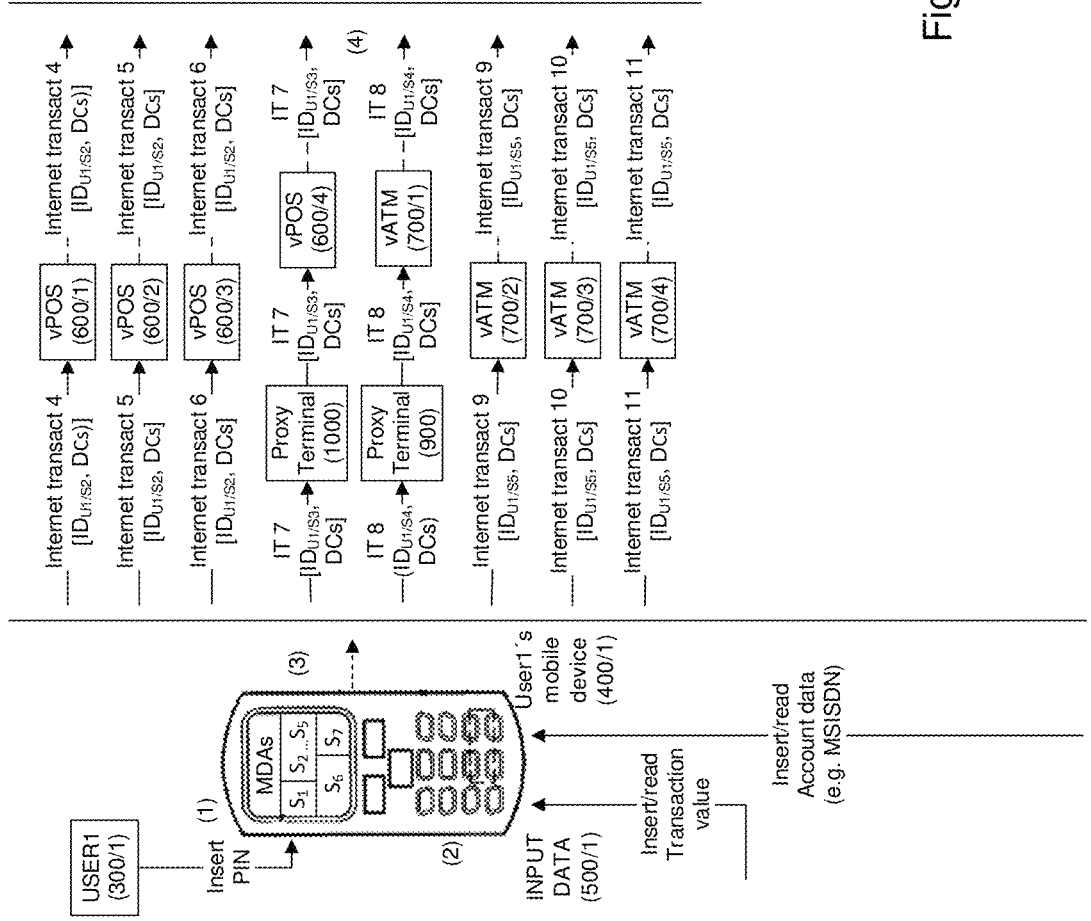
Fig. 5

Fig. 5.a

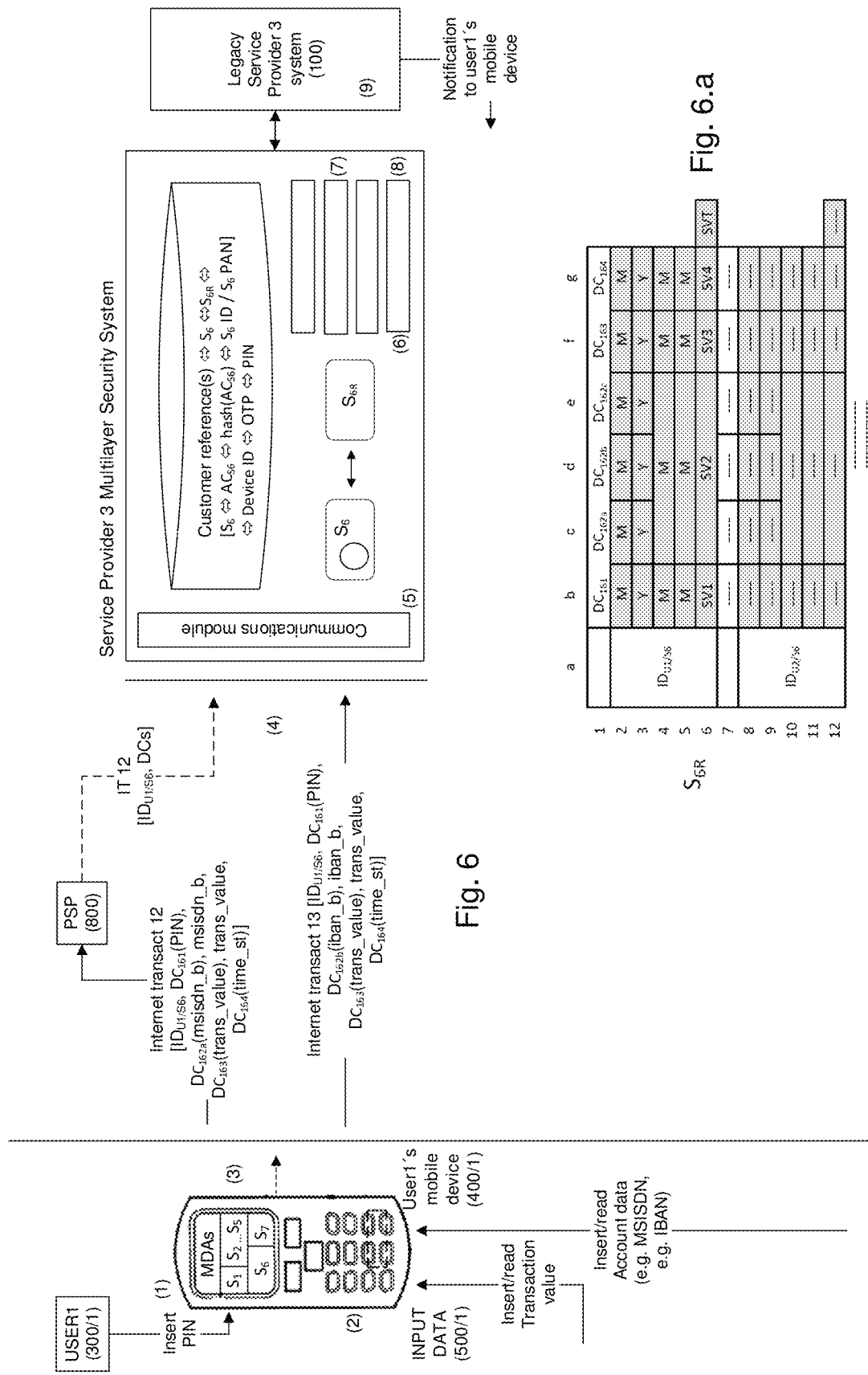

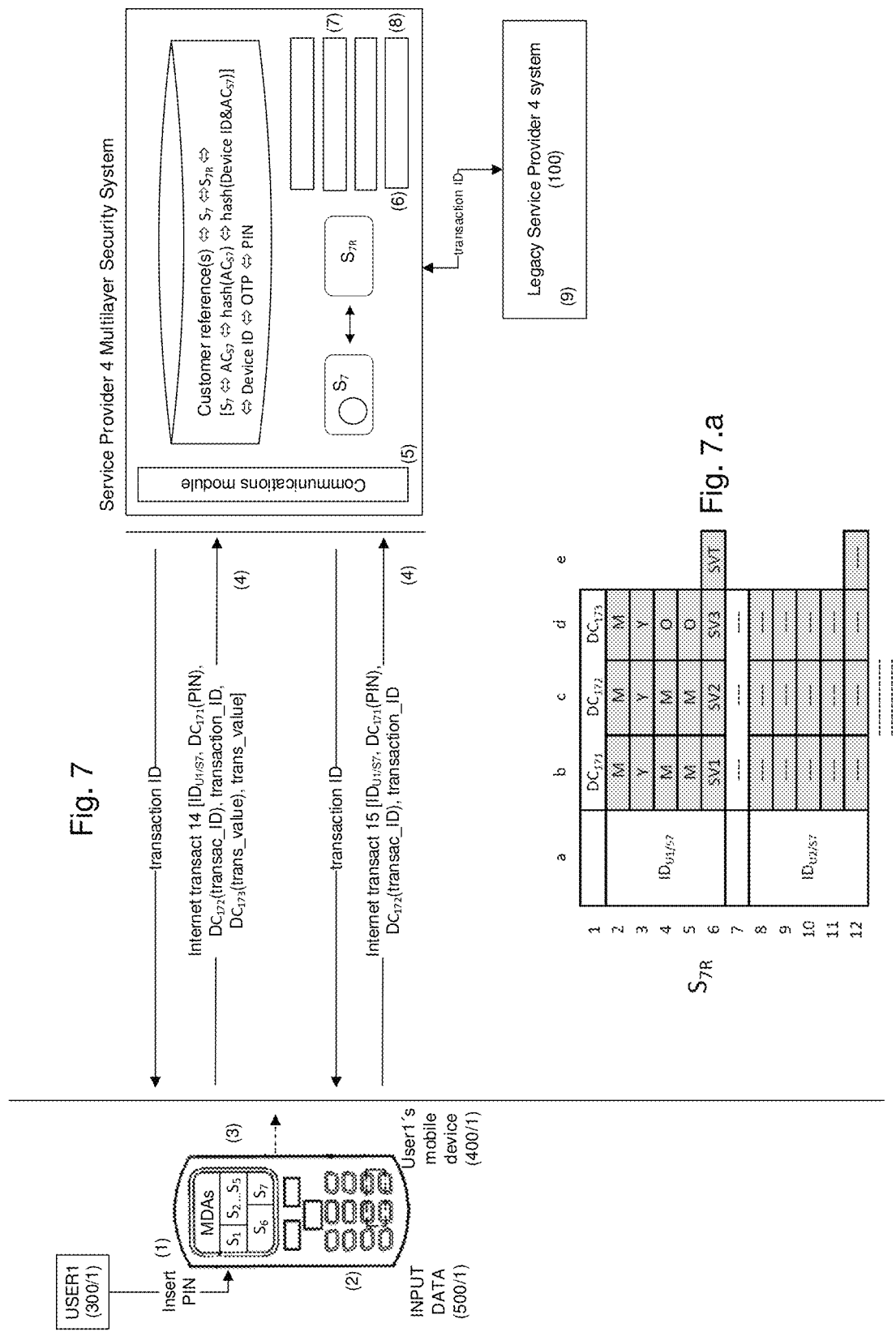

DYNAMIC MULTILAYER SECURITY FOR INTERNET MOBILE-RELATED TRANSACTIONS

TECHNICAL FIELD

The invention relates to methods and apparatus to authenticate internet transactions.

BACKGROUND

In today world, internet mobile-related transactions take place in a wide variety of manners and for a wide range of different purposes, those manners not only comprising transaction performed thought the user's mobile device itself but also those transactions that are performed thought a different device (such as a PC desktop computer, a portable computer, a tablet or another mobile device) that obtains transaction related credentials, at least partly, from the user's mobile device.

Internet mobile-related transactions may comprise a long list of possibilities such as peer-to-peer, peer-to-business or business-to-business transactions; payments through and internet Point of Sale (POS) terminal; cash withdrawal/request in an Automatic Teller Machine (ATM), or payments in the physical world where the ATM/POS is respectively available "in the cloud"; transactions performed via a financial entity (such as a Bank or an e-money entity) e.g. transferring electronic money (using real currencies such a €, USD, etc., or virtual currencies such as bitcoins) from a user's or business' account to a beneficiary, that may be a physical person or another business, and the physical person may be banked or unbanked; etc.

Those transactions are authenticated using different mechanisms, some of them based on the authentication of dynamic credentials that have being at least partly generated by the user's mobile device.

A user's mobile device generated dynamic credential may be based on using a combination of input data such as one or more user's passwords and/or one or more secrets personalized on the user's mobile device and/or one or more transaction related values. The generated dynamic credential may be authenticated by a server in the context of the mobile-related internet transaction.

If a mobile generated dynamic credential has been calculated using more than one input data (e.g. a user's password and the transaction amount) and the internet transaction is rejected by the server due to an authentication failure on said credential, it is not possible for the server to precisely determine the input data that has/have originated the failure. So an improved solution can be offered by generating a first independent credential calculated upon a first input data (e.g. a user's password), a second independent credential calculated upon a second input data (e.g. a time stamp), etc.

So, when the user's mobile device uses more than one transaction related input data to calculate dynamic credentials for a given internet transaction, a more precise authentication monitoring can be obtained by the server when each dynamic authentication credential is calculated from a single transaction related input data, and not from several.

Following with the above rationale, an internet transaction could be authenticated upon individual authentication of a set of user's mobile device generated dynamic credentials [1, 2 . . . N], each one associated to a given individual input data [1, 2 . . . n], such that the internet transaction authentication would require successful authentication of all the individual dynamic credentials. In this context, if a given individual authentication would fail, the server would be aware of the input data causing it.

It could nevertheless be the case e.g. that not all the dynamic credentials associated to a given internet transaction will reach the server for authentication (e.g. due to the specific configuration by a merchant of the internet POS terminal being used to perform the transaction); or in certain scenarios the user's mobile device could not have the right configuration to make a given credential producing a successful authentication at the server (e.g. the user mobile device is not synchronized with the mobile telephone network time, data and zone); or could also be the case that a type of transaction in a given channel does only permit the usage of a limited set of credentials, while another type of transaction in another channel would allow usage of an extended set of credentials for authentication; or some users may select usage of a set of mobile-generated dynamic credentials for a type of transaction while other users may select a different one.

Considering the above use cases, a dynamic authentication policy for dynamic authentication credentials would be required at the server, to establish the right balance between security, user's mobile device configuration and channels and media configuration and capabilities.

Thus, a system where internet mobile-related transactions are authenticated upon different sets of individual authentications of user's mobile device generated dynamic credentials, each dynamic credential associated to a given individual input data, is ambitioned.

According to this approach, in a particular example an internet mobile-related payment performed by user X in a given merchant could be successfully authenticated based on successful authentication of user's mobile device generated dynamic credentials [A, B, C, D], each based on input data [a, b, c and d] respectively, while other internet mobile-related payment performed by user Y in the same or another merchant could be successfully authenticated based only on successful authentication of user's mobile device generated dynamic credentials [A', B', C'], each based on input data [a', b', c'] respectively.

According to this invention, one or more servers of one or more service providers may require for a successful authentication to successfully authenticate a set of user's mobile device generated dynamic credentials for some mobile-related internet transactions and another set for other mobile-related internet transactions, based on dynamic authentication rules for user's mobile generated dynamic credentials.

SUMMARY OF THE DISCLOSURE

What are disclosed herein are new methods and apparatus to authenticate internet transactions, where the transactions are authenticated upon a set of individual authentications of user's mobile device generated dynamic credentials, each dynamic credential associated to a given individual input data.

According to some implementations this is achieved by providing a method associated with one or more providers of authentication services for internet transactions in connection with the use of a mobile device that generates dynamic authentication credentials and a transaction terminal that transmits at least part of the dynamic authentication credentials, the method comprising: electronically storing in one or more memories data capable of linking the mobile device to one or more authentication services for internet transactions, the data including authentication parameters associated to dynamic credentials authentication rules and one or more identifiers related to the user and the one or more authentication services; receiving from the transaction terminal a first dynamic authentication credential generated by the mobile device using as input data a user's Personal Identification Number (PIN), one or more additional dynamic authentication credentials, each one calculated by the mobile device upon a different input data, and at least one identifier related to the user and to the authentication service the dynamic authentication credentials refers to; authenticating the first dynamic authentication credential and further authenticating, based on authentication rules and associated authentication parameters, one or more of the one or more additional dynamic authentication credentials by one or more processing devices having access to at least a portion of the data, and sending the result of the authentication of the first dynamic authentication credential and the one or more of the one or more additional dynamic authentication credentials, and the mobile-related internet transaction being authorized or denied based upon that authentication result, where the transaction being authorized always requires a successful result of the authentication of the first dynamic authentication credential.

According to some implementations the authentication rules and related authentication parameters associated to the least one identifier related to the user and to the authentication service the dynamic authentication credentials relates to, comprises at least one authentication parameter associated to the first dynamic authentication credential.

According to some implementations the authentication rules and related authentication parameters associated to the least one identifier related to the user and to the authentication service the dynamic authentication credentials relates to, comprises at least one authentication parameter associated to at least one additional dynamic authentication credential.

According to some implementations the authentication rules and related authentication parameters associated to the least one identifier related to the user and to the authentication service the dynamic authentication credentials relates to, comprises at least one authentication parameter associated to each additional dynamic authentication credential.

According to some implementations the data stored in the one or more memories related to a first authentication service is stored in a first memory or set of memories of a first provider of authentication services for mobile-related internet transactions and the data stored in the one or more memories related to a second authentication service is stored in a second memory or set of memories of a second provider of authentication services for mobile-related internet transactions.

According to some implementations the one or more processing devices include a first processing device associated with a first provider of authentication services for mobile-related internet transactions and a second processing device associated with a second provider of authentication services for mobile-related internet transactions.

According to some implementations the one or more memories and the one or more processing devices reside in one or more servers of the one or more providers of authentication services for mobile-related internet transactions.

According to some implementations the entity authorizing or denying the mobile-related internet transaction is the same entity than one of the one or more providers of authentication services.

Advantageously, in this invention a dynamic authentication credential generated by the mobile device using a user's PIN as input data shall always be authenticated within the overall authentication process of the mobile-related internet transaction, and success on that authentication is required to authorize the transaction. According to some implementations the PIN is inserted by the user in the mobile device for the mobile device calculating the first dynamic authentication credential. According to some implementations the PIN is a biometric-PIN that is stored in a memory associated to the mobile device, and the mobile device using it as input data to calculate the first dynamic authentication credential requires a previous successful verification by the mobile device of user's fingerprint data captured by the mobile device.

According to some implementations the input data used to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

According to some implementations the input data used to calculate an additional dynamic authentication credential, or a derivative of the input data, has been previously sent by the one or more providers of authentication services and received by the mobile device for storage.

According to some implementations an input data based derivative of a dynamic authentication credential has been calculated by the one or more providers of authentication services and it is sent to the mobile device, and the mobile device generates the dynamic authentication credential using the input data.

According to some implementations, the transaction terminal that transmits the dynamic authentication credentials is the mobile device that generates the dynamic authentication credentials.

According to some implementations part of the one or more additional dynamic authentication credentials generated by the mobile device are not received from the transaction terminal, and the result of the authentication is based upon the result of the authentication of the first dynamic authentication credential and, according to the authentication rules and associated authentication parameters, the result of the authentication of at least part of the one or more additional dynamic authentication credentials received. Advantageously, in a particular example the authentication rules may permit generating a successful authentication result in connection to certain transactions received from transaction terminals belonging to a selected group of merchants, when part of the additional dynamic authentication credentials are not received. These group may refer e.g. to a set of merchants that are considered "more trusted" by the provider of authentication services or by the service provider in change to finally authorize or deny the internet transaction. According to some implementations in connection to a first mobile-related internet transaction associated to a given authentication service none of the one or more additional dynamic authentication credentials generated by the mobile device are received from the transaction terminal, and in connection to a second mobile-related internet transaction associated to said authentication service the one or more additional dynamic authentication credentials generated by the mobile device are received from the same or another transaction terminal, and the authentication parameters and rules permits that the result of the authentication of the first mobile-related internet transaction being based upon the result of the authentication of the first dynamic authentication credential, while the result of the authentication of the second mobile-related internet transaction being based upon the result of the authentication of the first dynamic authentication credential and one or more of the one or more additional dynamic authentication credentials.

So according to some implementations some mobile-related internet transactions associated to a given authentication service are authorized or denied based on the result of authenticating a first set of mobile device generated dynamic authentication credentials while other mobile-related internet transactions associated to the same authentication service are authorized or denied based on the result of authenticating a different set of mobile device generated dynamic authentication credentials, depending on the authentication parameters and the associated authentication rules, and also depending on the additional dynamic authentication credentials received.

According to some implementations the mobile-related internet transaction is authorized even when the authentication of the one or more additional dynamic authentication credentials received results in one or more authentication failures, and a notification is sent to the user's mobile device. In a particular example a mobile-related internet transaction is authorized even if the authentication of a dynamic authentication credential the uses a timestamp as input data results in a failure, and the user's mobile device receives a notification suggesting the adjustment of the date/time/zone settings into his/her smartphone to be synchronized with the one of the mobile telephone network such that successive transactions may be authenticated based on the timestamp related dynamic authentication credential.

According to some implementations the set of one or more additional dynamic authentication credentials received from a transaction terminal in connection to a first mobile-related internet transaction associated to a first authentication service is different than the set of one or more additional dynamic authentication credentials received from the same or from another transaction terminal in connection to a second mobile-related internet transaction associated to a second authentication service, and the one or more providers of authentication services authenticate one or more additional dynamic authentication credentials of the first set based upon authentication rules and related authentication parameters associated to the first authentication service and authenticate one or more additional dynamic authentication credentials of the second set based upon authentication rules and related authentication parameters associated to the second authentication service. In a particular example a mobile-related internet transaction performed via a given transaction terminal (e.g. a mobile-related internet payment via an internet POS terminal) does only permit the usage of a limited set of credentials for authentication, with associated authentication rules; advantageously other mobile-related internet transaction performed via another transaction terminal (e.g. a peer to business payment performed via the user's mobile device) may allow usage of an extended set of credentials for authentication and the related authentication rules are defined for the extended set.

According to some implementations the set of one or more additional dynamic authentication credentials, generated in a first mobile device with a first personalization and/or configuration and received from a transaction terminal in connection to a first mobile-related internet transaction associated to a first authentication service is different than the set of one or more additional dynamic authentication credentials, generated in a second mobile device with a second personalization and/or configuration and received from a transaction terminal in connection to a second mobile-related internet transaction associated to the first authentication service, and the one or more providers of authentication services authenticate in connection to the first mobile-related internet transaction one or more additional dynamic authentication credentials of the first set based upon authentication rules associated to the first mobile device personalization and/or configuration for the first authentication service and authenticate in connection to the second mobile-related internet transaction one or more additional dynamic authentication credentials of the second set based upon authentication rules associated to the second mobile device personalization and/or configuration for the first authentication service. In a particular example, during the registration process of a first mobile as a device to generate additional dynamic authentication credentials for a given type of mobile-related internet transaction (e.g. context aware mobile-related authentication services) the mobile device personalization is such that, in the context of generating dynamic authentication credentials for a given internet transaction, an additional dynamic authentication credential that uses GPS coordinates as input data and another one that uses the ID (identifier) of a wireless device as input data is generated when the mobile device determines that it is located and present within a given geo-area and presence-area respectively; within this example the personalization of a second mobile device for the same type of mobile-related internet transaction is such that, in the context of generating dynamic authentication credentials for a given internet transaction, it is only capable of determining whether it is located within a given geo-area, so only an additional dynamic authentication credential that uses GPS coordinates as input data will be generated when the mobile device is into the referred context; within this example, the authentication rules applied to the referred type of mobile-related internet transactions that uses additional dynamic authentication credentials generated by the first and the second mobile device depends on the personalization and/or the configuration applied to each one. So according to some implementations some mobile-related internet transactions associated to a given authentication service and to a first mobile device are authorized or denied based on the result of authenticating a first set of mobile device generated dynamic authentication credentials while other mobile-related internet transactions associated to the same authentication service and to a second mobile device are authorized or denied based on the result of authenticating a different set of mobile device generated dynamic authentication credentials, depending on the authentication parameters and the associated authentication rules, and also depending on the personalization and/or configuration of the first and second mobile device respectively.

According to some implementations the one or more providers of authentication services for internet transactions sends a notification to the user's mobile device to inform that more additional dynamic authentication credentials associated to a given authentication service could be generated by the mobile device, the notification related to modifying the personalization and/or configuration of the mobile device for the mobile device to generate said more additional dynamic authentication credentials, each one calculated by the mobile device upon different input data, in successive mobile-related internet transactions. Advantageously, the one or more providers of authentication services notify to the mobile device about the possibility to increase the level of security of the mobile-related internet transactions.

According to some implementations a second additional dynamic authentication credential generated by the mobile device upon a given input data is also calculated upon one or more other input data, the one or more other input data has been used to generate one or more first additional dynamic authentication credentials, and the one or more providers of authentication services first authenticates the one or more first additional dynamic authentication credentials by using one or more processing devices such that if the authentication of said one or more first additional dynamic authentication credentials were successful then an authentication failure on the second additional dynamic authentication credential can be univocally assigned by the one or more processing devices to an error in the input data.

According to some implementations the other input data of the second additional dynamic authentication credential comprises the user's PIN such that if the authentication of the first dynamic authentication credential were successful then an authentication failure on the second additional dynamic authentication credential can be univocally assigned by the one or more processing devices to an error in the input data.

According to some implementations the authorization or denial relates to a first part of the internet transaction and completion of the internet transaction authorization or denial process requires further processing by one or more entities.

According to some implementations a first mobile-related internet transaction associated to the least one identifier related to the user and to the authentication service the dynamic authentication credentials relates to, has been authorized upon a successful authentication result and one or more successive related internet transactions later obtain a successful authentication result by one or more processing devices of one or more service providers based on the successful authentication result of the first transaction.

According to some implementations the result of the authentication of a successive related internet transaction is sent to the entity that authorized the first mobile-related transaction and the successive related internet transaction is authorized or denied by said entity upon that authentication result.

According to some implementations there is a method associated with the use of a mobile device that generates dynamic authentication credentials to be used for internet transactions and a transaction terminal that transmits at least part of the dynamic authentication credentials, the method comprising: generating by the mobile device a first dynamic authentication credential using as input data a user's Personal Identification Number (PIN) and generating by the mobile device one or more additional dynamic authentication credentials, each one calculated by the mobile device upon a different input data; sending the first dynamic authentication credential, the one or more additional dynamic authentication credentials, and at least one identifier related to the user and to the authentication service the dynamic authentication credentials relates to, to the transaction terminal that transmits said first dynamic authentication credential, one or more of the one or more additional dynamic authentication credentials, and at least one of the identifiers received, to one or more servers of one or more providers of authentication services for internet transactions.

According to some implementations the mobile device receives a PIN that is used as input data to calculate the first dynamic authentication credential.

According to some implementations the PIN is stored in a memory of the mobile device and subsequently deleted from the memory after the conclusion of the first dynamic authentication credential generation.

According to some implementations the PIN is a biometric-PIN that is stored in a memory associated to the mobile device, and the mobile device using it as input data to calculate the first dynamic authentication credential requires a previous successful verification by the mobile device of user's fingerprint data captured by the mobile device.

According to some implementations the input data used to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

According to some implementations the input data used to calculate an additional dynamic authentication credential, or a derivative of the input data, has been previously received by the mobile device from the one or more providers of authentication services and stored in a memory of the mobile device.

According to some implementations an input data based derivative of a dynamic authentication credential calculated by the one or more providers of authentication services is received by the mobile device and stored in a memory, and the mobile device generates the dynamic authentication credential using the input data.

According to some implementations the transaction terminal that transmits the first dynamic authentication credential, one or more of the one of more additional dynamic authentication credentials, and at least one of the identifiers received, is the mobile device that generates the dynamic authentication credentials.

According to some implementations part of the one or more additional dynamic authentication credentials generated by the mobile device and sent by the mobile device to the transaction terminal are not transmitted by the transaction terminal to the one or more servers of the one or more providers of authentication services.

According to some implementations a notification is received by the mobile device from the one or more providers of authentication services, the notification related to modifying the configuration of the mobile device to make an additional dynamic authentication credential being successfully authenticated in successive mobile-related internet transactions. As a particular example, if an additional dynamic authentication credential uses a time stamp as input data and the one or more providers of authentication services identifies that the user's mobile device is not synchronized with the date/time/zone of the mobile telephone network, a notification is sent to the user's mobile device for the purpose of increasing the security in successive mobile-related internet transactions.

According to some implementations the set of one or more additional dynamic authentication credentials generated by the mobile device, sent by the mobile device to the transaction terminal and at least partly transmitted by the transaction terminal to the one or more servers of one or more providers of authentication services in connection to a first mobile-related internet transaction associated to a first authentication service is different than the set of one or more additional dynamic authentication credentials generated by the mobile device, sent by the mobile device to the same or to another transaction terminal and at least partly transmitted by the transaction terminal to the one or more servers of one or more providers of authentication services in connection to a second mobile-related internet transaction associated to a second authentication service.

According to some implementations the set of one or more additional dynamic authentication credentials generated in a first mobile device with a first personalization and/or configuration, sent by the mobile device to a transaction terminal and at least partly transmitted by the transaction terminal to the one or more servers of one or more providers of authentication services in connection to a first mobile-related internet transaction associated to a first authentication service is different than the set of one or more additional dynamic authentication credentials generated in a second mobile device with a second personalization and/or configuration, sent by the mobile device to a transaction terminal and at least partly transmitted by the transaction terminal to the one or more servers of one or more providers of authentication services in connection to a second mobile-related internet transaction associated to the first authentication service.

According to some implementations a notification is received by the mobile device from the one or more providers of authentication services, the notification related to modifying the personalization and/or configuration of the mobile device for the mobile device to generate more additional dynamic authentication credentials associated to a given authentication service, each one calculated by the mobile device upon different input data, in successive mobile-related internet transactions.

A non-transitory computer readable medium storing computer readable program code is provided for causing a processor of a mobile device to perform a method associated with the use of a mobile device that generates dynamic authentication credentials to be used for internet transactions and a transaction terminal that transmits at least part of the dynamic authentication credentials, the method comprising: (i) generating by the mobile device a first dynamic authentication credential using as input data a user's Personal Identification Number (PIN) and generating by the mobile device one or more additional dynamic authentication credentials, each one calculated by the mobile device upon a different input data, and (ii) sending the first dynamic authentication credential, the one or more additional dynamic authentication credentials, and at least one identifier related to the user and to the authentication service the dynamic authentication credentials relates to, to the transaction terminal that transmits said first dynamic authentication credential, one or more of the one or more additional dynamic authentication credentials, and at least one of the identifiers received, to one or more servers of one or more providers of authentication services for internet transactions.

According to some implementations a non-transitory computer readable medium storing computer readable program code is provided that causes the processor using a received PIN as input data to calculate the first dynamic authentication credential.

According to some implementations a non-transitory computer readable medium storing computer readable program code is provided that causes the processor to store the PIN in a memory of the mobile device and subsequently being deleted from the memory after the conclusion of the first dynamic authentication credential generation.

According to some implementations a non-transitory computer readable medium storing computer readable program code is provided that causes the processor to use a biometric-PIN stored in a memory associated to the mobile device as input data to calculate the first dynamic authentication credential upon a previous successful verification by the processor of user's fingerprint data captured by the mobile device.

According to some implementations a non-transitory computer readable medium storing computer readable program code is provided that causes the processor to use one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number, as input data to calculate an additional dynamic authentication credential.

According to some implementations a non-transitory computer readable medium storing computer readable program code is provided that causes the processor to calculate an additional dynamic authentication credential based on input data, or a derivative of the input data, that has been previously received by the mobile device from the one or more providers of authentication services and is stored in a memory of the mobile device.

According to some implementations a non-transitory computer readable medium storing computer readable program code is provided that causes the processor to generate a dynamic authentication credential using an input data and an input data based derivative of the dynamic authentication credential calculated by the one or more providers of authentication services, previously received by the mobile device and stored in a memory.

According to some implementations a non-transitory computer readable medium storing computer readable program code is provided that causes that the set of one or more additional dynamic authentication credentials generated by the processor of the mobile device, sent by the mobile device to the transaction terminal and at least partly transmitted by the transaction terminal to the one or more servers of one or more providers of authentication services in connection to a first mobile-related internet transaction associated to a first authentication service is different than the set of one or more additional dynamic authentication credentials generated by the processor of the mobile device, sent by the mobile device to the same or to another transaction terminal and at least partly transmitted by the transaction terminal to the one or more servers of one or more providers of authentication services in connection to a second mobile-related internet transaction associated to a second authentication service.

According to some implementations a non-transitory computer readable medium storing computer readable program code is provided that causes that the set of one or more additional dynamic authentication credentials generated by the processor in a first mobile device with a first personalization and/or configuration, sent by the mobile device to a transaction terminal and at least partly transmitted by the transaction terminal to the one or more servers of one or more providers of authentication services in connection to a first mobile-related internet transaction associated to a first authentication service is different than the set of one or more additional dynamic authentication credentials generated by the processor in a second mobile device with a second personalization and/or configuration, sent by the mobile device to a transaction terminal and at least partly transmitted by the transaction terminal to the one or more servers of one or more providers of authentication services in connection to a second mobile-related internet transaction associated to the first authentication service.

According to some implementations a mobile device is provided that is capable to generate dynamic authentication credentials to be used for internet transactions and a transaction terminal that transmits at least part of the dynamic authentication credentials, the mobile device comprising: (i) an electronic storage medium that stores input data; and (ii) a processor adapted to generate a first dynamic authentication credential using as input data a user's Personal Identification Number (PIN) and to generate one or more additional dynamic authentication credentials, each one calculated upon a different input data, and the processor further adapted to send the first dynamic authentication credential, the one or more additional dynamic authentication credentials, and at least one identifier related to the user and to the authentication service the dynamic authentication credentials relates to, to the transaction terminal that transmits said first dynamic authentication credential, one or more of the one or more additional dynamic authentication credentials, and at least one of the identifiers received, to one or more servers of one or more providers of authentication services for internet transactions.

According to some implementations the processor is adapted to receive a PIN that is used as input data to calculate the first dynamic authentication credential.

According to some implementations a PIN is stored in a memory of the mobile device and subsequently deleted from the memory by the processor after the conclusion of the first dynamic authentication credential generation.

According to some implementations the input data used by the processor to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

According to some implementations the input data used by the processor to calculate an additional dynamic authentication credential, or a derivative of the input data, has been previously received by the mobile device from the one or more providers of authentication services and stored in a memory of the mobile device.

According to some implementations an input data based derivative of a dynamic authentication credential calculated by the one or more providers of authentication services is received by the mobile device and stored in a memory, and the processor generates the dynamic authentication credential using the input data.

BRIEF DESCRIPTION OF THE DRAWINGS

FIG. 5.*a* shows some scenarios related to the definition of dynamic credentials authentication rules and associated authentication parameters for a set of authentication services ($S_2$ to $S_5$).

FIG. 6.*a* shows some scenarios related to the definition of dynamic credentials authentication rules and associated authentication parameters for a given authentication service ($S_6$).

FIG. 7.*a* shows some scenarios related to the definition of dynamic credentials authentication rules and associated authentication parameters for a given authentication service ($S_7$).

FIG. 4 is a schematic diagram illustrating methods and apparatus according to some implementations to authenticate mobile-related internet transactions by one or more service providers, where a detailed description is provided in connection to a given service provider (service provider 1) and multilayer security system (the multilayer security system of service provider 1).

FIG. 5 is a schematic diagram illustrating methods and apparatus according to some implementations to authenticate mobile-related internet transactions by one or more service providers, where a detailed description is provided in connection to other given service provider (service provider 2) and multilayer security system (the multilayer security system of service provider 2).

FIG. 6 is a schematic diagram illustrating methods and apparatus according to some implementations to authenticate mobile-related internet transactions by one or more service providers, where a detailed description is provided in connection to another given service provider (service provider 3) and multilayer security system (the multilayer security system of service provider 3).

FIG. 7 is a schematic diagram illustrating methods and apparatus according to some implementations to authenticate mobile-related internet transactions by one or more service providers, where a detailed description is provided in connection to other given service provider (service provider 4) and multilayer security system (the multilayer security system of service provider 4).

DETAILED DESCRIPTION

Figure 1:
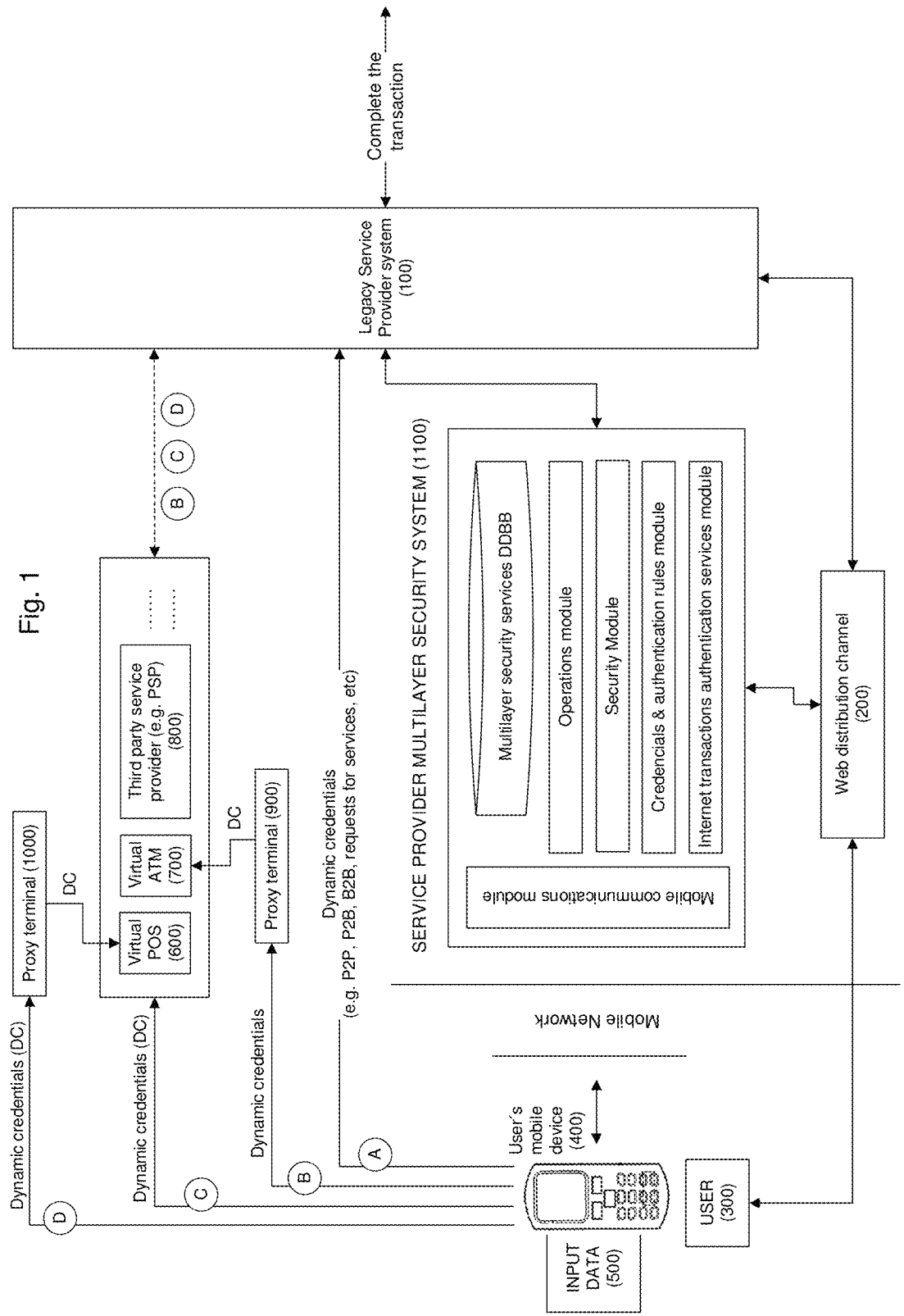
FIG. 1 is a schematic diagram that generally illustrates some functional blocks according to some implementations, and they are illustrated as an extension of a legacy system of a service provider.

FIG. 1 is a schematic diagram that generally illustrates some functional blocks according to some implementations, and they are illustrated as an extension of a legacy system of a service provider. This figure shows a legacy system (100) of a service provider such as a bank, a financial institution, a payments service provider, a payments processor, a provider of products or services, or any other entity in charge to authorize or deny internet transactions made by a user (300) based upon the result of the authentication of a set of transaction credentials; the user may be operating on his/her behalf or as an authorized representative of an enterprise, and typically utilizes microprocessor smart cards, magnetic stripe cards, mobile devices, hardware tokens or any other token or device for internet transactions authentication.

In the context of this invention the user is the user of a mobile device (400) (such as a smartphone, a PDA, a portable computer or a tablet) with at least one mobile device application that is used to generate dynamic authentication credentials for mobile-related internet transactions. According to some implementations, the at least one mobile device application may be at least partly stored in the one or more memories associated to the mobile device processor and/or in the memory of a secure element of the mobile device such as a memory card, and embedded chip or a microprocessor smart card.

The at least one mobile device application must be personalized to be able to generate the dynamic credentials. In some implementations the user request to the service provider via a web distribution channel (200) to register the mobile device for one or more mobile-related internet transactions authentication services and the mobile device application is personalized to be able to generate dynamic authentication credentials to authenticate those transactions.

The mobile device application in the mobile device generates the dynamic authentication credentials based on input data (500). According to some implementations, at least one dynamic authentication credential of the set of dynamic authentication credentials used to authenticate a given mobile-related internet transaction is calculated using a user's PIN as input data, such that two factors authentication is ensured. Other dynamic authentication credentials of this set are calculated using other input data such as geographic coordinates, identifiers of wireless devices, mobile phone numbers, account numbers, a transaction value, a time stamp, hard-coded keys, tokens, etc. Each dynamic authentication credential of this set is calculated based on a single input data of those that requires being authenticated, such that a failure in the authentication a given dynamic authentication credential of that set may be univocally assigned to a wrong input data used to generate said dynamic authentication credential.

As may be obvious for those skilled in the art, in addition to the dynamic authentication credentials described herein (each one based on the above referred single input data) and the associated authentication rules, other additional static or dynamic credentials (e.g. each one generated using more than one input data such that upon an authentication failure it is not possible to assign the failure to an specific input data of the more than one) could be used to authenticate a given mobile-related internet transaction. Also, the authorization or denial of a given mobile-related internet transaction could also be based upon e.g. traditional authorization/denial criteria for internet transactions (e.g. risk criteria associated to the user) as e.g. determined by the service provider. Using also those other additional credentials, or the referred additional well-known authorization/denial criteria, is obviously possible without departing from the scope of this invention.

FIG. 1 shows different scenarios of using dynamic authentication credentials generated by the user's mobile device to authenticate mobile-related internet transactions. In some implementations the dynamic authentication credentials are used to authenticate peer-to-peer (P2P), peer-to-business (P2B) or business-to-business (B2B) internet transactions; in other implementations the dynamic authentication credentials are used to authenticate request for services provided by one or more service providers; in other implementations the user utilizes the dynamic authentication credentials generated in the mobile device to make an internet payment via a virtual POS (600) or to request cash withdrawal via a virtual ATM (700) (in this case the cash may e.g. be later obtained in a physical ATM); in other implementations there is a proxy terminal (900 or 1000) in the physical world where the dynamic authentication credentials are inputted or transmitted, said terminal operating as a proxy to send the credentials to a virtual POS (600) or to a virtual ATM (700); in other implementations the dynamic authentication credentials are inputted or transmitted to the system of a third party service provider (800) (e.g. a Payments Service Provider or other type of service provider); in other implementations the dynamic authentication credentials are inputted in or transmitted to the legacy system of the service provider to make an internet transaction such as for example transferring electronic money from a user's or business' account to a beneficiary.

Together with the dynamic authentication credentials, at least one identifier related to the user and to the authentication service the dynamic authentication credentials relates to, are sent from the mobile device to the transaction terminal, and the transaction terminal transmits at least part of the dynamic authentication credentials and at least one of the identifiers received to a multilayer security system (1100). For simplicity the identifiers are not illustrated in FIG. 1 but will be illustrated in other embodiments.

So at least part of the dynamic authentication credentials, and at least one identifier related to the user and to the authentication service the dynamic authentication credentials relates to, are received in a multilayer security system (1100) in charge to authenticate said dynamic authentication credentials. The result of the authentication of at least part of the dynamic authentication credentials received is sent to the legacy system of the service provider that authorizes or deny the mobile-related internet transaction based upon that authentication result (and possibly based on other authentication data or parameters). In a particular example the internet transaction is a mobile-related internet payment and the service provider authorizes or denies it.

In other particular example (illustrated in FIG. 1) the authentication is only a step of the internet transaction process and the service provider authorize or deny the part of the transaction that falls in its domain; if that part is authorized by the service provider, the internet transaction progress to the next step for completion. For example, in a banking transfer the ordering bank authenticates the user (that is a bank's customer) and success on the authentication is a pre-condition for the transaction to progress and the money transfer being effectively transferred to the beneficiary account (that may be a customer of the same or of a different financial institution).

FIG. 1 shows an architecture where the dynamic authentication credentials (and the at least one identifier) are first received in the legacy system of the service provider and then sent to the multilayer security system for authentication. It may be obvious for those skilled in the art that the dynamic authentication credentials (and the at least one identifier) may also be first received in the multilayer security system such that the result of the authentication will be later sent to the legacy system of the service provider. The multilayer security system could belongs and/or be operated by a service provider (e.g. a payment processor) different than the service provider of the legacy system (e.g. a bank), thus the first entity could be providing authentication services to the second or be acting on his behalf for mobile-related internet transactions authentication services. In some architectures the dynamic authentication credentials (and the at least one identifier) related to certain type of transactions (e.g. payment transactions from a virtual POS) are first received in the legacy system of the service provider and then sent to the multilayer security system for authentication, while the dynamic authentication credentials (and the at least one identifier) related to other type of transactions (e.g. P2P, P2B, B2B or other services requests) are first received in the multilayer security system. So a diversity of architectures are possible without departing from the scope of this invention.

Furthermore, the dynamic authentication credentials illustrates in FIG. 1 could be authenticated by using one or more multilayer security systems of one or more service providers, offering authentication services for mobile-related internet transactions to one or more service providers. In a particular example, P2P, P2B and B2B mobile-related internet transactions are authenticated by the multilayer security system of a first service provider, internet payments via virtual POSs or from a given PSP are authenticated by the multilayer security system of a second service provider, non-payment-related services requests are authenticated by the multilayer security system of a third service provider, etc. According to some implementations the entity authorizing or denying a given mobile-related internet transaction is the same entity than one of the one or more providers of authentication services (e.g. the second service provider in this example).

Figure 2:
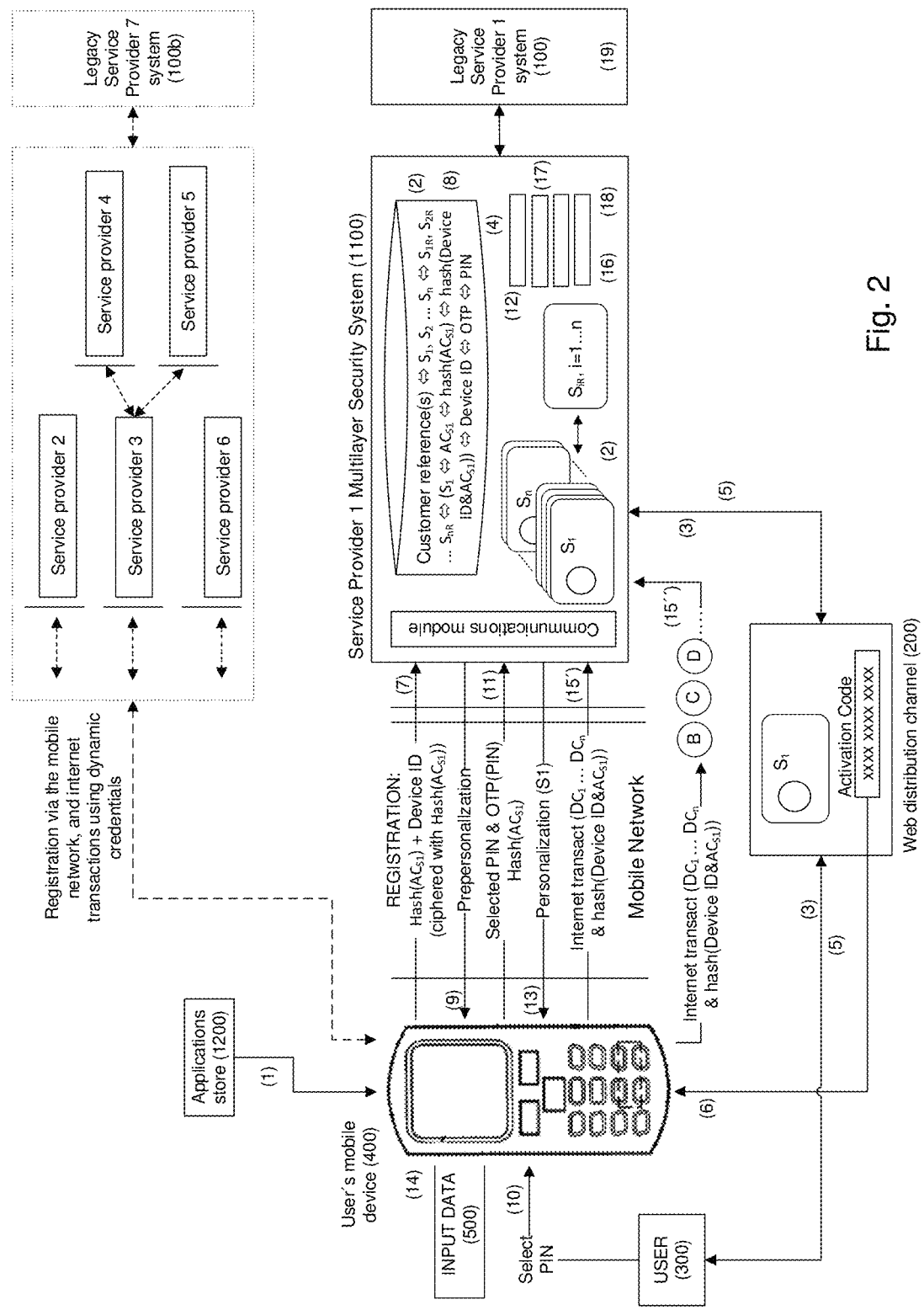
FIG. 2 is a schematic diagram illustrating methods and apparatus according to some implementations to authenticate mobile-related internet transactions by one or more service providers, where a more detailed description is provided in connection to the multilayer security system of a service provider 1.

FIG. 2 shows an implementation associated with one or more providers of authentication services for internet transactions in connection with the use of a mobile device that generates dynamic authentication credentials and a transaction terminal that transmits at least part of the dynamic authentication credentials. The following is described in detail in connection to the multilayer security system of service provider 1.

FIG. 2 also shows other providers of authentication services for mobile-related internet transactions wherein each of service provider 2 and service provider 6 owns and operates its own multilayer security system; service provider 3 owns and operates its own multilayer security system, but also operates at least part of the multilayer security system of service provider 4 and service provider 5; so the multilayer security system of service provider 4 is at least partly operated by service provider 3 (on behalf of service provider 4); and the multilayer security system of service provider 5 is also at least partly operated by service provider 3 (on behalf of service provider 5). Therefore, in this implementation the multilayer security system that is authenticating mobile-related internet transactions associated to a set of users and users' mobile devices is owned and operated by a set of different service providers of authentication services for internet transactions (each one owning/operating a part of it) and there are one or more memories and one or more processing devices of the multilayer security system that reside in one or more servers on the one or more providers of authentication services for mobile-related internet transactions.

In connection to a given user and user's mobile device, the one or more providers of authentication services for mobile-related internet transactions electronically stores in one or more memories data capable of linking the mobile device to one or more authentication services for internet transactions, the data including authentication parameters associated to dynamic credentials authentication rules and one or more identifiers related to the user and the one or more authentication services. According to some implementations the data stored in the one or more memories related to a first authentication service is stored in a first memory or set of memories of a first provider of authentication services for mobile-related internet transactions (for example the service provider 1 referred above) and the data stored in the one or more memories related to a second authentication service is stored in a second memory or set of memories of a second provider of authentication services for mobile-related internet transactions (for example the service provider 2 referred above). Also, according to some implementations the one or more processing devices include a first processing device associated with a first provider of authentication services for mobile-related internet transactions (for example the service provider 1 referred above) and a second processing device associated with a second provider of authentication services for mobile-related internet transactions (for example the service provider 2 referred above).

As commented above, and in connection to service provider 4 and service provider 5, at least part of the authentication processes lying in the domain of those service providers are performed by a trusted third party, on behalf of the service provider. Advantageously, the service provider can avoid technical complexity by delegating part of the multilayer security related processes for mobile-related internet transactions authentication to another entity (the service provider 3 in the example of FIG. 2).

The result of the authentication performed by a provider of authentication services in connection to a given mobile-related internet transaction is sent, such that the transaction is authorized or denied based upon that authentication result. FIG. 2 illustrates an example where service provider 7 (100*b*) authorizes or deny mobile-related internet transactions based upon the authentication result of transactions authenticated by one or more of service providers 2 to 6; and service provider 1 authorizes or deny mobile-related internet transactions based upon the authentication result obtained from its own multilayer security system. So according to some implementations the entity authorizing or denying the mobile-related internet transaction is the same entity than one of the one or more providers of authentication services.

FIG. 2 also illustrates, in detail, an exemplary process to securely personalize one or more authentication services ($S_1, S_2 \ldots S_n$) into a mobile device application installed in a mobile device, to generate dynamic credentials for internet transactions authentication.

For simplicity, the process to personalize one or more authentication services in the mobile device application, and to register them in the multilayer security system in association to a given mobile device, is described in detail in connection to one provider of authentication services for mobile-related internet transactions (service provider 1). However, an equivalent process may be used to make the mobile device or mobile device application(s) being registered/personalized for many different internet transactions authentication services defined by a multiplicity of service providers.

In step (1) the user downloads a mobile device application from an applications store (1200) into his mobile device, and the application is then installed.

It shall be noted that in an embodiment more than one mobile device application may be downloaded an installed for internet transactions authentication services, each application being personalized for one or more authentication services defined by one or more providers of authentication services (or by one or more legacy service providers as those illustrated in FIG. 2).

In step (2) some mobile-related internet transactions authentication services associated to dynamic authentication credentials are associated to the user in the multilayer security system of service provider 1. Examples of those services have already been described in connection to A, B, C and D in FIG. 1. As an example: S1 may refer to authentication of P2P/P2B/B2B internet transactions that use mobile generated dynamic authentication credentials; S2 may refer to authentication of internet transactions that uses mobile generated dynamic authentication credentials, the transactions being performed via a virtual POS transaction terminal; S3 may relate to an internet transaction that uses mobile generated dynamic authentication credentials, the transaction requesting provision of a service delivered by the service provider; etc.

The authentication services ($S_1, S_2 \ldots S_n$) may be associated to one or more customer references that may facilitate services management in the legacy system of the service provider. Thus $S_i$ may be associated to user's identification data, user's account data, user's credit/debit/pre-paid card data, user's mobile phone number, user's email, etc., as defined by one or more service providers. As a particular example, a service for mobile P2P payments authentication could associate an identifier of the user's mobile device (or e.g. a user's email) with one of his/her account numbers such that even if the payment authentication request is originally associated to his/her mobile device number (or e.g. his/her email), the cash to be transferred to a beneficiary will be withdrawn from the related user's banking account; As other particular example, a service for virtual credit cards authentication could associate user's virtual cards identification data with one of his/her credit cards in plastic format such that even if the payment request is originally related to the virtual card, it is later processed by the service provider as associated to the same banking account the referred plastic credit card is associated to.

Also in step (2) authentication services ($S_1, S_2 \ldots S_n$) are associated to the related rules ($S_{1R}, S_{2R} \ldots S_{nR}$) to authenticate dynamic credentials. In this embodiment the referred associations and rules are defined in the credentials & authentication rules module. As an particular example $S_i$ may require successful authentication of dynamic authentication credentials $DC_{1A}$ and $DC_{2A}$ associated to a given mobile-related internet transaction and successful authentication of dynamic authentication credentials $DC_{1B}$, $DC_{2B}$ and $DC_{3B}$ associated to another given mobile-related internet transaction; and $S_j$ may require successful authentication of dynamic authentication credentials $DC_{1C}$, $DC_{2C}$ and $DC_{3C}$ associated to a given mobile-related internet transaction and successful authentication of dynamic authentication credentials $DC_{1D}$, $DC_{2D}$, $DC_{3D}$ and $DC_{4D}$ associated to other given mobile-related internet transaction. Advantageously in this example, based on the referred authentication rules, a mobile-related internet transaction may be authenticated using a set of dynamic authentication credentials that is different to the set of dynamic authentication credentials used to authenticate other mobile-related internet transaction.

The data related to the rules to authenticate dynamic authentication credentials associated to services ($S_1, S_2 \ldots S_n$) is stored in one or more memories that reside in one or more servers of one or more providers of authentication services for mobile-related internet transactions. In the particular embodiment illustrated in FIG. 2 those data are stored into the multilayer security system of service provider 1 and the storage is represented as $S_{1R}, S_{2R} \ldots S_{nR}$ into the database, representing the storage of the mobile-related dynamic credentials authentication rules and associated authentication parameters for "n" defined authentication services.

According to some implementations some dynamic credentials authentication rules and associated authentication parameters are at least partly defined for/assigned to a given user, mobile device and authentication service during the registration process for said authentication service of the user's mobile device and the mobile device application into the multilayer security system.

According to some implementations the service provider 3 defines dynamic credentials authentication rules and associated authentication parameters for users' of mobile device authentication services of service provider 4 and service provider 5, on behalf of service provider 4 and service provider 5.

When some mobile-related dynamic credentials authentication rules and associated authentication parameters have already being defined for a given user and authentication services, the relationship between the user (that in FIG. 2 is a customer of service provider 1), the authentication services and the dynamic credentials authentication rules (and associated authentication parameters) is stored in the multilayer security system database. The database of the multilayer security system of service provider 1 may represent the storage and relationships as follows:

[Customer reference(s) $\Leftrightarrow S_1, S_2 \ldots S_n \Leftrightarrow S_{1R}, S_{2R} \ldots S_{nR}$]

According to some implementations the data is stored in a relational database.

Steps (3) to (13) show the registration process of a mobile device application (in a mobile device) into a first authentication service ($S_1$) for mobile-related internet transactions.

In step (3) the user starts the process of registering the mobile device application in at least one authentication service for mobile-related internet transactions by sending a request for registration via the web distribution channel of service provider 1. In some cases the request requires a prior payment to be made by the user, e.g. via the web distribution channel of service provider 1, to have access to a service that is related to the authentication service for mobile-related internet transactions.

According to some implementations an activation code (AC) is generated for registering the mobile device application into each authentication service for mobile-related internet transactions. So in step (4), and in connection to registering the mobile device application for $S_1$, the $AC_{S1}$ is generated by the security module, and it is stored, associated to $S_1$, into the multilayer security system database of service provider 1. According to some implementations a hash value of the $AC_{S1}$ is also calculated and stored; this hash value can be later used during this registration process, as detailed herein below. So, at this stage the data relationships into the multilayer security system database of service provider 1 are the following:

[Customer reference(s) $\Leftrightarrow S_1, S_2 \ldots S_n \Leftrightarrow S_{1R}, S_{2R} \ldots S_{nR} \Leftrightarrow (S_1 \Leftrightarrow AC_{S1} \Leftrightarrow \text{hash}(AC_{S1}))$]

In step (5) the activation code ($AC_{S1}$) for registering the mobile device application into $S_1$ is displayed to the user via the web distribution channel of service provider 1.

In step (6) the user inserts the activation code ($AC_{S1}$) for registration in $S_1$ into the mobile device application and in step (7) the mobile device application in the mobile device sends to one or more processing devices of the multilayer security system of service provider 1, e.g. via https, the hash($AC_{S1}$) and the Device ID (ciphered with hash($AC_{S1}$)). The Device ID may be a unique identifier of the mobile device, such as for example the IMEI.

In step (8) the one or more processing devices of the multilayer security system of service provider 1 may identify at least one customer reference in connection to $S_1$ by using the received hash($AC_{S1}$) value. The Device ID ciphered value is then deciphered and stored into the multilayer security system database of service provider 1, as shown in FIG. 2.

Also, a new hash(Device ID & $AC_{S1}$) value is calculated by the one or more processing devices, and stored into the database, associated to the $AC_{S1}$, and to the hash($AC_{S1}$) values; this hash(Device ID & $AC_{S1}$) value can be used later as described herein below, and it is a unique identifier related of the user, the authentication service and the mobile device (so if, when calculated, the value was already assigned to other user/authentication-service/mobile-device, e.g. the next consecutive available value will be assigned to the user/authentication-service/mobile-device during the registration process). This process of calculating a unique user/authentication-service/mobile-device identifier is an example and it is obvious for those skilled in the art that a multiplicity of different possibilities to generate identifiers to match a given internet transaction with a given user/mobile-device/authentication-service(/associated product) exist.

So, at this stage the data relationships into the multilayer security system database of service provider 1 are the following:

[Customer reference(s) $\Leftrightarrow$ $S_1, S_2$ . . . $S_n \Leftrightarrow S_{1R}$, $S_{2R}$. . . $S_{nR} \Leftrightarrow (S_1 \Leftrightarrow AC_{S1} \Leftrightarrow$ hash $(AC_{S1})] \Leftrightarrow$ hash(Device ID & $AC_{S1})) \Leftrightarrow$ Device ID]

In this embodiment, OTP (One Time Password) based authentication is used in the process of registering the mobile device application into $S_1$. So OTP keys and parameters are generated/defined in step (8) by the security module, and are stored into the multilayer security system database of service provider 1. The stored OTP keys and parameters are illustrated in FIG. 2 as "OTP" in the database of the multilayer security system of service provider 1. So at this stage the data relationships into the multilayer security system database of service provider 1 may be represented as:

[Customer reference(s) $\Leftrightarrow$ $S_1, S_2$ . . . $S_n \Leftrightarrow S_{1R}$, $S_{2R}$. . . $S_{nR} \Leftrightarrow (S_1 \Leftrightarrow AC_{S1} \Leftrightarrow$ hash $(AC_{S1})] \Leftrightarrow$ hash(Device ID & $AC_{S1})) \Leftrightarrow$ Device ID $\Leftrightarrow$ OTP]

In step (9) the mobile device application is pre-personalized to generate dynamic authentication credentials associated to the authentication service $S_1$ for mobile-related internet transactions. Pre-personalization refers to a step previous to $S_1$ final personalization into the mobile device and in this phase certain application data and configurations are sent to the mobile device application (e.g. OTP keys and parameters for mobile device OTP related calculations associated to the registration process; e.g. certain images, texts, graphics or icons related to internet transactions services associated to $S_1$).

At the completion of step (9) the mobile device application in the mobile device is pre-registered in the authentication service $S_1$ for mobile-related internet transactions, but receiving certain personalization data associated to $S_1$ may be pending.

In a particular example, in case that in step (8) the one or more processing devices determines that the received hash ($AC_{S1}$) value either does not exists in the database of the multilayer security system of service provider 1 or the related $AC_{S1}$ has expired (e.g. because the pre-registration process did not finalize within a designated time period after the $AC_{S1}$ was generated and stored into the database of the multilayer security system), then the pre-registration process fails and the user may start it again from step (3).

According to some implementations, to make a given authentication service $S_i$ becoming at least partly registered for a mobile device requires the user inserting an activation code into the mobile device and a successful validation of said activation code by one or more processing devices. In this embodiment the $AC_{S1}$ is validated by validating the related hash($AC_{S1}$) value.

In step (10) the user is prompted to select a Personal Identification Number (PIN) for mobile-related internet transactions associated to at least $S_1$ (in some implementations the same PIN may be used to register the mobile device into more authentication services for mobile-related internet transactions associated to dynamic authentication credentials and related to service provider 1).

According to some implementations the PIN value is not stored into the mobile device application more time that the one needed to securely sent it in step (11), e.g. via https, to the multilayer security system of service provider 1, together with a One-Time-Password (OTP) that has been calculated using the PIN value and OTP keys and parameters stored in the mobile device application database during the previously described pre-registration process; and the hash($AC_{S1}$) value is also sent, to be able to assign by the one or more processing devices the selected PIN and the OTP result to the right customer reference(s).

In step (12) the PIN is stored in the one or more memories of the multilayer security system of service provider 1, in relationship with $S_1$, the previously stored keys and parameters for OTP calculations and with at least one customer reference. This PIN storage into the multilayer security system database of service provider 1 is labelled in FIG. 2 database as "PIN" data.

So, at this stage the data relationships into the multilayer security system database of service provider 1 may be represented as follows:

[Customer reference(s) $\Leftrightarrow$ $S_1, S_2$ . . . $S_n \Leftrightarrow S_{1R}$, $S_{2R}$. . . $S_{nR} \Leftrightarrow (S_1 \Leftrightarrow AC_{S1} \Leftrightarrow$ hash $(AC_{S1})] \Leftrightarrow$ hash(Device ID & $AC_{S1})) \Leftrightarrow$ Device ID $\Leftrightarrow$ OTP $\Leftrightarrow$ PIN]

In step (12), the one or more processing devices of the multilayer security system of service provider 1 calculates at least one OTP result using the stored user PIN and OTP keys and parameters, and compares the result with the one received from the mobile device application. If validation is successful then $S_1$ final personalization can be performed into the mobile device application database and the registration process terminates; said final personalization may comprise sending to the mobile device application data to generate dynamic authentication credentials associated to $S_1$ (e.g. OTP keys and parameters associated to $S_1$ authentication service, tokens, identifiers of other devices that are used to calculate dynamic authentication credentials, dynamic authentication credentials generation rules, etc.; for simplicity the referred tokens, identifiers of other devices, etc. are not illustrated in the database of the multilayer security system of FIG. 2, but they will be illustrated in other embodiments). According to some implementations, when e.g. one time use tokens are sent to the mobile device application to be used to generate dynamic authentication credentials, they must be renewed after consumption, e.g. in the context of a web service opened between the mobile device application in the mobile device and the multilayer security system of the service provider.

So, according to some implementations, the one or more providers of authentication services sends data to the mobile device application in the mobile device to generate dynamic authentication credentials for mobile-related internet transactions authentication after successful validation of a One Time Password (OTP) received from the mobile device application.

In step (13) $S_1$ related personalization data are sent from the multilayer security system of service provider 1 to the mobile device application; the mobile device application in the user mobile device receives the data and stores the data to later calculate dynamic authentication credentials for mobile-related internet transactions associated to $S_1$. So when step (13) ends $S_1$ related personalization has been completed and the registration process has ended.

According to some implementations the pre-registration and the registration process for at least one mobile-related internet transactions authentication service (steps (7) to (13) above) shall be made in the context of the same https session, such that the PIN shall be selected in the same session where the activation code is entered. In a particular implementation there is a limited time window (e.g. 2 minutes) to select the PIN after the pre-registration process has ended, such that if such a period is exceeded the registration process does not succeed.

Considering above explanations, according to some implementations data capable of linking the mobile device to one or more authentication services for internet transactions is electronically stored in one or more memories of one or more providers of authentication services for mobile-related internet transactions, the data including authentication parameters associated to dynamic credentials authentication rules and one or more identifiers related to the user and the one or more authentication services. FIG. 2 shows an exemplary embodiment where the hash($AC_{S1}$) and the hash (Device ID & $AC_{S1}$), stored in the multilayer security system database of service provider 1, may be used as identifiers related to the user and to the authentication service $S_1$. As detailed below, in the embodiment of FIG. 2 the hash(Device ID & $AC_{S1}$) is received, together with the dynamic authentication credentials, from the transaction terminal in the multilayer security system database of service provider 1 in the context of a mobile-related internet transaction and it is used as identifier related to the user and to the authentication service $S_1$.

In step (14) the mobile device application uses input data to generate dynamic authentication credentials for authenticating a given mobile-related internet transaction associated to $S_1$ and in step (15') the dynamic authentication credentials are wirelessly sent (e.g. scenario A of FIG. 1) in the context of the internet transaction to the multilayer security system, that receives them.

As referred to in FIG. 1, the mobile-generated dynamic authentication credentials may also be sent e.g. according to scenarios B, C, or D to the multilayer security system of service provider 1, in the context of the internet transaction. These possibilities are also illustrated in FIG. 2 as alternative step (15").

The data sent by the mobile device and received in the multilayer security system from the transaction terminal in step (15') or (15") also comprises the hash(Device ID & $AC_{S1}$), to be able to match in step (16) at the multilayer security system of service provider 1 the mobile-related internet transaction, with the right customer reference(s) and with the rest of the related data and parameters into the database of service provider 1. Upon said matching the set of dynamic authentication credentials may be authenticated in step (17) using the appropriate keys, parameters and input data, as well as the authentication rules and associated parameters for $S_1$ authentication service.

So the multilayer security system of service provider 1 receives mobile-related internet transaction data associated to $S_1$ and in step (16) match the mobile-related internet transaction with the right customer references(s) by using one or more processing devices having access to at least a portion of the data into the database (FIG. 2) of the multilayer security system of service provider 1. According to some embodiments the matching is performed by using the above referred hash(Device ID & $AC_{S1}$) value (but as may be obvious for those skilled in the art, other identifiers could be used for the purpose).

In step (17) the dynamic authentication credentials are authenticated by the security module of the multilayer security system of service provider 1, by using one or more processing devices having access to at least a portion of the data into the database of the multilayer security system of service provider 1. The authentication of the dynamic authentication credentials is based on the authentication rules ($S_{1R}$) and associated authentication parameters defined for said service $S_1$ and for the user's mobile device, as illustrated in FIG. 2.

In step (18) the result of the authentication of the dynamic authentication credentials is sent to the entity is charge to authorize or deny the mobile-related internet transaction, and in step (19) the mobile-related internet transaction is authorized or denied by said entity based upon receiving and processing that authentication result. In the particular embodiment of FIG. 2, the entity authorizing or denying the mobile-related internet transaction is the service provider 1, by using its legacy system.

According to some implementations the authorization or denial of the internet transaction may also depend on the authentication of other credentials that may be comprised into internet transaction data or may also be based on other additional transaction acceptance or denial criteria (e.g. risk criteria defined by the entity authorizing or denying the mobile-related internet transaction).

According to some implementations the above referred authorization or denial of the mobile-related internet transaction only refers to the part of the transaction that falls in the domain of the referred entity (service provider 1 in the example illustrated in FIG. 2); if that part is authorized by said entity, the internet transaction progress to the next step for further processing until completion.

Figure 3:
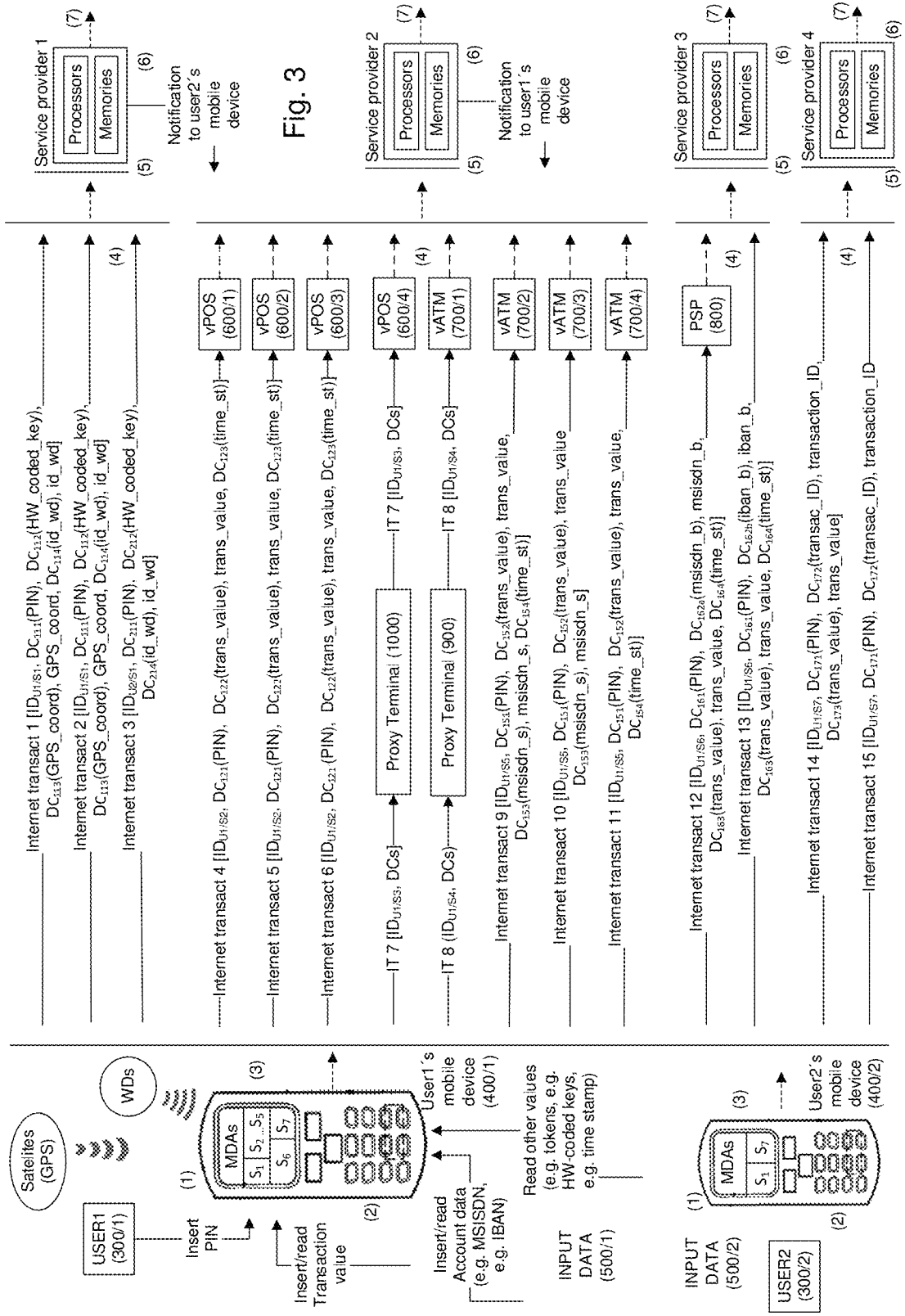
FIG. 3 is a schematic diagram illustrating methods and apparatus according to some implementations to authenticate mobile-related internet transactions by one or more service providers, where a detailed description is provided in connection to the use of a mobile device that generates dynamic authentication credentials and a transaction terminal that transmits at least part of the dynamic authentication credentials.

FIG. 3 illustrates part of an implementation to authenticate mobile-related internet transactions by use of one or more processing devices, where the transactions are authenticated upon a set of individual authentications of user's mobile device generated dynamic authentication credentials, each dynamic authentication credential associated to a given individual input data. This implementation is associated with the use of a mobile device that generates dynamic authentication credentials to be used for internet transactions and a transaction terminal that transmits at least part of the dynamic authentication credentials.

FIG. 3 first illustrates a first mobile device with several mobile device applications (MDAs) where:

A first mobile device application has been personalized to generate dynamic authentication credentials for $S_1$ authentication service.

A second mobile device application has been personalized to generate dynamic authentication credentials for $S_2$ to $S_5$ authentication services.

A third mobile device application has been personalized to generate dynamic authentication credentials for $S_6$ authentication service.

A fourth mobile device application has been personalized to generate dynamic authentication credentials for $S_7$ authentication service.

FIG. 3 also illustrates a second mobile device with several mobile device applications where:

A first mobile device application has been personalized to generate dynamic authentication credentials for $S_1$ authentication service.

A second mobile device application has been personalized to generate dynamic authentication credentials for $S_7$ authentication service.

The registration for those services and the personalization of those mobile device applications in the first and second mobile device respectively may be performed for $S_1$ to $S_7$ authentication services by following a process equivalent to the one described in FIG. 2 in connection to $S_1$ authentication service and the referred mobile device application.

FIG. 3 shows in step (1) the process of receiving in a mobile device input data from different sources, and the mobile device uses at least part of the input data received to generate in step (2) dynamic authentication credentials for a given mobile-related internet transaction.

According to some implementations the mobile device receives a PIN that is used as input data to calculate a first dynamic authentication credential. According to some implementations the PIN is stored in a memory of the mobile device and subsequently deleted from the memory after the conclusion of the first dynamic authentication credential generation. According to some implementations the PIN is a biometric-PIN that is stored in a memory associated to the mobile device, and the mobile device using it as input data to calculate the first dynamic authentication credential requires a previous successful verification by the mobile device of user's fingerprint data captured by the mobile device.

According to some implementations, the mobile device generates said first dynamic authentication credential that uses as input data a user's Personal Identification Number (PIN) and the mobile device also generates one or more additional dynamic authentication credentials, each one calculated by the mobile device upon a different input data. The first and the one or more additional dynamic authentication credentials are sent in step (3) from the mobile device to a transaction terminal that transmits the first dynamic authentication credential and one or more of the one or more dynamic authentication credentials to one or more servers of one or more providers of authentication services for internet transactions.

According to some implementations the input data used to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number. As illustrated in FIG. 3, the mobile device may read, e.g. from an NFC proxy terminal (1000) the transaction amount input data; alternatively, the transaction amount input data may be inserted by the user in the mobile device via e.g. a virtual keyboard displayed by the mobile device application; also, other transaction related values (e.g. a merchant ID or account number) may the used as input data. As also illustrated, the mobile device application may use a timestamp of the current data/time/zone as input data. An ID of the mobile device or an ID of a Wireless Device (such as a WiFi, Bluetooth, BLE, ZigBee or NFC device) or an ID representing that the mobile device is present in a given special area (defined by the coverage of a set of Wireless Devices) may also be used as input data. Also geographical coordinates obtained by processing signals from satellites, or an ID representing that the mobile device is located within the boundaries of a defined geo-area may be used as input data. Input data may also be keys or values hard-coded in the mobile device application, as well as tokens stored in the mobile device application data base. Also account numbers (such as for example an IBAN or a PAN), an identifier of the mobile device (e.g. the MSISDN) or an email may be used as input data.

According to some implementations the input data used to calculate an additional dynamic authentication credential, or a derivative of the input data, has been previously received by the mobile device from the one or more providers of authentication services and stored in a memory of the mobile device. The mobile device application that calculates the dynamic authentication credentials may contain data that can be used as input data for dynamic authentication credentials calculations, those data been e.g. embedded into the mobile device application or e.g. having been received by the mobile device application during a (pre) personalization process or e.g. during the application life cycle or e.g. in the context of a given internet transaction. According to some implementations a key or value that is hard-coded in the mobile device application is used as input data. According to some implementations one or more tokens have been received by the mobile device application from the one or more providers of authentication services and are stored in a memory of the mobile device, and one of those tokens is used as input data to calculate an additional dynamic authentication credential for a given mobile-related internet transaction. According to same implementation the tokens received by the mobile device are ciphering and they are deciphered before been used as input data.

According to some implementations an input data based derivative of a dynamic authentication credential calculated by the one or more providers of authentication services is received by the mobile device and stored in a memory, and the mobile device generates the dynamic authentication credential using the input data. In a particular example one or more single use tokens have been generated by the one or more providers of authentication services and derivatives based on e.g. the user's PIN are later calculated and sent to the mobile device; the user PIN will be required as input data by the mobile device application to use one or those tokens as the first dynamic authentication credential for a given mobile related internet transaction. In other example the derivatives are calculated upon a different input data, said input data been later required by the mobile device application to use one or those tokens as an additional dynamic authentication credential for a given mobile related internet transaction.

As already mentioned, FIG. 3 illustrates several mobile device applications into a first mobile device sending dynamic authentication credentials related to different mobile-related internet transactions; and also several mobile device applications into a second mobile device sending dynamic authentication credentials related to different mobile-related internet transactions. In connection to a given mobile-related internet transaction, in step (3) the dynamic authentication credentials are sent to a transaction terminal that transmits at least part of them in step (4) to one or more servers of one or more providers of authentication services for internet transactions.

In all the 15 mobile-related internet transactions of FIG. 3 it is illustrated the process of sending the first dynamic authentication credential (that uses a user's PIN as input data), the one or more additional dynamic authentication credentials (each one calculated by the mobile device upon a different input data), and at least one identifier related to the user and to the authentication service the dynamic authentication credentials relates to (referenced in the graphic as $ID_{Ui/Sj}$), to the transaction terminal that transmits said first dynamic authentication credential, one or more of the one or more additional dynamic authentication credentials, and at least one of the identifiers received, to one or more servers of one or more providers of authentication services for internet transactions. The sending of the referred internet transaction data to the transaction terminal may be performed e.g. via an electronic transmission (e.g. sending internet transaction 12 data via an https mobile telephone connection; e.g. sending IT 7 data to the Proxy Terminal (1000) via NFC and the Proxy Terminal (1000) sending the data to the vPOS(600/4) via a fixed line connection) or through a manual input of the data into the transaction terminal (e.g. sending internet transaction 4 data to the VPOS(600/1), by manual input through the keyboard of the PC where the transaction is being performed, of the dynamic authentication credentials and the $ID_{U1/S2}$).

- In internet transaction 1 the $ID_{U1/S1}$ is sent as identifier related to User 1 and to $S_1$ authentication service; it is also sent the first dynamic authentication credential $DC_{111}$(PIN) generated by the first mobile device application in the first mobile device by using as input data the user's PIN selected for said application and for $S_1$. The additional dynamic authentication credentials $DC_{112}$(HW_coded_key), $DC_{113}$(GPS_coord) and $DC_{114}$(id_wd) are also sent, together with the input data used to calculate the last two dynamic authentication credentials (GPS_coord and id_wd).
- Internet transaction 2 has the same structure than internet transaction 1 (obviously, the GPS coordinates and the wireless device ID input data refers to the context of internet transaction 2).
- In internet transaction 3, $ID_{U2/S1}$ is sent as identifier related to User 2 and to $S_1$ authentication service. A dynamic credential that uses GPS coordinates as input data is not used in the transaction. The wireless device ID input data refers to the context of internet transaction 3.
- Internet transactions 4 to 6 use $ID_{U1/S2}$ as identifier related to User 1 and to $S_2$ authentication service. In those transactions, the first dynamic authentication credential $DC_{121}$(PIN) is generated by the second mobile device application in the first mobile device by using as input data the user's PIN selected for said application and for $S_2$; the transaction value and a time stamp are respectively used as input data to calculate $DC_{122}$ and $DC_{123}$ in each one of those transactions (the transaction value and the time stamp input data obviously relates to the context of each transaction). In a particular example the transaction value is displayed from the vPOS to the user via e.g. the display of the PC where the transaction is being performed, and then inputted by the user in the mobile device to generate $DC_{122}$, so there is no need to later sent said transaction value from the mobile device to the transaction terminal.
- In internet transaction 7, $ID_{U1/S3}$ identifier (related to User 1 and to $S_3$ authentication service), the first dynamic authentication credential and the one or more additional dynamic authentication credentials, each one calculated by the mobile device upon different input data, are sent to a first transaction terminal (Proxy Terminal 1000) that sends those data to a second transaction terminal (Virtual POS 600/4), that transmits at least part of those data to one or more servers of one or more providers of authentication services for internet transactions (to service provider 2 in the example illustrated in FIG. 3).
- In internet transaction 8, $ID_{U1/S4}$ identifier (related to User 1 and to $S_4$ authentication service), the first dynamic authentication credential and the one or more additional dynamic authentication credentials, each one calculated by the mobile device upon different input data, are sent to a first transaction terminal (Proxy Terminal 900) that sends those data to a second transaction terminal (Virtual ATM 700/1), that transmits at least part of those data to one or more servers of one or more providers of authentication services for internet transactions.
- In internet transaction 9 the $ID_{U1/S5}$ is sent as identifier related to User 1 and to $S_5$ authentication service; it is also sent the first dynamic authentication credential $DC_{151}$(PIN) generated by the second mobile device application in the first mobile device by using as input data the user's PIN selected for said application and for $S_5$. The additional dynamic authentication credentials $DC_{152}$(trans_value), $DC_{153}$(msisdn_s) and $DC_{154}$(time_st) are also sent, together with the input data transaction value and msisdn of the sender, used to calculate $DC_{152}$, and $DC_{153}$.
- Internet transaction 10 has a similar structure than internet transaction 9 but $DC_{154}$(time_st) is not used (obviously, the msisdn of the sender and the transaction value input data refers to the context of internet transaction 10).
- Internet transaction 11 has a similar structure than internet transaction 9 but $DC_{153}$(msisdn_s) and the related input data are not used (obviously, the transaction value input data refers to the context of internet transaction 11).
- In internet transaction 12, $ID_{U1/S6}$ is sent as identifier related to User 1 and to $S_6$ authentication service; it is also sent the first dynamic authentication credential $DC_{161}$(PIN) generated by the third mobile device application in the first mobile device by using as input data the user's PIN selected for said application and for $S_6$. The additional dynamic authentication credentials $DC_{162a}$(msisdn_d), $DC_{163}$(trans_value) and $DC_{164}$(time_st) are also sent, together with the msisdn of the beneficiary and the transaction value input data used to calculate $DC_{162a}$ and $DC_{163}$ respectively.
- In internet transaction 13, $ID_{U1/S6}$ is sent as identifier related to User 1 and to $S_6$ authentication service; it is also sent the first dynamic authentication credential $DC_{161}$(PIN) generated by the third mobile device application in the first mobile device by using as input data the user's PIN selected for said application and for $S_6$. The additional dynamic authentication credentials $DC_{162b}$(iban_b), $DC_{163}$(trans_value) and $DC_{164}$(time_st) are also sent, together with the iban (international bank account number) of the beneficiary and the transaction value input data used to calculate $DC_{162b}$ and $DC_{163}$ respectively.
- In internet transaction 14, $ID_{U1/S7}$ is sent as identifier related to User 1 and to $S_7$ authentication service; it is also sent the first dynamic authentication credential $DC_{171}$(PIN) generated by the fourth mobile device application in the first mobile device by using as input data the user's PIN selected for said application and for $S_7$. The additional dynamic authentication credentials $DC_{172}$(transaction_ID) and $DC_{173}$(trans_value) are also sent, together with the transaction ID and the transaction value input data used to calculate $DC_{172}$ and $DC_{173}$ respectively (this is optional as the transaction ID and the transaction value are known by the one or more providers of authentication services, as explained in FIG. 7).

In internet transaction 15, $ID_{U1/S7}$ is sent as identifier related to User 1 and to $S_7$ authentication service; it is also sent the first dynamic authentication credential $DC_{171}(PIN)$ generated by the fourth mobile device application in the first mobile device by using as input data the user's PIN selected for said application and for $S_7$. The additional dynamic authentication credential $DC_{172}(transac\_ID)$ is also sent together (optionally) with the related transaction ID input data.

In the above examples the $ID_{Ui/Sj}$ relates to User i and to $S_j$ authentication service. Further, different examples are provided in this invention about an $ID_{Ui/Sj}$ being also associated to a user's mobile device; associated to a given product associated to $S_j$; associated to more than one authentication service and the one or more providers of authentication services identify the adequate service depending e.g. on the channel where the transaction is received from; associated to a given $S_j$ related mobile device application in the user's mobile device; etc.; as defined by the one or more providers of authentication services to achieve the purpose to match a received mobile-related internet transaction with the right customer reference(s) and data to authenticate the mobile-related internet transaction.

According to some implementations the transaction terminal that transmits the first dynamic authentication credential, one or more of the one of more additional dynamic authentication credentials, and at least one of the identifiers received, is the mobile device that generates the dynamic authentication credentials. Internet transactions 1 to 3 and 13 to 15 into FIG. 3 are particular examples of these implementations.

The sending of the referred internet transaction data to the one or more providers of authentication services is typically performed via an electronic transmission, but can also be made through a manual input of the data. In a particular example of an off-line mode of operation the transaction ID for internet transaction 15 has been displayed to the user via a web interface of service provider 4, the user then input the transaction ID input data and the PIN for the mobile device generating $DC_{172}$ and $DC_{171}$, and the dynamic authentication credentials and the $ID_{U1/S7}$ are manually inputted by the user in the web interface of service provider 4, that transmits the data to the multilayer security system of service provider 4 for authentication.

According to some implementations part of the one or more additional dynamic authentication credentials generated by the mobile device and sent by the mobile device to the transaction terminal are not transmitted by the transaction terminal to the one or more servers of the one or more providers of authentication services. In a particular example the additional dynamic authentication credential $DC_{122}$ (trans_value), generated by the mobile device using the internet transaction value as input data, is received by the Virtual POS (vPOS(600/3)) in the context of internet transaction 6, but the Virtual POS does not transmit that additional dynamic authentication credential to the one or more servers of a provider of authentication services for internet transactions. In other particular example the additional dynamic authentication credentials $DC_{122}(trans\_value)$ and $DC_{123}(time\_st)$, generated by the mobile device using the internet transaction value and a time stamp as input data respectively, are received by the Virtual POS (vPOS (600/3)) in the context of internet transaction 6, but the Virtual POS does not transmit those two additional dynamic authentication credentials to the one or more servers of a provider of authentication services for internet transactions.

According to some implementations a notification is received by the mobile device from the one or more providers of authentication services, the notification related to modifying the configuration of the mobile device to make an additional dynamic authentication credential being successfully authenticated in successive mobile-related internet transactions. As a particular example, if an additional dynamic authentication credential uses a time stamp as input data and the one or more providers of authentication services identifies that the user's mobile device is not synchronized with the date/time/zone of the mobile telephone network, a notification is sent to the user's mobile device for the purpose of increasing the security in successive mobile-related internet transactions. In a particular example, $DC_{123}$ (time_st) is received by service provider 2 from vPOS (600/1) in the context of internet transaction 4, and a notification is sent to the user1's mobile device from service provider 2 upon service provider 2 determining that the user1's mobile device is not synchronized with the date/time/zone of the mobile telephone network. User1's mobile device receives the notification and user1 is prompted to adjust the date/time/zone settings of the mobile device to be synchronized with the one of the mobile telephone network. Within this example $DC_{123}(time\_st)$ of internet transaction 5 has already being generated by the mobile device with the adjusted settings and $DC_{123}(time\_st)$ is successfully authenticated by service provider 2.

According to some implementations the set of one or more additional dynamic authentication credentials generated by the mobile device, sent by the mobile device to the transaction terminal and at least partly transmitted by the transaction terminal to the one or more servers of one or more providers of authentication services in connection to a first mobile-related internet transaction associated to a first authentication service is different than the set of one or more additional dynamic authentication credentials generated by the mobile device, sent by the mobile device to the same or to another transaction terminal and at least partly transmitted by the transaction terminal to the one or more servers of one or more providers of authentication services in connection to a second mobile-related internet transaction associated to a second authentication service. As illustrated in FIG. 3 in connection to internet transaction 4 (associated to user1 and authentication service $S_2$), the additional dynamic authentication credentials are $DC_{122}(trans\_value)$ and $DC_{123}(time\_st)$, while in connection to internet transaction 9 (associated to user 1 and authentication service $S_5$), the additional dynamic authentication credentials are $DC_{152}(trans\_value)$, $DC_{153}(msisdn\_s)$ and $DC_{154}(time\_st)$.

According to some implementations the set of one or more additional dynamic authentication credentials generated in a first mobile device with a first personalization and/or configuration, sent by the mobile device to a transaction terminal and at least partly transmitted by the transaction terminal to the one or more servers of one or more providers of authentication services in connection to a first mobile-related internet transaction associated to a first authentication service is different than the set of one or more additional dynamic authentication credentials generated in a second mobile device with a second personalization and/or configuration, sent by the mobile device to a transaction terminal and at least partly transmitted by the transaction terminal to the one or more servers of one or more providers of authentication services in connection to a second mobile-related internet transaction associated to the first authentication service. As a particular example, the personalization and configuration of the first mobile device application into User1's mobile device is such that $DC_{112}$(HW_coded_key), $DC_{113}$(GPS_coord) and $DC_{114}$(id_wd) additional dynamic authentication credentials are generated by said first mobile device application in connection to $S_1$ authentication service (FIG. 3 illustrates it in the context of internet transaction 2); while the personalization and configuration of the first mobile device application into User2's mobile device is such that only $DC_{212}$(HW_coded_key) and $DC_{214}$(id_wd) additional dynamic authentication credentials are generated by said first mobile device application in connection to $S_1$ authentication service (FIG. 3 illustrates it the context of internet transaction 3)

According to some implementations a notification is received by the mobile device from the one or more providers of authentication services, the notification related to modifying the personalization and/or configuration of the mobile device for the mobile device to generate more additional dynamic authentication credentials associated to a given authentication service, each one calculated by the mobile device upon different input data, in successive mobile-related internet transactions. As a particular example, FIG. 3 illustrates a notification being sent from the multilayer security system of service provider 1 to user2's mobile device suggesting user2 to update the first mobile device application. Upon the notification being received in the mobile device and read by the user, if user2 wants to proceed with the updating he/she will be prompted to insert the user2's PIN selected for the first mobile device application and for $S_1$. The updating request will be authenticated by the multilayer security system of service provider 1 and upon a successful authentication the first mobile device application will be re-personalized and reconfigured (e.g. via a process similar to the one described in steps 11 to 13 of FIG. 2) for user2's mobile device also generating $DC_{113}$ (GPS_coord) and transmitting it and the related GPS_coord input data in successive mobile-related internet transactions associated to $S_1$ authentication service.

In connection to a given mobile-related internet transaction, in step (3) the dynamic authentication credentials, and at least one identifier related to the user and to the authentication service the dynamic authentication credential relates to, are sent to a transaction terminal that transmits in step (4) at least part of the dynamic authentication credentials and at least one of the identifiers received to one or more servers of one or more providers of authentication services for internet transactions.

In step (5) the dynamic authentication credentials and the at least one identifier transmitted by the transaction terminal are received in the one or more servers of a provider of authentication services for internet transactions that in step (6) authenticates the first dynamic authentication credential and further authenticates, based on authentication rules and associated authentication parameters, one or more of the one or more additional dynamic authentication credentials by one or more processing devices having access to at least a portion of data capable of linking the mobile device to one or more authentication services for internet transactions. In step (7) the result of the authentication of the first dynamic authentication credential and the one or more of the one or more additional dynamic authentication credentials is sent to the entity in charge to authorize or deny the mobile related internet transaction, and the mobile-related internet transaction being authorized or denied based upon that authentication result, where the transaction being authorized always requires a successful result of the authentication of the first dynamic authentication credential. Steps (4) to (7) are further detailed in embodiments detailed herein below.

Figure 4:
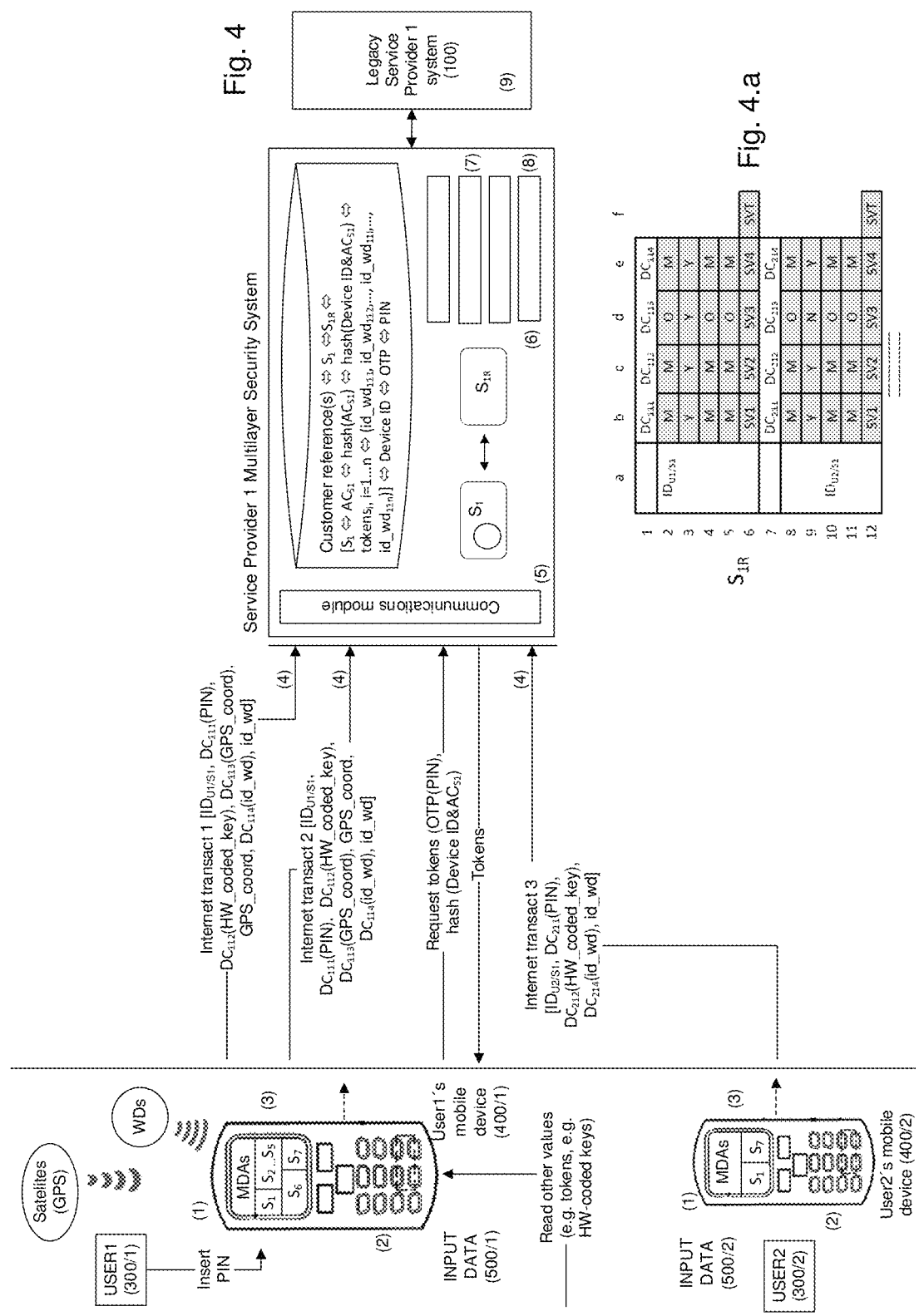
FIG. 4.*a* shows some scenarios related to the definition of dynamic credentials authentication rules and associated authentication parameters for a given authentication service ($S_1$).

FIG. 4.*a* illustrates part of an embodiment related to the definition of the dynamic credentials authentication rules ($S_{1R}$) and associated authentication parameters for authentication service $S_1$, those parameters being stored in one or more memories of the multilayer security system of service provider 1 in association with other $S_1$ related data (FIG. 4).

The storage is represented in FIG. 4.*a* as a table with different fields associated to $S_{1R}$, to the $ID_{Ui/S1}$ and to the dynamic authentication credentials (DCs) related to $S_1$ authentication service. The fields into the table may have different values as follows (the table only illustrates the fields related to user1 and user2 but the table would contain equivalent fields for user3, . . . user(i), . . . user(n)):

Fields in [rows 2, 8, 14, 20, . . . ; columns b, c, d, e] relates to whether it is Mandatory (M) or Optional (O) to personalize and/or configure the mobile device application associated to $ID_{Ui/S1}$ to generate the dynamic authentication credential the column into the table refers to.

In relation to $ID_{U1/S1}$ the table indicates that when the first mobile device application into the first mobile device is personalized in connection $S_1$, the personalization and/or configuration of the application must be such it will always generate for $S_1$ mobile-related internet transactions the dynamic authentication credentials $DC_{111}$ (value M in (2, b)), $DC_{112}$ (value M in (2, c)) and $DC_{114}$ (value M in (2, e)). The value into the field (2, d) is optional, meaning that it is allowed to personalize and/or configure said first mobile device application into the first mobile device to generate or not $DC_{113}$ for $S_1$ mobile-related internet transactions, depending e.g. on a user1 selection during the registration process for $S_1$ service in said first mobile device or e.g. on a configuration criteria of service provider 1 for that user at that time.

In relation to $ID_{U2/S1}$ the table indicates that when the first mobile application into the second mobile device is personalized in connection $S_1$, the personalization and/or configuration of the application must be such it will always generate for $S_1$ mobile-related internet transactions the dynamic authentication credentials $DC_{211}$ (value M in (8, b)), $DC_{212}$ (value M in (8, c)) and $DC_{214}$ (value M in (8, e)). The value into the field (8, d) is optional, meaning that it is allowed to personalize and/or configure said first mobile device application into the second mobile device to generate or not $DC_{213}$ for $S_1$ mobile-related internet transactions, depending e.g. on a user2 selection during the registration process for $S_1$ service in said second mobile device or e.g. on a configuration criteria of service provider 1 for that user at that time.

Etc.

Fields in [rows 3, 9, 15, 21, . . . ; columns b, c, d, e] relates to whether the mobile device application associated to $ID_{Ui/S1}$ has been personalized and/or configured, or not, to generate the dynamic authentication credential the column into the table refers to.

In relation to $ID_{U1/S1}$ the table indicates that the first mobile device application into the first mobile device has been personalized and/or configured to always generate for $S_1$ mobile-related internet transactions the dynamic authentication credentials $DC_{111}$, $DC_{112}$ and $DC_{114}$ (value Y=YES in fields (3,b), (3, c) and (3, e)). The value (Y) into the field (3, d) indicates that the first mobile device application into the first mobile device has been personalized and/or configured to always generate for $S_1$ mobile-related internet transactions the dynamic authentication credential $DC_{113}$ (it was an optional possibility).

In relation to $ID_{U2/S1}$ the table indicates that the first mobile device application into the second mobile device has been personalized and/or configured to always generate for $S_1$ mobile-related internet transactions the dynamic authentication credentials $DC_{211}$, $DC_{212}$ and $DC_{214}$ (value Y=YES in fields (9,b), (9, c) and (9, e)). The value (N=NOT) into the field (9, d) indicates that the first mobile device application into the second mobile device has been personalized and/or configured to not generate for $S_1$ mobile-related internet transactions the dynamic authentication credentials $DC_{213}$ (it was an optional possibility).

Etc.

Fields in [rows 4, 10, 16, 22, . . . ; columns b, c, d, e] relates to whether receiving from the transaction terminal in the multilayer security system of service provider 1 the dynamic authentication credential the column into the table refers to is Mandatory (M) to successfully authenticate the mobile related internet transaction associated to $ID_{Ui/S1}$ or it is only Optional (O).

In relation to $ID_{U1/S1}$ the table indicates that receiving from the transaction terminal $DC_{111}$, $DC_{112}$ and $DC_{114}$ in the multilayer security system of service provider 1 is Mandatory (value M in fields (4, b), (4, c) and (4, e)), and receiving $DC_{113}$ is Optional (value O in field (4, d), to successfully authenticate the mobile related internet transaction associated to $ID_{U1/S1}$.

In relation to $ID_{U2/S1}$ the table indicates that receiving from the transaction terminal $DC_{211}$, $DC_{212}$ and $DC_{214}$ in the multilayer security system of service provider 1 is Mandatory (value M in fields (10, b), (10, c) and (10, e)), and receiving $DC_{213}$ is Optional (value O in field (10, d), to successfully authenticate the mobile related internet transaction associated to $ID_{U2/S1}$.

Etc.

Fields in [rows 5, 11, 17, 23, . . . ; columns b, c, d, e] relates to whether obtaining a successful result of the authentication in the multilayer security system of service provider 1 of the dynamic authentication credential the column into the table refers to, is Mandatory (M) to obtain an overall successful result of the authentication of the mobile related internet transaction associated to $ID_{Ui/S1}$ or it is only Optional (O).

In relation to $ID_{U1/S1}$ the table indicates that obtaining a successful result of the authentication in the multilayer security system of service provider 1 of $DC_{111}$, $DC_{112}$ and $DC_{114}$ is Mandatory (value M in fields (5, b), (5, c) and (5, e)), and obtaining a successful result of the authentication of $DC_{113}$ is Optional (value O in field (5, d)), to obtain an overall successful result of the authentication of the mobile related internet transaction associated to $ID_{U1/S1}$.

In relation to $ID_{U2/S1}$ the table indicates that obtaining a successful result of the authentication in the multilayer security system of service provider 1 of $DC_{211}$, $DC_{212}$ and $DC_{214}$ is Mandatory (value M in fields (11, b), (11, c) and (11, e)), and obtaining a successful result of the authentication of $DC_{213}$ is Optional (value O in field (11, d), to obtain an overall successful result of the authentication of the mobile related internet transaction associated to $ID_{U2/S1}$.

Etc.

In the context of FIG. 4.a and FIG. 4 each dynamic authentication credential has a security valuation (SV) named SV1, SV2, SV3 and SV4 that is in association with the related $ID_{Ui/S1}$. In this embodiment the SV1 of the first dynamic authentication credential (e.g. $DC_{111}$ associated to $ID_{U1/S1}$) is higher than the security valuation of any other of the additional dynamic authentication credential (e.g. $DC_{112}$, $DC_{113}$ or $DC_{114}$). In a particular example SV1=100 (because a PIN is used to calculate the first dynamic authentication credential)>SV2=50 (because a well-protected hard-coded key serves to generated an strong authentication of the mobile device application into the mobile device)>SV4=35 (because the context associated to a wireless device offers good accuracy about the internet transaction context)>SV3=15 (because the GPS coordinates associated to the transaction offers a less precise indication of the transaction context).

When one or more processing devices of the multilayer security system of service provider 1 authenticate the first dynamic authentication credential and one or more of the one or more additional dynamic authentication credentials received in the context of a given mobile-related internet transaction, a result of the authentication is generated.

Upon said result, the one of more processing devices may also calculate a security valuation for that particular internet transaction as e.g. sum of the security valuations of the dynamic authentication credentials successfully authenticated. In a particular example $DC_{112}$, $DC_{113}$ and $DC_{114}$ are received in the context of a given mobile-related internet transaction and all the received dynamic credentials are successfully authenticated, so in the example above the security valuation total (SVT) is 200 (100+50+35+15). In other particular example only $DC_{211}$, $DC_{212}$ and $DC_{214}$ are received in the context of another given mobile-related internet transaction and all the received dynamic credentials are successfully authenticated so in the example above the security valuation total (SVT) is 185 (100+50+35). The security valuation values (SV1, SV2, SV3, SV4 and SVT) may be stored (fields in [rows 6, 12, 18, 24, . . . ; columns b, c, d, e and f]) in connection to the associated mobile-related internet transaction such that e.g. statistics may be generated in connection to transactions associated to $ID_{Ui/S1}$ or to the total of $S_1$ internet transactions. The statistics may also serve to e.g. compare the security achieved with this system with the one obtained by using other systems for internet transactions.

Figure 5:
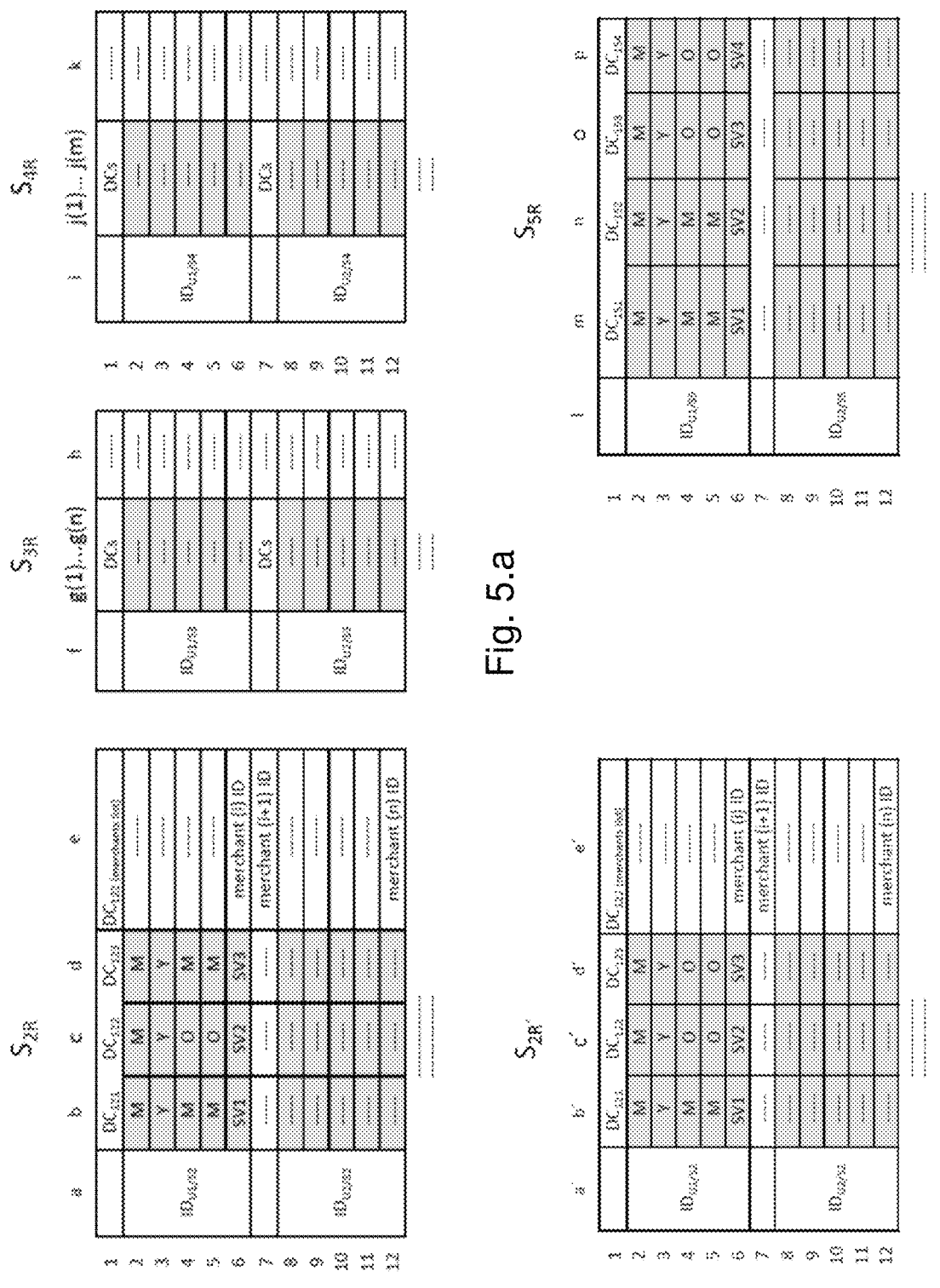

FIG. 5.a illustrates part of an embodiment related to the definition of the dynamic credentials authentication rules ($S_{2R}/S_{2R'}$, $S_{3R}$, $S_{4R}$, $S_{5R}$) and associated authentication parameters for authentication services ($S_2$, $S_3$, $S_4$, $S_5$) respectively, those parameters being stored in one or more memories of the multilayer security system of service provider 2 in association with other ($S_2$, $S_3$, $S_4$, $S_5$) related data (see FIG. 5).

The storage is represented in FIG. 5.a as a set of tables with different fields associated to $S_{jR}$=2 to 5), to the related $ID_{Ui/Sj}$ and to the dynamic authentication credentials (DCs) related to each of the $S_j$ authentication services. The fields into the tables may have different values as follows (the tables only illustrates values into the fields related to user1 but the tables would contain equivalent fields for user2, . . . user(i), . . . user(n); also, for simplicity, details about the values into the fields of tables associated to $S_{3R}$ and $S_{4R}$ are not provided as those values and fields may be similar to the ones described in connection to other $S_{jR}$ tables in this specification):

Fields in [rows 2, 8, 14, 20, . . . ; columns b, c, d], [rows 2, 8, 14, 20, . . . ; columns g(1) to g(n)], [rows 2, 8, 14, 20, . . . ; columns j(1) to j(m)], [rows 2, 8, 14, 20, . . . ; columns m, n, o, p] relates to whether it is Mandatory (M) or Optional (O) to personalize and/or configure the mobile device application associated to the related $S_j$ and $ID_{Ui/Sj}$ to generate/be able to generate the dynamic authentication credential the column into the table refers to.

In relation to $ID_{U1/S2}$ the table associated to $S_{2R}$ indicates that when the second mobile application into the first mobile device is personalized in connection $S_2$, the personalization and/or configuration of the application must be such it will always generate for $S_2$ mobile-related internet transactions the dynamic authentication credentials $DC_{121}$ (value M in (2, b)), $DC_{122}$ (value M in (2, c)) and $DC_{123}$ (value M in (2, d)).

In relation to $ID_{U1/S5}$ the table associated to $S_{5R}$ indicates that when the second mobile application into the first mobile device is personalized in connection $S_5$, the personalization and/or configuration of the application must be such it will always be able to generate for $S_5$ mobile-related internet transactions the dynamic authentication credentials $DC_{151}$ (value M in (2, m)), $DC_{152}$ (value M in (2, n)), $DC_{153}$ (value M in (2, o)) and $DC_{154}$ (value M in (2, p)).

Etc.

Fields in [rows 3, 9, 15, 21, . . . ; columns b, c, d], [rows 3, 9, 15, 21, . . . ; columns g(1) to g(n)], [rows 3, 9, 15, 21, . . . ; columns j(1) to j(m)], [rows 3, 9, 15, 21, . . . ; columns m, n, o, p] relates to whether the mobile device application associated to $ID_{Ui/Sj}$ has been personalized and/or configured, or not, to generate/be able to generate the dynamic authentication credential the column into the table refers to.

In relation to $ID_{U1/S2}$ the table associated to $S_{2R}$ indicates that the second mobile device application into the first mobile device has been personalized and/or configured to always generate for $S_2$ mobile-related internet transactions the dynamic authentication credentials $DC_{121}$, $DC_{122}$ and $DC_{123}$ (value Y=YES in fields (3,b), (3, c) and (3, d)).

In relation to $ID_{U1/S5}$ the table associated to $S_{5R}$ indicates that the second mobile device application into the first mobile device has been personalized and/or configured to always be able to generate for $S_5$ mobile-related internet transactions the dynamic authentication credentials $DC_{151}$, $DC_{152}$, $DC_{153}$ and $DC_{154}$ (value Y=YES in fields (3,m), (3, n), (3, o) and (3, p)).

Etc.

Fields in [rows 4, 10, 16, 22, . . . ; columns b, c, d], [rows 4, 10, 16, 22, . . . ; columns g(1) to g(n)], [rows 4, 10, 16, 22, . . . ; columns j(1) to j(m)], [rows 4, 10, 16, 22, . . . ; columns m, n, o, p] relates to whether receiving from the transaction terminal in the multilayer security system of service provider 2 the dynamic authentication credential the column into the corresponding table refers to is Mandatory (M) to successfully authenticate the mobile related internet transaction associated to $ID_{Ui/Sj}$ or it is only Optional (O).

In relation to $ID_{U1/S2}$ the table associated to $S_{2R}$ indicates that receiving from the transaction terminal $DC_{121}$ and $DC_{123}$ in the multilayer security system of service provider 2 is Mandatory (value M in fields (4, b) and (4, d), and receiving $DC_{122}$ is Optional (value O in field (4, c)), to successfully authenticate the mobile related internet transaction associated to $ID_{U1/S2}$.

In relation to $ID_{U1/S5}$ the table associated to $S_{5R}$ indicates that receiving from the transaction terminal $DC_{151}$ and $DC_{152}$ in the multilayer security system of service provider 2 is Mandatory (value M in fields (4, m) and (4, n), and receiving $DC_{153}$ and $DC_{154}$ is Optional (value O in fields (4, o) and (4, p), to successfully authenticate the mobile related internet transaction associated to $ID_{U1/S5}$.

Etc.

Fields in [rows 5, 11, 17, 23, . . . ; columns b, c, d], [rows 5, 11, 17, 23, . . . ; columns g(1) to g(n)], [rows 5, 11, 17, 23, . . . ; columns j(1) to j(m)], [rows 5, 11, 17, 23, . . . ; columns m, n, o, p] relates to whether obtaining a successful result of the authentication in the multilayer security system of service provider 2 of the dynamic authentication credential the column into the table refers to, is Mandatory (M) to obtain an overall successful result of the authentication of the mobile related internet transaction associated to $ID_{Ui/Sj}$ or it is only Optional (O) (in connection to $S_{2R}$ the value (O) associated to the dynamic authentication credentials of column (c) relates to a list of selected merchants, as detailed herein below).

In relation to $ID_{U1/S2}$ the table associated to $S_{2R}$ indicates that obtaining a successful result of the authentication in the multilayer security system of service provider 2 of $DC_{121}$ and $DC_{123}$ is Mandatory (value M in fields (5, b) and (5, d)).

Obtaining a successful result of the authentication of $DC_{122}$ is Optional (value (O) in field (5, c)) as far as the dynamic authentication credential $DC_{122}$ is received in the multilayer security system of service provider 2 from a transaction terminal associated to a merchant into a list of selected merchants (selected merchants list in column (e)), to obtain an overall successful result of the authentication of the mobile related internet transaction associated to $ID_{U1/S2}$.

If the transaction terminal is not associated to a merchant into the referred list of selected merchants, then obtaining a successful result of the authentication of $DC_{122}$ is Mandatory, to obtain an overall successful result of the authentication of the mobile related internet transaction associated to $ID_{U1/S2}$.

Fields into the table $S_{2R'}$ have the same meaning than fields into the table $S_{2R}$ except in that receiving $DC_{123}$ is also Optional (value O in field (4, d')), to successfully authenticate the mobile related internet transaction associated to $ID_{U1/S2}$; and obtaining a successful result of the authentication of $DC_{123}$ is also Optional (value (O) in field (5, d')) as far as the dynamic authentication credential $DC_{123}$ is received in the multilayer security system of service provider 2 from a transaction terminal associated to a merchant into the list of selected merchants (selected merchants list in column (e')), to obtain an overall successful result of the authentication of the mobile related internet transaction associated to $ID_{U1/S2}$.

In relation to $ID_{U1/S5}$ the table associated to $S_{5R}$ indicates that obtaining a successful result of the authentication in the multilayer security system of service provider 2 of $DC_{151}$ and $DC_{152}$ is Mandatory (value M in fields (5, m) and (5, n)), and obtaining a successful result of the authentication of $DC_{153}$ and $DC_{154}$ is Optional (value (O) in fields (5, o) and (5, p)), to obtain an overall successful result of the authentication of the mobile related internet transaction associated to $ID_{U1/S5}$.

Etc.

In the context of FIG. 5.a and FIG. 5 each dynamic authentication credential has a security valuation (SV) named SV1, SV2, etc. in association with the related $ID_{Ui/Sj}$. As already described in connection to FIG. 4.a once the result of the authentication of a given mobile related internet transaction is generated, the one of more processing devices may also calculate a security valuation for that particular internet transaction e.g. as the sum of the security valuations of the dynamic authentication credentials successfully authenticated.

The security valuation values (SV1, SV2, . . . and SVT (not illustrated)) may be stored (fields in [rows 6, 12, 18, 24, . . . ; columns b, c, d], [rows 6, 12, 18, 24, . . . ; columns g(1) to g(n)], [rows 6, 12, 18, 24, . . . ; columns j(1) to j(m)], [rows 6, 12, 18, 24, . . . ; columns m, n, o, p]) in relation to the associated mobile related internet transaction such that e.g. statistics may be generated in connection to transactions associated to $ID_{Ui/Sj}$ or to the total of $S_2$, $S_3$, $S_4$ and $S_5$ mobile-related internet transactions. The statistics may also serve to e.g. compare the security achieved with this system with the one obtained by using other systems for internet transactions.

FIG. 6.a illustrates part of an embodiment related to the definition of the dynamic credentials authentication rules ($S_{6R}$) and associated authentication parameters for authentication service $S_6$, those parameters being stored in one or more memories of the multilayer security system of service provider 3 in association with other $S_6$ related data (see FIG. 6).

The storage is represented in FIG. 6.a as a table with different fields associated to $S_{6R}$, to the $ID_{Ui/S6}$ and to the dynamic authentication credentials (DCs) related to $S_6$ authentication service. The fields into the table may have different values as follows (the table only illustrates the fields related to user1 and user2 but the table would contain equivalent fields for user3, . . . user(i), . . . user(n)):

Fields in [rows 2, 8, 14, 20, . . . ; columns b, c, d, e, f, g] relates to whether it is Mandatory (M) or Optional (O) to personalize and/or configure the mobile device application associated to $ID_{U1/S6}$ to be able to generate the dynamic authentication credential the column into the table refers to.

In relation to $ID_{U1/S6}$ the table indicates that when the third mobile device application into the first mobile device is personalized in connection $S_6$, the personalization and/or configuration of the application must be such it will always be able to generate for $S_6$ mobile-related internet transactions the dynamic authentication credentials $DC_{161}$ (value M in (2, b)), $DC_{162a}$ (value M in (2, c)), $DC_{162b}$ (value M in (2, d)), $DC_{162c}$ (value M in (2, e)), $DC_{163}$ (value M in (2, f)) and $DC_{164}$ (value M in (2, g)).

Etc.

Fields in [rows 3, 9, 15, 21, . . . ; columns b, c, d, e, f, g] relates to whether the mobile device application associated to $ID_{Ui/S6}$ has been personalized and/or configured, or not, to be able to generate the dynamic authentication credential the column into the table refers to.

In relation to $ID_{U1/S6}$ the table indicates that the third mobile device application into the first mobile device has been personalized and/or configured to always be able to generate for $S_6$ mobile-related internet transactions the dynamic authentication credentials $DC_{161}$, $DC_{162a}$, $DC_{162b}$, $DC_{162c}$, $DC_{163}$ and $DC_{164}$ (value Y=YES in fields (3,b), (3, c), (3, d), (3, e), (3, f) and (3, g)).

Etc.

Fields in [rows 4, 10, 16, 22, . . . ; columns b, (c/d/e), f, g] relates to whether receiving from the transaction terminal in the multilayer security system of service provider 3 the dynamic authentication credential the column into the table refers to is Mandatory (M) to successfully authenticate the mobile related internet transaction associated to $ID_{Ui/S6}$ or it is only Optional (O) (the meaning of "M" in connection to columns c/d/e is different, as explained herein below).

In relation to $ID_{U1/S6}$ the table indicates that receiving from the transaction terminal $DC_{161}$, $DC_{163}$ and $DC_{164}$ in the multilayer security system of service provider 3 is Mandatory (value M in fields (4, b), (4, f) and (4, g)), and it is also Mandatory to receive one of $DC_{162a}$, $DC_{162b}$ or $DC_{162c}$ (value M in field (4, (c/d/e)), to successfully authenticate the mobile related internet transaction associated to $ID_{u1/S6}$.

Etc.

Fields in [rows 5, 11, 17, 23, . . . ; columns b, (c/d/e), f, g] relates to whether obtaining a successful result of the authentication in the multilayer security system of service provider 3 of the dynamic authentication credential the column into the table refers to, is Mandatory (M) to obtain an overall successful result of the authentication of the mobile related internet transaction associated to $ID_{Ui/S6}$ or it is only Optional (O).

In relation to $ID_{U1/S6}$ the table indicates that obtaining a successful result of the authentication in the multilayer security system of service provider 3 of $DC_{161}$, $DC_{163}$ and $DC_{164}$ is Mandatory (value M in fields (5, b), (5, f) and (5, g)), and it is also mandatory to obtain a successful result of the authentication of one of $DC_{162a}$, $DC_{162b}$ or $DC_{162c}$ (value M in field (5, (c/d/e)), to obtain an overall successful result of the authentication of the mobile related internet transaction associated to $ID_{U1/S6}$.

Etc.

In the context of FIG. 6.a and FIG. 6 each dynamic authentication credential has a security valuation (SV) named SV1, SV2 (shared between $DC_{162a}$, $DC_{162b}$ and $DC_{162c}$ for a given internet transaction, because only one of them is received in the context of said given mobile related internet transaction associated to $S_6$), SV3 and SV4, in association with the related $ID_{Ui/S6}$. As already described in connection e.g. to FIG. 4.a once the result of the authentication of a given mobile related internet transaction is generated, the one of more processing devices may also calculate a security valuation for that particular internet transaction e.g. as the sum of the security valuations of the dynamic authentication credentials successfully authenticated.

The security valuation values (SV1, SV2, SV3, SV4 and SVT) may be stored (fields in [rows 6, 12, 18, 24, . . . ; columns b, (c/d/e), f, g]) in connection to the associated mobile related internet transaction such that e.g. statistics may be generated in connection to transactions associated to $ID_{Ui/S6}$ or to the total of $S_6$ mobile-related internet transactions. The statistics may also serve to e.g. compare the security achieved with this system with the one obtained by using other systems for internet transactions.

FIG. 7.a illustrates part of an embodiment related to the definition of the dynamic credentials authentication rules ($S_{7R}$) and associated authentication parameters for authentication service $S_7$, those parameters being stored in one or more memories of the multilayer security system of service provider 4 in association with other $S_7$ related data (see FIG. 7).

The storage is represented in FIG. 7.a as a table with different fields associated to $S_{7R}$, to the $ID_{Ui/S7}$ and to the dynamic authentication credentials (DCs) related to $S_7$ authentication service. The fields into the table may have different values as follows (the table only illustrates the fields related to user1 and user2 but the table would contain equivalent fields for user3, . . . user(i), . . . user(n)):

Fields in [rows 2, 8, 14, 20, . . . ; columns b, c, d] relates to whether it is Mandatory (M) or Optional (O) to personalize and/or configure the mobile device application associated to $ID_{Ui/S7}$ to be able to generate the dynamic authentication credential the column into the table refers to.

In relation to $ID_{U1/S7}$ the table indicates that when the fourth mobile device application into the first mobile device is personalized in connection $S_7$, the personalization and/or configuration of the application must be such it will always be able to generate for $S_7$ mobile-related internet transactions the dynamic authentication credentials $DC_{171}$ (value M in (2, b)), $DC_{172}$ (value M in (2, c)) and $DC_{173}$ (value M in (2, d)).

Etc.

Fields in [rows 3, 9, 15, 21, . . . ; columns b, c, d] relates to whether the mobile device application associated to $ID_{Ui/S7}$ has been personalized and/or configured, or not, to be able to generate the dynamic authentication credential the column into the table refers to.

In relation to $ID_{U1/S7}$ the table indicates that the fourth mobile device application into the first mobile device has been personalized and/or configured to always be able to generate for $S_7$ mobile-related internet transactions the dynamic authentication credentials $DC_{171}$, $DC_{172}$ and $DC_{173}$ (value Y=YES in fields (3,b), (3, c) and (3, d)).

Etc.

Fields in [rows 4, 10, 16, 22, . . . ; columns b, c, d] relates to whether receiving from the transaction terminal in the multilayer security system of service provider 4 the dynamic authentication credential the column into the table refers to is Mandatory (M) to successfully authenticate the mobile related internet transaction associated to $ID_{Ui/S7}$ or it is only Optional (O) (in connection to $S_{7R}$ the value (O) associated to the dynamic authentication credentials of column (d) relates to those transactions where the transaction value has not been sent from the multilayer security system of service provider 4, as detailed herein below).

In relation to $ID_{U1/S7}$ the table indicates that receiving from the transaction terminal $DC_{171}$ and $DC_{172}$ in the multilayer security system of service provider 4 is Mandatory (value M in fields (4, b) and (4, c)).

Receiving $DC_{173}$ from the transaction terminal is Optional (value O in field (4, d)), as far as the transaction value has not been sent from the multilayer security system of service provider 4 within the transaction data sent to the fourth mobile device application into the first mobile device, to successfully authenticate the mobile related internet transaction associated to $ID_{U1/S7}$ (if the transaction value has not been sent, and then received by the fourth mobile device application into the first mobile device, $DC_{173}$ will not be generated by the fourth mobile device application).

If the transaction value has been sent from the multilayer security system of service provider 4 within the transaction data sent to the fourth mobile device application into the first mobile device, then receiving $DC_{173}$ from the transaction terminal is Mandatory.

Etc.

Fields in [rows 5, 11, 17, 23, . . . ; columns b, c, d] relates to whether obtaining a successful result of the authentication in the multilayer security system of service provider 4 of the dynamic authentication credential the column into the table refers to, is Mandatory (M) to obtain an overall successful result of the authentication of the mobile related internet transaction associated to $ID_{Ui/S7}$ or it is only Optional (O) (in connection to $S_{7R}$ the value (O) associated to the dynamic authentication credentials of column (d) relates to those transactions where the transaction value has not been sent from the multilayer security system of service provider 4, as detailed herein below)

In relation to $ID_{U1/S7}$ the table indicates that obtaining a successful result of the authentication in the multilayer security system of service provider 4 of $DC_{171}$ and $DC_{172}$ is Mandatory (value M in fields (5, b) and (5, c)).

Obtaining a successful result of the authentication of $DC_{173}$ is Optional (value O in field (5, d)), as far as the transaction value has not been sent from the multilayer security system of service provider 4 within the transaction data sent to the fourth mobile device application into the first mobile device, to obtain an overall successful result of the authentication of the mobile related internet transaction associated to $ID_{U1/S7}$ (if the transaction value has not been sent, and then received by the fourth mobile device application into the first mobile device, $DC_{173}$ will not be generated by the fourth mobile device application).

If the transaction value has been sent from the multilayer security system of service provider 4 within the transaction data sent to the fourth mobile device application into the first mobile device, then obtaining a successful result of the authentication of $DC_{173}$ is Mandatory, to obtain an overall successful result of the authentication of the mobile related internet transaction associated to $ID_{U1/S7}$.

Etc.

In the context of FIG. 7.a and FIG. 7 each dynamic authentication credential has a security valuation (SV) named SV1, SV2 and SV3 that is in association with the related $ID_{Ui/S7}$. In this embodiment the SV1 of the first dynamic authentication credential (e.g. $DC_{171}$ associated to $ID_{U1/S7}$) is higher than the security valuation of any other of the additional dynamic authentication credential (e.g. $DC_{172}$ or $DC_{173}$). In a particular example SV1=100 (because a PIN is used to calculate the first dynamic authentication credential)>SV2=60 (because a unique transaction_ID value has been generated by service provider 4, sent to the corresponding mobile device application in the context of the transaction, and has been used to calculate the corresponding additional dynamic authentication credential, e.g. $DC_{172}$)>SV3=40 (because the transaction value is also a value associated to a particular transaction, but in terms of uniqueness and unpredictability it is not at the same level than a transaction_ID value).

When one or more processing devices of the multilayer security system of service provider 4 authenticate the first dynamic authentication credential and one or more of the one or more additional dynamic authentication credentials received in the context of a given mobile-related internet transaction, a result of the authentication is generated.

Upon said result, the one of more processing devices may also calculate a security valuation for that particular internet transaction as e.g. sum of the security valuations of the dynamic authentication credentials successfully authenticated. In a particular example $DC_{171}$, $DC_{172}$ and $DC_{173}$ are received in the context of a given mobile-related internet transaction and all the received dynamic credentials are successfully authenticated, so in the example above the security valuation total (SVT) is 200 (100+60+40). In other particular example only $DC_{171}$ and $DC_{172}$ are received in the context of another given mobile-related internet transaction and all the received dynamic credentials are successfully authenticated so in the example above the security valuation total (SVT) is 160 (100+60). The security valuation values (SV1, SV2, SV3, and SVT) may be stored (fields in [rows 6, 12, 18, 24, . . . ; columns b, c, d and e]) in relation to the associated mobile related internet transaction such that e.g. statistics may be generated in connection to transactions associated to $ID_{Ui/S7}$ or to the total of $S_7$ internet transactions. The statistics may also serve to e.g. compare the security achieved with this system with the one obtained by using other systems for internet transactions.

FIG. 4 illustrates part of an implementation to authenticate mobile-related internet transactions by use of one or more processing devices, where the transactions are authenticated upon a set of individual authentications of user's mobile device generated dynamic authentication credentials, each dynamic authentication credential associated to a given individual input data. This implementation is associated with one or more providers of authentication services for internet transactions in connection with the use of a mobile device that generates dynamic authentication credentials and a transaction terminal that transmits at least part of the dynamic authentication credentials.

FIG. 4 illustrates a first mobile device with four mobile device applications and a second mobile device with two mobile device applications, where each mobile device application has been personalized to generate dynamic authentication credentials for one or more $S_i$ authentication services as already described in connection to FIG. 3.

FIG. 4 refers in particular to the authentication of dynamic authentication credentials related to $S_1$ authentication service. The registration for $S_1$ service and the personalization of the first mobile device application in the first and second mobile device respectively may be performed for $S_1$ authentication service by following a process equivalent to the one described in FIG. 2 in connection to $S_1$ authentication service and the referred mobile device application, except in that in the context of FIG. 4 tokens (illustrated as tokens$_i$, i=1 . . . n) are generated in the multilayer security system of service provider 1 and sent to the first mobile device application in the first and second mobile device respectively. The mobile device receives and stores the tokens in one or more memories associated to the mobile device application.

In a particular example, taking as reference FIG. 2, a set of tokens is sent in step (13) to the first mobile device application into the first mobile device during the personalization of $S_1$ in that first mobile device application into the first mobile device; and other set of tokens is sent in step (13) to the first mobile device application into the second mobile device during the personalization of $S_1$ in that first mobile device application into the second mobile device. Tokens are stored in the corresponding mobile device application data base and may be later used to generate dynamic authentication credentials according to some implementations.

Upon consumption of the tokens, new tokens may be requested to the multilayer security system of service provider 1. FIG. 4 illustrates an exemplary embodiment of tokens renewal in the first mobile device application in the first mobile device. In this embodiment the mobile device application sends to one or more processing devices of the multilayer security system of service provider 1, e.g. via https, the hash(Device ID & $AC_{S1}$) and an OTP(PIN) value. The one or more processing devices identify the customer reference(s) and data into the data base though the received hash value, calculates an OTP result using the stored user PIN and OTP keys and parameters, and compares the result with the one received from the mobile device application. If the validation is successful, then new tokens are sent to the mobile device application, as illustrated in FIG. 4, and stored in one or more memories associated to the mobile device application to be later used to generate more dynamic authentication credentials.

In the implementation of FIG. 4 the tokens generated in the multilayer security system of service provider 1 have been ciphered in the server with the user's PIN for the purpose to be sent to the mobile device, and the user PIN is required as input data by the mobile device application to decipher the token and to use it as the first dynamic authentication credential for a given mobile related internet transaction (i.e. a deciphered token is $DC_{111}$(PIN) in connection to internet transactions 1 and 2; and a deciphered token is $DC_{211}$(PIN) in connection to internet transaction 3; etc.). So according to some implementations an input data based derivative of a dynamic authentication credential calculated by the one or more providers of authentication services is sent to the mobile device and it is received by the mobile device and stored in a memory, and the mobile device generates the dynamic authentication credential using the input data.

Also, in the context of registering the first mobile device application into the first mobile device for $S_1$ authentication service, a set of wireless device identifiers (id_wd$_{111}$, id_wd$_{112}$, . . . , id_wd$_{11i}$, . . . , id_wd$_{11n}$), each one being a unique identifier of either a wireless device or a set of wireless devices, has been associated to said first mobile device application into the first mobile device for $S_1$ authentication service in the multilayer security system of service provider 1 (as illustrated in FIG. 4), and those wireless device identifiers are sent to the first mobile device application in the first mobile device in the context of personalizing the first mobile device application for $S_1$ authentication service (e.g. in a process equivalent to the one of step (13) in FIG. 2). The first mobile device application in the first mobile device receives and stores the wireless devices identifiers in one or more memories associated to the mobile device application. As equivalent process may be handled to associate other set of wireless device identifiers (id_wd$_{211}$, id_wd$_{212}$, . . . , id_wd$_{21j}$, . . . , id_wd$_{11m}$) to the first mobile device application into the second mobile device, to send them to the second mobile device for storage in one or more memories associated to the first mobile device application in the second mobile device. Other set of wireless device identifiers may be associated to other given mobile application into other mobile device and personalized in said mobile device application during the registration process of the mobile application for $S_1$ authentication service, etc.

The list of wireless device identifiers associated to a given mobile device application into a mobile device may be updated from time to time in the multilayer security system of service provider 1. In a particular embodiment, taking advantage of a request tokens process (as the one illustrated in FIG. 4 for the first mobile device application in to the first mobile device) an updating of the wireless device identifiers is performed in addition to sending new tokens from the multilayer security system of service provider 1 to the mobile device application, and the updated list of identifiers is stored in one or more memories associated to the mobile device application.

FIG. 4 illustrates an extract of data stored in one or more memories of the multilayer security system of service provider 1, related to the registration process of $S_1$ authentication service for a given mobile device and the related personalization of a mobile device application in said mobile device (e.g. data associated to the registration process of $S_1$ authentication service for the first mobile device and the related personalization of the first mobile device application in said first mobile device; there would be other set of equivalent data associated to the registration process of $S_1$ authentication service for the second mobile device and the related personalization of the first mobile device application in said second mobile device; etc.). So the multilayer security system of service provider 1 electronically stores in one or more memories data capable of linking the mobile device to one or more authentication services for internet transactions, the data including authentication parameters associated to dynamic credentials authentication rules and one or more identifiers related to the user and the one or more authentication services. FIG. 4 shows an embodiment where the hash($AC_{S1}$) and the hash(Device ID & $AC_{S1}$), stored in the multilayer security system database of service provider 1, may be used as identifiers related to the user and to the authentication service $S_1$.

As shown in FIG. 4, the authentication service $S_1$ is associated to the authentication rules $S_{1R}$ to authenticate $S_1$ dynamic credentials. In this embodiment the referred associations and rules are defined in the credentials & authentication rules module. The dynamic credentials authentication rules of this embodiment use associated authentication parameters as those illustrated in FIG. 4a, stored in one or more memories of the multilayer security system of service provider 1. The dynamic credentials authentication rules and the usage of the associated authentication parameters is later described in the context of authenticating internet transactions 1, 2 and 3 (illustrated in FIG. 4).

In the embodiment of FIG. 4, $ID_{Ui/S1}$=hash(Device ID & $AC_{S1}$), where user 1, user 2, etc., has a different device ID and a different activation code assigned to $S_1$ authentication service. The hash value must be a unique identifier such that one or more processing devices of the multilayer security system of service provider 1 will be able to match a given mobile-related internet transaction with the authentication service, the user, the mobile device, the right customer reference(s) and the data and parameters into the database of service provider 1. So if when the hash value is calculated e.g. during the process of registering a user and a mobile device for a $S_1$ authentication service, the one or more processing devices identify that said value was already assigned to other user, mobile device and authentication service then the next consecutive available value is assigned to the user, mobile device and authentication service in the context of registering said user and mobile device for the referred authentication service. Many other possibilities to generate account identifiers exists, and the one described in this embodiment is not exclusive of other means to generate account identifiers for the purpose to match a given mobile-related internet transaction with a given user, authentication service and mobile device.

In FIG. 4, in connection to the illustrated mobile-related internet transactions, some additional dynamic authentication credentials have been generated using as input data a hard-coded key (e.g. $DC_{112}$ in internet transactions 1 and 2; e.g. $DC_{212}$ in internet transactions 3), geographic GPS coordinates (e.g. $DC_{113}$ in internet transactions 1 and 2), or a wireless device ID (e.g. $DC_{114}$ in internet transactions 1 and 2; e.g. $DC_{214}$ in internet transactions 3) (or a derivative of any of them). So in this implementation the input data used to calculate an additional dynamic authentication credential is one of, or a derivative of one of, geographic coordinates, a hard-coded key or a wireless device ID.

The definition of dynamic credentials authentication rules ($S_{1R}$) and associated authentication parameters for authentication service $S_1$ has already been illustrated and explained in connection to FIG. 4.a.

According to FIG. 4.a, the personalization and/or configuration of the first mobile device application into the first mobile device for $S_1$ authentication service has been such that $DC_{112}$, $DC_{113}$ and $DC_{114}$ are always generated for $S_1$ mobile-related internet transactions (as illustrated in FIG. 4.a, the value "Optional" into the field (2,d) indicates that it is allowed to personalize and/or configure the first mobile device application into the first mobile device to generate or not $DC_{113}$; and the value "Y" into the field (3, d) indicates that said mobile device application has been personalized/configured to always generate for $S_1$ mobile-related internet transactions the dynamic authentication credential $DC_{113}$).

Also in reference to FIG. 4.a, the personalization and/or configuration of the first mobile device application into the second mobile device for $S_1$ authentication service has been such that $DC_{211}$, $DC_{212}$ and $DC_{214}$ are always generated for $S_1$ mobile-related internet transactions (as illustrated in FIG. 4.a, the value "Optional" into the field (8,d) indicates that it is allowed to personalize and/or configure the first mobile device application into the second mobile device to generate or not $DC_{213}$; and the value "N" into the field (9, d) indicates that said mobile device application has been personalized/configured to not generate for $S_1$ mobile-related internet transactions the dynamic authentication credential $DC_{213}$).

In the embodiment of FIG. 4 the mobile device performs (e.g. periodically) a presence determination process about whether it is present or not within an area defined by the coverage of one or more of the wireless devices of the list. Within said process the mobile device compares identifiers received from wireless devices signals with the list of stored wireless devices identifiers, and possibly applies other presence determination rules to determine whether it is present of not within a presence area defined by one or more wireless devices. It is not the target of this invention to describe a mobile centric presence determination system, so FIG. 4 illustrates the simplest scenario to generate $DC_{i14}$ for a given mobile-related internet transaction, that is the case of the additional dynamic authentication credential being generated using as input data one of the wireless device identifiers received and that is in the wireless device list stored in the mobile device (i.e. said wireless identifier serves to define at least part of one presence area associated to the mobile device). If none of the wireless device identifiers of the stored list are received but the mobile device application has been personalized and/or configured to send, according to presence updating rules, an updating signal (that is an internet transaction in the context of FIG. 4) even when the mobile is not present in any presence area, a "default" input value may be used for that scenario, the multilayer security system of service provider 1 being able to recognize said default input value during the authentication process of the related $DC_{i14}$.

It may obvious for those skilled in the art that the input data associated to a given $DC_{i14}$ could also be an identifier associated to the mobile device being present in a given presence area, or an identifier associated to the mobile device being present in more than one presence areas simultaneously, etc.).

So in the embodiment of FIG. 4, internet transactions 1, 2 and 3 are presence updating signals sent for authentication by the multilayer security system of service provider 1. In a particular example internet transaction 1 is sent when the mobile device determines that it has entered into a given presence area defined at least partly by a given wireless device (referenced as id_wd); in other example, internet transaction 2 is sent when the mobile device determines that it has entered into a given presence area (the same than the previous one or e.g. another one) defined at least partly by the coverage of a given wireless device (also referenced as id_wd for simplicity, but it could be the same than the previous one, or other one into the list), etc. The presence updated signals (which are internet transactions in the context of FIG. 4) may be sent periodically, when the mobile device enters into a presence area, when exists from a presence area, when remains into a presence area, etc. Details are not further described as it is assumed there are known by those skilled in the art and the target of this invention relates to multilayer dynamic credentials authentication.

When the dynamic authentication credentials are generated before a mobile-related internet transaction associated to FIG. 4 is initiated, $DC_{i13}$ is also generated (if the mobile device application personalization and/or configuration relates to said generation being made) using GPS coordinates as input data. In a particular embodiment the current GPS location is calculated by the mobile device, using the resulting GPS coordinates as input data. If the GPS location cannot be determined by the mobile device (e.g. because the signals of enough GPS satellites are not properly received by the mobile device), a "default" input value may be used for that scenario.

In the implementation of FIG. 4 the additional dynamic authentication credentials are OTP results generated upon the OTP keys and parameters personalized in the mobile device application for $S_1$ authentication service and an input data. In particular:

$DC_{112}(HW\_coded\_key)=OTP_{112}(HW\_coded\_key);$ $DC_{113}(GPS\_coord)=OTP_{113}(GPS\_coord);$ $DC_{114}(id\_wd)=OTP_{114}(id\_wd);$ $DC_{212}(HW\_coded\_key)=OTP_{212}(HW\_coded\_key);$ $DC_{214}(id\_wd)=OTP_{214}(id\_wd);$ Etc.

FIG. 4 shows in steps (1) and (2) the processes of receiving in the first/second mobile device input data from different sources, and the first/second mobile device using at least part of the input data received to generate dynamic authentication credentials for mobile-related internet transactions.

FIG. 4 shows in step (3), in connection to mobile-related internet transactions 1 to 3, the process of sending the first dynamic authentication credential (that uses a user's PIN as input data), the one or more additional dynamic authentication credentials (each one calculated by the mobile device upon a different input data), and at least one identifier related to the user and to the authentication service the dynamic authentication credentials relates to (referenced in the graphic as $ID_{U1/S1}$ in connection to User1/$S_1$ and $ID_{U2/S1}$ in connection to User2/$S_1$), to the transaction terminal that transmits (in step 4) said first dynamic authentication credential, one or more of the one or more additional dynamic authentication credentials, and at least one of the identifiers received, to one or more servers of one or more providers of authentication services for internet transactions.

In the implementation illustrated in FIG. 4 the transaction terminal that transmits the first dynamic authentication credential, one or more of the one of more additional dynamic authentication credentials, and at least one of the identifiers received, is the mobile device that generates the dynamic authentication credentials, so steps (3) and (4) are the same one.

In step (5) the dynamic authentication credentials and the at least one of the identifiers transmitted by the transaction terminal are received in the one or more servers of the multilayer security system of service provider 1. In FIG. 4 $ID_{U1/S1}$ is received in connection to internet transactions 1 and 2 and $ID_{U2/S1}$ is received in connection to internet transaction 3 (as described above $ID_{Ui/S1}$ is the hash(Device ID & $AC_{S1}$) value calculated and assigned during the registration process of the corresponding mobile device application into the mobile device for $S_1$ authentication service).

So the one or more providers of authentication services receives from the transaction terminal a first dynamic authentication credential generated by the mobile device using as input data a user's Personal Identification Number (PIN), one or more additional dynamic authentication credentials, each one calculated by the mobile device upon a different input data, and at least one identifier related to the user and to the authentication service the dynamic authentication credentials refers to.

In step (6) $ID_{Ui/S1}$ is used to match at the multilayer security system of service provider 1 the corresponding mobile-related internet transaction, with the right customer reference(s) and with the rest of the $S_1$ related data and parameters into the database of service provider 1 ($ID_{U1/S1}$ is used in connection to internet transactions 1 and 2 and $ID_{U2/S1}$ is used in connection to internet transaction 3).

Upon said matching the security module authenticates in step (7), for a given mobile related internet transaction, the first dynamic authentication credential and further authenticates, based on authentication rules and associated authentication parameters, one or more of the one or more additional dynamic authentication credentials by one or more processing devices having access to at least a portion of data capable of linking the mobile device to one or more authentication services for internet transactions. The authentication is performed using the appropriate data (keys, parameters, input data, tokens, etc.), as well as the $S_{1R}$ authentication rules and associated parameters for $S_1$ authentication service. The authentication process is described herein below in the context of authenticating exemplary internet transactions 1, 2 and 3.

Authenticating internet transaction 1 (step 7):
As already detailed in connection to FIG. 4.*a*, receiving $DC_{111}$(PIN) (field (4,b)) and obtaining a successful result of the authentication of $DC_{111}$(PIN) (field (5,b)) is Mandatory to obtain an overall successful result of the authentication of the internet transaction. So according to some implementations the authentication rules and related authentication parameters associated to the least one identifier related to the user and to the authentication service the dynamic authentication credentials relates to (e.g. associated to $ID_{U1/S1}$), comprises at least one authentication parameter associated to the first dynamic authentication credential (e.g. value in fields (4, b) and (5, b) associated to $DC_{111}$). Once the above referred matching (using $ID_{U1/S1}$) has been performed the security module first authenticate the $DC_{111}$ (PIN) received that, as above described, is one of the tokens generated in the multilayer security system of service provider 1, that was sent ciphered with the PIN to the first mobile device application in the first mobile device and that has been deciphered by the first mobile device application in the first mobile device using the user's PIN. The one or more processing devices compares the received token with the valid tokens (not expired, etc.) stored into the data base of the multilayer security system of service provider 1 in association to $ID_{U1/S1}$. Upon a successful matching the one or more processing devices interprets that the PIN inserted was correct and the result of the authentication of $DC_{111}$ (PIN) becomes successful. If there is not a successful matching the one or more processing devices will interpret that the PIN inserted was wrong and the result of the authentication will become unsuccessful. In this scenario a PIN error may be computed (an SMS or a notification could e.g. be sent to the user, alerting him/her about the computed PIN error; e.g. $S_1$ service could be temporarily blocked for said user after a defined number of consecutive PIN errors in $S_1$ mobile-related internet transactions). The result of the authentication of $DC_{111}$(PIN)$_{in}$ internet transaction 1 is named $IT_1$-auth-$R_{DC111(PIN)}$.

As detailed in FIG. 4.*a*, receiving $DC_{112}$(HW_coded_key) (field (4,c)) and obtaining a successful result of the authentication of $DC_{112}$(HW_coded_key) (field (5,c)) is also Mandatory to obtain an overall successful result of the authentication of the internet transaction. So according to some implementations the authentication rules and related authentication parameters associated to the least one identifier related to the user and to the authentication service the dynamic authentication credentials relates to (e.g. associated to $ID_{U1/S1}$), comprises at least one authentication parameter associated to at least one additional dynamic authentication credential (e.g. value in fields (4, c) and (5, c) associated to $DC_{112}$).

The security module authenticates the received $DC_{112}$ (HW_coded_key) that, as above described, is an $OTP_{112}$(HW_coded_key) value. To perform said authentication, the one or more processing devices compares the $OTP_{112}$ value received with at least one OTP result calculated by the one or more processing devices using the corresponding HW_coded key (stored in the multilayer security system of service provider 1 in association to $ID_{U1/S1}$ and to $DC_{112}$ additional dynamic authentication credential) as input data and OTP keys and parameters. Upon a successful matching the one or more processing devices interprets that the HW_coded_key used by the mobile device application was correct (thus it provides a proof of authenticity of the mobile device application) and the result of the authentication of $DC_{112}$(HW_coded_key) becomes successful. If there is not a successful matching the one or more processing devices will interpret that the HW_coded_key used by the mobile device application was wrong. The result of the authentication of $DC_{112}$(HW_coded_key) in internet transaction 1 is named $IT_1$-auth-$R_{DC112(HW\_coded\_key)}$.

As detailed in FIG. 4.*a*, receiving $DC_{114}$(id_wd) (field (4,e)) and obtaining a successful result of the authentication of $DC_{114}$(id_wd) (field (5,e)) is also Mandatory to obtain an overall successful result of the authentication of the internet transaction. So the security module authenticates the received $DC_{114}$(id_wd) that, as above described, is an $OTP_{114}$(id_wd) value. To perform said authentication, the one or more processing devices compares the $OTP_{114}$ value received with at least one OTP result calculated by the one or more processing devices using the id_wd received as input data and OTP keys and parameters (in this implementation it must first be verified that the received id_wd belongs to the set of wireless device identifiers (id_wd$_{111}$, id_wd$_{112}$, . . . , id_wd$_{11i}$, . . . , id_wd$_{11n}$) that has been stored in the multilayer security system of service provider 1 in association to $ID_{U1/S1}$ and to $DC_{114}$ additional dynamic authentication credential). Upon a successful matching the one or more processing devices interprets that the id_wd used by the mobile device application was correctly authenticated and the result of the authentication of $DC_{114}$(id_wd) becomes successful. If the received id_wd does not belong to the set of stored wireless device identifiers and/or there is not a successful matching, the one or more processing devices will interpret that the id_wd used by the mobile device application was not properly authenticated. The result of the authentication of $DC_{114}$(id_wd) in internet transaction 1 is named $IT_1$-auth-$R_{DC114(id\_wd)}$.

As detailed in FIG. 4.*a*, receiving $DC_{113}$(GPS_coord) (field (4,d)) and obtaining a successful result of the authentication of $DC_{113}$(GPS_coord) (field (5,d)) is "in principle" Optional to obtain an overall successful result of the authentication of the internet transaction. But the first mobile application into the first mobile device has been personalized and/or configured to generate $DC_{113}$(GPS_coord) (field (3,d)) so the security module expects receiving $DC_{113}$ in the context of internet transaction 1, and authenticating it on Mandatory basis. The security module authenticates the received $DC_{113}$(GPS_coord) that, as above described, is an $OTP_{113}$(GPS_coord) value. To perform said authentication, the one or more processing devices compares the $OTP_{113}$ value received with at least one OTP result calculated by the one or more processing devices using the GPS_coord received as input data and OTP keys and parameters (in this implementation it must first be verified that the received GPS_coord is not the "default" value used when the location cannot be determined by the mobile device). Upon a successful matching the one or more processing devices interprets that the GPS_coord used by the mobile device application was correctly authenticated and the result of the authentication of $DC_{113}$(GPS_coord) becomes successful. If the received GPS_coord corresponds to the "default" value, or there is not a successful matching, the one or more processing devices will interpret that the GPS_coord used by the mobile device application was not properly authenticated. The result of the authentication of $DC_{113}$(GPS_coord) in internet transaction 1 is named $IT_1$-auth-$R_{DC113(GPS\_coord)}$.

The overall result of the authentication of internet transaction 1 is named $IT_1$-auth-$R_{TOTAL}$.

According to the authentication rules described above, and the associated authentication parameters, a successful overall result of the authentication of internet transaction 1 requires success on all the following intermediate authentication results associated to internet transaction 1:

$$[IT_1\text{-auth-}R_{DC111(PIN)}; IT_1\text{-auth-}R_{DC112(HW\_coded\_key)}; IT_1\text{-auth-}R_{DC113(GPS\_coord)}; IT_1\text{-auth-}R_{DC114(id\_wd)}]$$

An equivalent process could be followed in connection to authenticating internet transaction 2, and the results of the authentication of $DC_{111}$(PIN), $DC_{112}$(HW_coded_key), $DC_{113}$(GPS_coord) and $DC_{114}$(id_wd) will be obtained in the security module in connection to the context and input data of said internet transaction 2. According to the authentication rules described above, and the associated authentication parameters, a successful overall result of the authentication of internet transaction 2 requires success on all the following intermediate authentication results associated to internet transaction 2:

$$[IT_2\text{-auth-}R_{DC111(PIN)}; IT_2\text{-auth-}R_{DC(HW\_coded\_key)}; IT_2\text{-auth-}R_{DC113(GPS\_coord)}; IT_2\text{-auth-}R_{DC114(id\_wd)}]$$

The overall result of the authentication of internet transaction 2 is named $IT_2$-auth-$R_{TOTAL}$.

The process of authenticating internet transaction 3 will be similar to the one already described above for internet transaction 1, but diverges in that it entirely relates to user2 mobile device, thus to the $ID_{U2/S1}$ identifier and related data (including (columns 8-12), (rows a-f), of FIG. 4.a; $ID_{U2/S1}$ related tokens, wireless device identifiers, OTP keys and parameters; the user2 selected PIN; etc.) would apply to the authentication process. The results of the authentication of $DC_{211}$(PIN), $DC_{212}$(HW_coded_key) and $DC_{114}$(id_wd) will be obtained in the security module in connection to the context and input data of internet transaction 3. As already described in connection to FIG. 4.a, receiving $DC_{213}$(GPS_coord) (field (10,d)) and obtaining a successful result of the authentication of $DC_{213}$(GPS_coord) (field (11,d)) is "in principle" Optional to obtain an overall successful result of the authentication of the internet transaction. The first mobile application into the second mobile device has been personalized and/or configured to not generate $DC_{213}$(GPS_coord) (field (9,d)) so the security module does not expects receiving $DC_{213}$ in the context of internet transaction 3, and authenticating it is consequently not necessary to obtain an overall successful result of the authentication of the internet transaction 3. According to the authentication rules described, and the associated authentication parameters, a successful overall result of the authentication of internet transaction 3 requires success on all the following intermediate authentication results associated to internet transaction 3:

$$[IT_3\text{-auth-}R_{DC211(PIN)}; IT_3\text{-auth-}R_{DC212(HW\_coded\_key)}; IT_3\text{-auth-}R_{DC214(id\_wd)}]$$

The overall result of the authentication of internet transaction 3 is named $IT_3$-auth-$R_{TOTAL}$.

In this embodiment the one or more processing devices of the multilayer security system of service provider 1 stores in one or more memories, for each mobile-related internet transaction authenticated, the intermediate authentication results, the overall result of the authentication and the security valuations already explained in connection to FIG. 4.a. (SV1, SV2, SV3, SV4 and SVT), in association to the corresponding $ID_{Ui/S1}$ identifier.

Also, in connection a given mobile-related internet transaction authenticated:
- the intermediate authentication results;
- the overall result of the authentication;
- and the security valuations (SV1, SV2, SV3, SV4 and SVT);

are sent in step (8) by the one or more processing devices of the multilayer security system of service provider 1 to the legacy system of service provider 1. The data are sent in association to one or more customer references allowing service provider 1 to match the authentications results and security valuations to a user account.

So in step (8) the result of the authentication of the first dynamic authentication credential and the one or more of the one or more additional dynamic authentication credentials is sent to the entity in charge to authorize or deny the mobile related internet transaction, and in step (9) the mobile-related internet transaction being authorized or denied based upon that authentication result, where the transaction being authorized always requires a successful result of the authentication of the first dynamic authentication credential. In the embodiment of FIG. 4 the entity authorizing or denying the mobile-related internet transaction is the service provider 1, by using its legacy system.

According to some implementations the authorization or denial of the internet transaction may also depend on the authentication of other credentials that may be comprised into internet transaction data or may also be based on other additional transaction acceptance or denial criteria (e.g. risk criteria defined by the entity authorizing or denying the mobile-related internet transaction).

As already mentioned, internet transactions 1, 2 and 3 in this embodiment are presence updating signals. According to same implementations, a given mobile-related internet transaction being authorized by service provider 1 results in a given presence related service (associated to the id_wd used to calculate the successfully authenticated $DC_{i14}$ dynamic authentication credential sent in the context of that transaction) been enabled by service provider 1.

According to some implementations some mobile-related internet transactions associated to a given authentication service (e.g. $S_1$) are authorized or denied based on the result (e.g. $IT_1$-auth-$R_{TOTAL}$ related to internet transaction 1) of authenticating a first set of mobile device generated dynamic authentication credentials ($DC_{111}$, $DC_{112}$, $DC_{113}$ and $DC_{114}$ related to internet transaction 1) while other mobile-related internet transactions associated to the same authentication service ($S_1$ in the example) are authorized or denied based on the result (e.g. $IT_3$-auth-$R_{TOTAL}$ related to internet transaction 3) of authenticating a different set ($DC_{211}$, $DC_{212}$ and $DC_{214}$ related to internet transaction 3) of mobile device generated dynamic authentication credentials, depending on the authentication parameters and the associated authentication rules, and also depending on the additional dynamic authentication credentials received.

According to some implementations the set of one or more additional dynamic authentication credentials, generated in a first mobile device with a first personalization and/or configuration and received from a transaction terminal in connection to a first mobile-related internet transaction associated to a first authentication service (e.g. $DC_{112}$, $DC_{113}$ and $DC_{114}$ generated in the first mobile device in connection to internet transaction 2 and to $S_1$) is different than the set of one or more additional dynamic authentication credentials, generated in a second mobile device with a second personalization and/or configuration and received from a transaction terminal in connection to a second mobile-related internet transaction associated to the first authentication service (e.g. $DC_{212}$ and $DC_{214}$ generated in the second mobile device in connection to internet transaction 3 and to $S_1$), and the one or more providers of authentication services (e.g. the multilayer security system of service provider 1) authenticate in connection to the first mobile-related internet transaction one or more ($DC_{112}$, $DC_{113}$ and $DC_{114}$ in the example) additional dynamic authentication credentials of the first set based upon authentication rules associated to the first mobile device personalization and/or configuration for the first authentication service (e.g. the authentication rules and related authentication parameters already described in connection internet transaction 2) and authenticate in connection to the second mobile-related internet transaction one or more ($DC_{212}$ and $DC_{214}$) additional dynamic authentication credentials of the second set based upon authentication rules associated to the second mobile device personalization and/or configuration for the first authentication service (e.g. the authentication rules and related authentication parameters already described in connection internet transaction 3).

So according to some implementations some mobile-related internet transactions associated to a given authentication service (e.g. $S_1$) and to a first mobile device (e.g. the first mobile device) are authorized or denied based on the result (e.g. $IT_2$-auth-$R_{TOTAL}$ related to internet transaction 2) of authenticating a first set of mobile device generated dynamic authentication credentials ($DC_{111}$, $DC_{112}$, $DC_{113}$ and $DC_{114}$ related to internet transaction 2) while other mobile-related internet transactions associated to the same authentication service ($S_1$) and to a second mobile device (e.g. the second mobile device) are authorized or denied based on the result (e.g. $IT_3$-auth-$R_{TOTAL}$ related to internet transaction 3) of authenticating a different set of mobile device generated dynamic authentication credentials ($DC_{211}$, $DC_{212}$ and $DC_{214}$ related to internet transaction 3), depending on the authentication parameters and the associated authentication rules, and also depending on the personalization and/or configuration of the first and second mobile device respectively.

As said, the multilayer security system of service provider 1 and the service provider 1 have available the security valuations (SV1, SV2, SV3, SV4 and SVT) of each given mobile-related internet transaction associated to $S_1$. If security valuations of mobile-related internet transactions for a given user and mobile device (e.g. user2 and the second mobile device) are lower than those of other user and mobile device (e.g. user1 and the first mobile device) due to mobile device application personalization and/or configuration issues, the service provider 1 (e.g. via its multilayer security system) may send a notification to the mobile device application having a lower security valuation to updating its current personalization and/or configuration for a new one producing a higher security valuation.

So according to some implementations the one or more providers of authentication services for internet transactions (e.g. the multilayer security system of service provider 1) sends a notification to the user's mobile device (e.g. to user2 mobile device) to inform that more additional dynamic authentication credentials (e.g. $DC_{213}$) associated to a given authentication service ($S_1$) could be generated by the mobile device, the notification related to modifying the personalization and/or configuration of the mobile device for the mobile device to generate said more additional dynamic authentication credentials, each one calculated by the mobile device upon different input data, in successive mobile-related internet transactions. Advantageously, the one or more providers of authentication services notify to the mobile device about the possibility to increase the level of security of the mobile-related internet transactions.

FIG. 5 illustrates part of an implementation to authenticate mobile-related internet transactions by use of one or more processing devices, where the transactions are authenticated upon a set of individual authentications of user's mobile device generated dynamic authentication credentials, each dynamic authentication credential associated to a given individual input data. This implementation is associated with one or more providers of authentication services for internet transactions in connection with the use of a mobile device that generates dynamic authentication credentials and a transaction terminal that transmits at least part of the dynamic authentication credentials.

FIG. 5 illustrates a first mobile device with four mobile device applications, where the mobile device applications have been personalized to generate dynamic authentication credentials for one or more $S_i$ authentication services as already described in connection to FIG. 3.

FIG. 5 refers in particular to the authentication of dynamic authentication credentials related to $S_2$ to $S_5$ authentication services. The registration for $S_2$ to $S_5$ authentication services and the personalization of the second mobile device application in the first mobile device may be performed for $S_2$ to $S_5$ authentication services by following a process similar to the one described in FIG. 2 in connection to $S_1$, but applied in this implementation to $S_2$ to $S_5$ authentication services.

FIG. 5 illustrates in particular an extract of data stored in one or more memories that reside in one or more servers of the multilayer security system of service provider 2, related to the registration process of $S_2$ to $S_5$ authentication services for a given mobile device and the related personalization of a mobile device application in said mobile device (e.g. data associated to the registration process of $S_2$ to $S_5$ authentication services for the first mobile device and the related personalization of the second mobile device application in said first mobile device). So the multilayer security system of service provider 2 electronically stores in one or more memories data capable of linking the mobile device to one or more authentication services for internet transactions, the data including authentication parameters associated to dynamic credentials authentication rules and one or more identifiers related to the user and the one or more authentication services. FIG. 5 shows an embodiment where the hash($AC_{Si}$) and the [$S_i$ ID/$S_i$ PAN] stored in the multilayer security system database of service provider 2, may be used as identifiers related to the user and to the authentication service $S_i$, i=2 to 5.

As shown in FIG. 5, the authentication service $S_i$ is associated to the authentication rules $S_{iR}$ to authenticate $S_i$ dynamic credentials, i=2 to 5. In this embodiment the referred associations and rules are defined in the credentials & authentication rules module. The dynamic credentials authentication rules of this embodiment use associated authentication parameters as those illustrated in FIG. 5a, stored in one or more memories of the multilayer security system of service provider 2. The dynamic credentials authentication rules and the usage of the associated authentication parameters is later described in the context of authenticating internet transactions 4 to 11 (illustrated in FIG. 5).

In the implementation of FIG. 5 each $S_i$ authentication service has been registered through an individual registration process (e.g. first $S_2$, later $S_3$, then $S_4$ and finally $S_5$), such that each one has assigned its own $AC_{Si}$ and related hash values and its own $OTP_{Si}$ keys and parameters.

Also, it must be noted that in the embodiment of FIG. 5, the $ID_{U1/Si}$ is constituted by an authentication service identifier plus a personal account number as follows:

$ID_{U1/S2}=[S_2ID/S_2PAN]$ $ID_{U1/S3}=[S_3ID/S_3PAN]$ $ID_{U1/S4}=[S_4ID/S_4PAN]$ $ID_{U1/S5}=[S_5ID/S_5PAN]$

The $S_i$ PAN value is a unique identifier such that one or more processing devices of the multilayer security system of service provider 2 will be able to match a given mobile-related internet transaction with the user, the mobile device, the right customer reference(s) and data and parameters into the database of service provider 2. The $S_i$ ID permits the one or more processing devices to identify the authentication service the mobile-related internet transaction refers to.

In some services (considering not only the ones related to this embodiment but also the ones of any other embodiment of this invention), a given authentication service may relate to more than one user's product (e.g. $S_2$ may refer to authentication of debit/credit card payment transactions and the user may have more than one debit/credit card registered into the multilayer security system of service provider 2 for mobile-related internet transaction authentication services). Within this example, if the customer has e.g. two products registered for $S_2$ authentication service (e.g. a first credit card and a second credit card), a different PAN may be assigned to each product: i.e. there would be a $S_2$ PAN1 and a $S_2$ PAN2. For simplicity, in this document there will generally only be a reference to one unique identifier per user, mobile device and authentication service, but it shall be noted that multiple identifiers, one per product registered for the authentication service, may be used without departing from the scope of the invention. As a particular example, a PAN may be calculated as a function of the device ID and an activation code, such that if the result was already assigned to other user and mobile device (/and product) for a given authentication service then the next available value will be assigned as PAN; many other methods can be used to calculate PAN values being unique identifiers.

According to some implementations a given PAN identifier may be used for more than one authentication service e.g. when a user's product is associated to more than one authentication service. In particular example user's products P1 and P2 (e.g. a first credit card and a second credit card) are associated each to authentication of debit/credit card payment transactions (S2 in an example) and to authentication of cash withdrawal/request transactions with debit/credit cards (S5 in this example). The identifiers related to $S_2$ and $S_5$ for mobile-related internet transactions performed with $P_1$ and $P_2$ products of user1 would be the following:

$ID_{U1/S2}=[S_2ID/P_1ID/P_1PAN]$ (ID associated to user1, S2 and P1)

$ID_{U1/S2}=[S_2ID/P_2ID/P_2PAN]$ (ID associated to user1, S2 and P2)

$ID_{U1/S5}=[S_5ID/P_1ID/P_1PAN]$ (ID associated to user1, S5 and P1)

$ID_{U1/S5}=[S_5ID/P_2ID/P_2PAN]$ (ID associated to user1, S5 and P2)

In this example a product identifier has been also included (e.g. P1 ID=gold credit card and P2 ID=corporate credit card) to simplify searching data into data base of the multilayer security system of service provider 2. P1 is personalized in the second mobile device application in the first mobile device, in association to S2 and S5 registered services, so P1 personalization allows generating dynamic authentication credentials for given mobile-related internet transactions associated to P1 product and to S2 or S5 authentication services.

Implementations above related to $ID_{Ui/Sj}$ identifiers are illustrative and are not exclusive of other possibilities to match in the multilayer security system of a given service provider by one or more processing devices a given mobile-related internet transaction with a user, a mobile device, an authentication service and a related product.

In a particular implementation (illustrated in FIG. 5) the user selects a PIN when registering the first authentication service associated to the second mobile device application (e.g. when registering $S_2$) and said PIN is the same one for the rest of the authentication services ($S_3$ to $S_5$ in the example) personalized in the second mobile device application into the first mobile device. So in connection to the process described in FIG. 2, the selected PIN, together with $OTP_{S2}(PIN)$ and hash($AC_{S2}$) is sent in step (11) in connection to $S_2$ registration process, but there is no need to send the PIN in step (11) when later registering $S_i$ (i=3 to 5) as it was previously selected (when registering $S_2$) and it would be enough sending the OTP and the hash value to proceed with the registration of said $S_i$ (i=3 to 5) authentication services (e.g. $OTP_{S4}(PIN)$ and hash($AC_{S4}$) when registering $S_4$ authentication service). Advantageously, in this implementation the user can use the same PIN for the second mobile device application in the first mobile device when generating the first dynamic authentication credential for internet transactions related to any of $S_2$ to $S_5$ authentication services. In other implementations a different PIN could be selected for each one of the registered $S_i$ authentication services personalized in the second mobile device application.

In FIG. 5, in connection to the illustrated mobile-related internet transactions, a first dynamic authentication credential (e.g. $DC_{121}$ or $DC_{151}$ illustrated in FIG. 3) is generated by the second mobile device application in the first mobile device using the user's PIN associated to $S_2$ to $S_5$ as input data; and some additional dynamic authentication credentials have been generated using as input data a transaction value (e.g. $DC_{122}$ or $DC_{152}$ illustrated in FIG. 3), a time stamp (e.g. $DC_{123}$ or $DC_{154}$ illustrated in FIG. 3), or a msisdn of a sender (e.g. $DC_{153}$ illustrated in FIG. 3) (or a derivative of any of them). So in this implementation the input data used to calculate an additional dynamic authentication credential is one of, or a derivative of one of, a transaction amount or a transaction related value, a time stamp or an MSISDN.

The definition of dynamic credentials authentication rules ($S_{2R}/S_{2R'}$, $S_{3R}$, $S_{4R}$, $S_{5R}$) and associated authentication parameters for authentication services ($S_2$, $S_3$, $S_4$, $S_5$) has already been illustrated and explained in connection to FIG. 5.a.

According to FIG. 5.a, the personalization and/or configuration of the second mobile device application into the first mobile device for $S_2$ authentication service has been such that $DC_{121}$, $DC_{122}$ and $DC_{123}$ are always generated for $S_2$ mobile-related internet transactions; . . . ; and the personalization and/or configuration of the second mobile device application into the first mobile device for $S_5$ authentication service has been such it is always able to generate $DC_{151}$, $DC_{152}$, $DC_{153}$ and $DC_{154}$ for $S_5$ mobile-related internet transactions ($DC_{151}$ and $DC_{152}$ are always generated; $DC_{153}$ and/or $DC_{154}$ are generated or not depending on user's mobile device configuration and/or the options selected during the preparation of the internet transaction in the mobile device).

In a particular example internet transactions 4 to 6 are internet payments performed via a Virtual Point of Sale Terminal; the transaction value associated to $DC_{122}$ is the value of the amount being payed; the time stamp associated to $DC_{123}$ relates to the date/time/zone of the transaction.

In a particular example internet transactions 9 to 11 are transactions associated to authenticating a cash withdrawal request (e.g. user1 request cash via a virtual ATM to a sender); the transaction value associated to $DC_{152}$ is the amount of cash that is being requested; the msisdn_s associated to $DC_{153}$ is the msisdn of the sender that will receive the request upon a successful authentication of the internet transaction by service provider 2 ($DC_{153}$ is not generated for internet transaction 11 because the sender selected by user1 is user1 itself, and his/her msisdn_s for this type of transactions is already registered into the multilayer security system data base of service provider 2); the time stamp associated to $DC_{154}$ relates to the date/time/zone of the transaction ($DC_{154}$ is not generated for internet transaction 10 because the mobile device identifies that the date/time/zone set in the mobile device is not synchronized with the one of the mobile telephone network).

In the implementation of FIG. 5 the first and the additional dynamic authentication credentials generated for a given mobile-related internet transaction associated to $S_i$ (i=2 to 5) authentication service are $OTP_{Si}$ results calculated upon the $OTP_{Si}$ keys and parameters personalized in the mobile device application and an input data. In particular, for internet transactions 4 to 6:

$DC_{121}(PIN)=OTP_{S2/121}(PIN)$;

$DC_{122}(trans\_value)=OTP_{S2/122}(trans\_value)$;

$DC_{123}(time\_st)=OTP_{S2/123}(time\_st)$;

For internet transaction 7, the first and additional dynamic authentication credentials are OTP results calculated upon $OTP_{S3}$ keys and parameters and the related input data:

$DCs=OTPs_{S3}$

For internet transaction 8, the first and additional dynamic authentication credentials are OTP results calculated upon $OTP_{S4}$ keys and parameters and the related input data:

$DCs=OTPs_{S4}$

For internet transactions 9 to 11:

$DC_{151}(PIN)=OTP_{S5/151}(PIN)$;

$DC_{152}(trans\_value)=OTP_{S5/152}(trans\_value)$;

$DC_{153}(msisdn\_s)=OTP_{S5/153}(msisdn\_s)$;

$DC_{154}(time\_st)=OTP_{S5/154}(time\_st)$;

FIG. 5 shows in steps (1) and (2) the processes of receiving in the first mobile device input data from different sources, and the first mobile device using at least part of the input data received to generate dynamic authentication credentials for mobile-related internet transactions.

FIG. 5 shows (in combination with FIG. 3) in step (3), in connection to mobile-related internet transactions 4 to 11, the process of sending the first dynamic authentication credential (that uses a user's PIN as input data), the one or more additional dynamic authentication credentials (each one calculated by the mobile device upon a different input data), and at least one identifier related to the user and to the authentication service the dynamic authentication credentials relates to (referenced in the graphic as $ID_{U1/S2}$ in connection to User1/$S_2$, $ID_{U1/S3}$ in connection to User1/$S_3$, $ID_{U1/S4}$ in connection to User1/$S_4$ and $ID_{U1/S5}$ in connection to User1/$S_5$), to the transaction terminal that transmits (in step 4) said first dynamic authentication credential, one or more of the one or more additional dynamic authentication credentials, and at least one of the identifiers received, to one or more servers of one or more providers of authentication services for internet transactions.

As illustrated in FIG. 5 the transaction terminal may be different depending on the mobile-related internet transaction and the $S_i$ authentication service. In internet transactions 4, 5 and 6 the transaction terminal is a virtual Point of Sale Terminal (vPOS(600/1) vPOS(600/2) and vPOS(600/3) respectively). In internet transaction 7 the dynamic authentication credentials and the at least one identifier are sent to a first transaction terminal (Proxy Terminal 1000) that sends those data to a second transaction terminal (virtual POS (600/4)). In internet transaction 8 the dynamic authentication credentials and the at least one identifier are sent to a first transaction terminal (Proxy Terminal 900) that sends those data to a second transaction terminal (virtual Automatic Teller Machine ATM (700/1)). In internet transactions 9, 10 and 11 the transaction terminal is a virtual Automatic Teller Machine (vATM(700/2) vATM(700/3) and vATM (700/4) respectively).

In step (5) the dynamic authentication credentials and the at least one of the identifiers transmitted by the transaction terminal are received in the one or more servers of the multilayer security system of service provider 2. In FIG. 5 $ID_{U1/S2}$ is received in connection to internet transactions 4, 5, and 6; $ID_{U1/S3}$ is received in connection to internet transaction 7; $ID_{U1/S4}$ is received in connection to internet transaction 8; and $ID_{U1/S5}$ is received in connection to internet transactions 9, 10 and 11. As described above, in connection to FIG. 5:

$ID_{U1/Si}=[S_iID/S_iPAN]$, i=2 to 5

So in this embodiment the one or more providers of authentication services for internet transactions receives from the transaction terminal a first dynamic authentication credential generated by the mobile device using as input data a user's Personal Identification Number (PIN), one or more additional dynamic authentication credentials, each one calculated by the mobile device upon a different input data, and at least one identifier related to the user and to the authentication service the dynamic authentication credentials refers to.

In step (6) $ID_{U1/Si}$ is used to match at the multilayer security system of service provider 2 the corresponding mobile-related internet transaction, with the right customer reference(s) and with the rest of the $S_i$ related data and parameters into the database of service provider 2 ($ID_{U1/S2}$ is used in connection to internet transactions 4, 5, and 6; $ID_{U1/S3}$ is used in connection to internet transaction 7; $ID_{U1/S4}$ is used in connection to internet transaction 8; and $ID_{U1/S5}$ is used in connection to internet transactions 9, 10 and 11.

Upon said matching the security module authenticates in step (7), for a given mobile related internet transaction, the first dynamic authentication credential and further authenticates, based on authentication rules and associated authentication parameters, one or more of the one or more additional dynamic authentication credentials by one or more processing devices having access to at least a portion of data capable of linking the mobile device to one or more authentication services for internet transactions. The authentication is performed using the appropriate data (keys, parameters, input data, etc.), as well as the authentication rules and associated parameters for the related $S_i$ (i=2 to 5) authentication service. The authentication process is described herein below in the context of authenticating exemplary internet transactions 4 toll.

Authenticating internet transaction 4, using $S_{2R}$ authentication rules (step 7):

As already detailed in connection to FIG. 5.a, receiving $DC_{121}(PIN)$ (field (4,b)) and obtaining a successful result of the authentication of $DC_{121}(PIN)$ (field (5,b)) is Mandatory to obtain an overall successful result of the authentication of the internet transaction. Once the above referred matching (using $ID_{U1/S2}$) has been performed the security module first authenticate the $DC_{121}(PIN)$ received that, as above described, is an $OTP_{S2/121}(PIN)$ value. To perform said authentication, the one or more processing devices compares the $OTP_{S2/121}$ value received with at least one OTP result calculated by the one or more processing devices using the user PIN (stored in the multilayer security system of service provider 2 in association to $ID_{U1/Si}$ and to $DC_{1i1}$ first dynamic authentication credentials, i=2 to 5) as input data and $OTP_{S2}$ keys and parameters. Upon a successful matching the one or more processing devices interprets that the PIN inserted was correct and the result of the authentication of $DC_{121}(PIN)$ becomes successful. If there is not a successful matching the one or more processing devices will interpret that the PIN inserted was wrong and the result of the authentication will become unsuccessful. In this scenario a PIN error may be computed (an SMS or a notification could e.g. be sent to the user, alerting him/her about the computed PIN error; e.g. $S_i$ services could be temporarily blocked for said user after a defined number of consecutive PIN errors in $S_i$ mobile-related internet transactions). The result of the authentication of $DC_{121}(PIN)$ in internet transaction 4 is named $IT_4$-auth-$R_{DC121(PIN)}$.

As detailed in FIG. 5.a, receiving $DC_{123}(time\_st)$ (field (4,d)) and obtaining a successful result of the authentication of $DC_{123}(time\_st)$ (field (5,d)) is also Mandatory to obtain an overall successful result of the authentication of the internet transaction. So the security module authenticates the received $DC_{123}(time\_st)$ that, as above described, is an $OTP_{S2/123}(time\_st)$ value. To perform said authentication, the one or more processing devices compares the $OTP_{S2/123}$ value received with at least one OTP result calculated by the one or more processing devices using a time stamp (calculated by the multilayer security system of service provider 2 in association to the current date/time/zone e.g. of the mobile telephone network) as input data and $OTP_{S2}$ keys and parameters. Upon a successful matching the one or more processing devices interprets that the time stamp calculated by the mobile device application was correct (thus, in the example above, the date/time/zone set in the mobile device is synchronized with the one of the mobile telephone network and the matching provides a proof of authenticity of the mobile device application) and the result of the authentication of $DC_{123}(time\_st)$ becomes successful. If there is not a successful matching the one or more processing devices will interpret that the time stamp calculated by the mobile device application was wrong (probably because the mobile device settings are not stablished for the mobile device being synchronized with the date/time/zone of the mobile telephone network). The result of the authentication of $DC_{123}(time\_st)$ in internet transaction 4 is named $IT_4$-auth-$R_{DC123(time\_st)}$.

Even the second mobile device application into the first mobile device has been personalized and/or configured to generate $DC_{122}(trans\_value)$ (field (3,c)), the security module is aware that $DC_{122}$ could e.g. not always be received from the transaction terminal in the context of all $S_2$ related internet transactions, or the transaction value applied by some merchants in connection to certain transactions could not always be the procurement transaction value. In this embodiment $S_{2R}$ authentication rules are stablished such that successfully authenticating $DC_{122}$ may be Optional in connection to mobile-related internet transactions received from transaction terminals associated to selected merchants, and be Mandatory for the rest.

So as detailed in FIG. 5.a, receiving $DC_{122}(trans\_value)$ (field (4,c)) and obtaining a successful result of the authentication of $DC_{122}(trans\_value)$ (field (5,c)) is Optional to obtain an overall successful result of the authentication of the internet transaction associated to $ID_{U1/S2}$, as far as the internet transaction is received from a transaction terminal associated to a merchant into a list of selected merchants (selected merchants list in column (e)). If the transaction terminal is not associated to a merchant into the referred list of selected merchants, then obtaining a successful result of the authentication of $DC_{122}$ is Mandatory, to obtain an overall successful result of the authentication of the internet transaction associated to $ID_{U1/S2}$.

In an alternative embodiment, as already explained in connection to FIG. 5.a, table $S_{2R}$ refers to an scenario where receiving $DC_{123}(time\_st)$ and obtaining a successful result of the authentication of $DC_{123}(time\_st)$ is also Optional to obtain an overall successful result of the authentication of the internet transaction associated to $ID_{U1/S2}$, as far as the internet transaction is received from a transaction terminal associated to a merchant into a list of selected merchants (selected merchants list in column (e')). If the transaction terminal is not associated to a merchant into the referred list of selected merchants, then obtaining a successful result of the authentication of $DC_{123}$ is Mandatory, to obtain an overall successful result of the authentication of the internet transaction associated to $ID_{U1/S2}$.

Now continuing again with the embodiment referred to table $S_{2R}$, the security module authenticates the received $DC_{122}$(trans_value) that, as above described, is an $OTP_{S2/122}$(trans_value) value (if $DC_{122}$ is not received then the result of the authentication of $DC_{122}$ directly becomes non successful). To perform said authentication, the one or more processing devices compares the $OTP_{S2/122}$ value received with at least one OTP result calculated by the one or more processing devices using the transaction value received as input data and $OTP_{S2}$ keys and parameters. Upon a successful matching the one or more processing devices interprets that the transaction value used by the mobile device application was correctly authenticated and the result of the authentication of $DC_{122}$(trans_value) becomes successful. If there is not a successful matching, or $DC_{122}$ was not received from the transaction terminal, the one or more processing devices will associate it in this embodiment to a wrong transaction value used in $DC_{122}$ calculation (even if $DC_{122}$ was really not received from the transaction terminal). The result of the authentication of $DC_{122}$(trans_value) in internet transaction 4 is named $IT_4$-auth-$R_{DC122(trans\_value)}$.

The overall result of the $S_{2R}$ based authentication of internet transaction 4 is named $IT_4$-auth-$R_{TOTAL}$.

According to the $S_{2R}$ authentication rules described above, and the associated authentication parameters, a successful overall result of the authentication of internet transaction 4 requires success on all the following intermediate authentication results associated to internet transaction 4:

[$IT_4$-auth-$R_{DC121(PIN)}$;$IT_4$-auth-$R_{DC123(time\_st)}$];

and success also on [$IT_4$-auth-$R_{DC122(trans\_value)}$] if the transaction terminal is not associated to a merchant into the referred list of selected merchants;

An equivalent process could be followed in connection to authenticating internet transaction 5, and the results of the authentication of $DC_{121}$(PIN), $DC_{122}$(trans_value) and $DC_{123}$(time_st) will be obtained in the security module in connection to the context and input data of said internet transaction 5. According to the $S_{2R}$ authentication rules described above, and the associated authentication parameters, a successful overall result of the authentication of internet transaction 5 requires success on all the following intermediate authentication results associated to internet transaction 5:

[$IT_5$-auth-$R_{DC121(PIN)}$;$IT_5$-auth-$R_{DC123(time\_st)}$];

and success also on [$IT_5$-auth-$R_{DC122(trans\_value)}$] if the transaction terminal is not associated to a merchant into the referred list of selected merchants;

The overall result of the $S_{2R}$ based authentication of internet transaction 5 is named $IT_5$-auth-$R_{TOTAL}$.

An equivalent process could be also followed in connection to authenticating internet transaction 6, and the results of the authentication of $DC_{121}$(PIN), $DC_{122}$(trans_value) and $DC_{123}$(time_st) will be obtained in the security module in connection to the context and input data of said internet transaction 6. According to the $S_{2R}$ authentication rules described above, and the associated authentication parameters, a successful overall result of the authentication of internet transaction 6 requires success on all the following intermediate authentication results associated to internet transaction 6:

[$IT_6$-auth-$R_{DC121(PIN)}$;$IT_6$-auth-$R_{DC123(time\_st)}$];

and success also on [$IT_6$-auth-$R_{DC122(trans\_value)}$] if the transaction terminal is not associated to a merchant into the referred list of selected merchants;

The overall result of the $S_{2R}$ based authentication of internet transaction 6 is named $IT_6$-auth-$R_{TOTAL}$.

Authenticating internet transaction 9, using $S_{5R}$ authentication rules (step 7):

As already detailed in connection to FIG. 5.*a*, receiving $DC_{151}$(PIN) (field (4,m)) and obtaining a successful result of the authentication of $DC_{151}$(PIN) (field (5,m)) is Mandatory to obtain an overall successful result of the authentication of the internet transaction. Once the above referred matching (using $ID_{U1/S5}$) has been performed the security module first authenticate the $DC_{151}$(PIN) received that, as above described, is an $OTP_{S5/151}$(PIN) value. To perform said authentication, the one or more processing devices compares the $OTP_{S5/151}$ value received with at least one OTP result calculated by the one or more processing devices using the user PIN (stored in the multilayer security system of service provider 2 in association to $ID_{U1/Si}$ and to $DC_{1i1}$ first dynamic authentication credentials, i=2 to 5) as input data and $OTP_{S5}$ keys and parameters. Upon a successful matching the one or more processing devices interprets that the PIN inserted was correct and the result of the authentication of $DC_{151}$(PIN) becomes successful. If there is not a successful matching the one or more processing devices will interpret that the PIN inserted was wrong and the result of the authentication will become unsuccessful. In this scenario a PIN error may be computed (an SMS or a notification could e.g. be sent to the user, alerting him/her about the computed PIN error; e.g. $S_i$ services could be temporarily blocked for said user after a defined number of consecutive PIN errors in $S_i$ mobile-related internet transactions). The result of the authentication of $DC_{151}$(PIN) in internet transaction 9 is named $IT_9$-auth-$R_{DC151(PIN)}$.

As detailed in FIG. 5.*a*, receiving $DC_{152}$(trans_value) (field (4,n)) and obtaining a successful result of the authentication of $DC_{152}$(trans_value) (field (5,n)) is also Mandatory to obtain an overall successful result of the authentication of the internet transaction. So the security module authenticates the received $DC_{152}$(trans_value) that, as above described, is an $OTP_{S5/152}$(trans_value) value. To perform said authentication, the one or more processing devices compares the $OTP_{S5/152}$ value received with at least one OTP result calculated by the one or more processing devices using the transaction value received as input data and $OTP_{S5}$ keys and parameters. Upon a successful matching the one or more processing devices interprets that the transaction value used by the mobile device application was correctly authenticated and the result of the authentication of $DC_{152}$(trans_value) becomes successful. If there is not a successful matching the one or more processing devices will interpret that the transaction value used in $DC_{152}$ calculation was wrong. The result of the authentication of $DC_{152}$(trans_value) in internet transaction 9 is named $IT_9$-auth-$R_{DC152(trans\_value)}$.

As detailed in FIG. 5.*a*, receiving $DC_{153}$(msisdn_s) (field (4,o)) and obtaining a successful result of the authentication of $DC_{153}$(msisdn_s) (field (5,o)) is Optional (as said above, $DC_{153}$ is generated or not depending on the options selected during the preparation of the internet transaction in the mobile device) to obtain an overall successful result of the authentication of the internet transaction. If received, the security module authenticates the received $DC_{153}$(msisdn_s) that, as above described, is an $OTP_{S5/153}$(msisdn_s) value. To perform said authentication, the one or more processing devices compares the $OTP_{S5/153}$ value received with at least one OTP result calculated by the one or more processing devices using the received msisdn_s as input data and $OTP_{S5}$ keys and parameters. Upon a successful matching the one or more processing devices interprets that the msisdn_s used by the mobile device application was correctly authenticated and the result of the authentication of $DC_{153}$(msisdn_s) becomes successful. If $DC_{153}$ was not received or there is not a successful matching, the one or more processing devices will interpret that the msisdn_s was not successfully authenticated. The result of the authentication of $DC_{153}$(msisdn_s) in internet transaction 9 is named $IT_9$-auth-$R_{DC153(msisdn\_s)}$.

As detailed in FIG. 5.a, receiving $DC_{154}$(time_st) (field (4,p)) and obtaining a successful result of the authentication of $DC_{154}$(time_st) (field (5,p)) is Optional (as said above, $DC_{154}$ is generated or not depending on user's mobile device configuration) to obtain an overall successful result of the authentication of the internet transaction. If received, the security module authenticates the received $DC_{154}$(time_st) that, as above described, is an $OTP_{S5/154}$(time_st) value. To perform said authentication, the one or more processing devices compares the $OTP_{S5/154}$ value received with at least one OTP result calculated by the one or more processing devices using a time stamp (calculated by the multilayer security system of service provider 2 in association to the current date/time/zone e.g. of the mobile telephone network) as input data and $OTP_{S5}$ keys and parameters. Upon a successful matching the one or more processing devices interprets that the time stamp calculated by the mobile device application was correct (thus, in the example above, the date/time/zone set in the mobile device is synchronized with the one of the mobile telephone network and the matching provides a proof of authenticity of the mobile device application) and the result of the authentication of $DC_{154}$(time_st) becomes successful. If $DC_{154}$ was not received or there is not a successful matching, the one or more processing devices will interpret that the time stamp was not successfully authenticated. The result of the authentication of $DC_{154}$(time st) in internet transaction 9 is named $IT_9$-auth-$R_{DC154(time\_st)}$.

The overall result of the $S_{5R}$ based authentication of internet transaction 9 is named $IT_9$-auth-$R_{TOTAL}$.

According to the $S_{5R}$ authentication rules described above, and the associated authentication parameters, a successful overall result of the authentication of internet transaction 9 requires success on all the following intermediate authentication results associated to internet transaction 9:

[$IT_9$-auth-$R_{DC151(PIN)}$;$IT_9$-auth-$R_{DC152(trans\_value)}$];

An equivalent process could be followed in connection to authenticating internet transaction 10 (considering that $DC_{154}$ is not received, so $DC_{154}$ authentication result will not be successful), and the results of the authentication of $DC_{151}$(PIN), $DC_{152}$(trans_value), $DC_{153}$(msisdn_s) and $DC_{154}$(time_st) will be obtained in the security module in connection to the context and input data of said internet transaction 10. According to the $S_{5R}$ authentication rules described above, and the associated authentication parameters, a successful overall result of the authentication of internet transaction 10 requires success on all the following intermediate authentication results associated to internet transaction 10:

[$IT_{10}$-auth-$R_{DC151(PIN)}$;$IT_{10}$-auth-$R_{DC152(trans\_value)}$];

The overall result of the $S_{5R}$ based authentication of internet transaction 10 is named $IT_{10}$-auth-$R_{TOTAL}$.

An equivalent process could also be followed in connection to authenticating internet transaction 11 (considering that $DC_{153}$ is not received, so $DC_{153}$ authentication result will not be successful), and the results of the authentication of $DC_{151}$(PIN), $DC_{152}$(trans_value), $DC_{153}$(msisdn_s) and $DC_{154}$(time_st) will be obtained in the security module in connection to the context and input data of said internet transaction 11. According to the $S_{5R}$ authentication rules described above, and the associated authentication parameters, a successful overall result of the authentication of internet transaction 11 requires success on all the following intermediate authentication results associated to internet transaction 11:

[$IT_{11}$-auth-$R_{DC151(PIN)}$;$IT_{11}$-auth-$R_{DC152(trans\_value)}$];

The overall result of the $S_{5R}$ based authentication of internet transaction 11 is named $IT_{11}$-auth-$R_{TOTAL}$.

In this embodiment the one or more processing devices of the multilayer security system of service provider 2 stores in one or more memories, for each mobile-related internet transaction authenticated, the intermediate authentication results, the overall result of the authentication and the security valuations already explained in connection to FIG. 5.a. (SV1, SV2, SVT (not illustrated), in association to the corresponding $D_{Uj/Si}$ identifier.

Also, in connection a given mobile-related internet transaction authenticated:
the intermediate authentication results;
the overall result of the authentication;
and the security valuations (SV1, SV2, . . . and SVT);
are sent in step (8) by the one or more processing devices of the multilayer security system of service provider 2 to the legacy system of service provider 2. The data are sent in association to one or more customer references allowing service provider 2 to match the authentications results and security valuations to a user account.

So in step (8) the result of the authentication of the first dynamic authentication credential and the one or more of the one or more additional dynamic authentication credentials is sent to the entity in charge to authorize or deny the mobile-related internet transaction, and in step (9) the mobile-related internet transaction being authorized or denied based upon that authentication result, where the transaction being authorized always requires a successful result of the authentication of the first dynamic authentication credential. In the particular embodiment of FIG. 5, the entity authorizing or denying the mobile-related internet transaction is the service provider 2, by using its legacy system.

According to some implementations the authorization or denial of the internet transaction may also depend on the authentication of other credentials that may be comprised into internet transaction data or may also be based on other additional transaction acceptance or denial criteria (e.g. risk criteria defined by the entity authorizing or denying the mobile-related internet transaction).

According to some implementations the authorization or denial relates to a first part of the internet transaction and completion of the internet transaction authorization or denial process requires further processing by one or more entities. In a particular example upon a successful result of the authentication of e.g. internet transaction 9, the first part of the internet transaction is authorized by service provider 2, that request the transaction value to the sender (e.g. the request may come from a merchant or a service provider acting as user1, and the sender may be a physical person having a debt; e.g. the request may come from a physical person and the sender may be a friend or a family member). In a particular example, the sender uses mobile device generated dynamic authentication credentials and the methods described in this specification to authenticate the second part of the internet transaction.

According to some implementations a first mobile-related internet transaction associated to the least one identifier related to the user and to the authentication service the dynamic authentication credentials relates to (e.g. internet transaction 4 associated to $ID_{U1/S2}$), has been authorized upon a successful authentication result (e.g. $IT_4$-auth-$R_{TOTAL}$) and one or more successive related internet transactions later obtain a successful authentication result by one or more processing devices of one or more service providers (e.g. the multilayer security system of service provider 2) based on the successful authentication result of the first transaction. Particular examples of the one or more successive related transactions are a confirmation or a cancellation of a preauthorization mobile-related internet transaction, an internet recurrent payment of a subscription, or an authorization of an internet transaction that is subsequent to a first one where the merchant has verified whether the user payment instrument is operative for payments. According to some implementations the result of the authentication of a successive related internet transaction is sent to the entity that authorized the first mobile-related transaction (e.g. service provider 2) and the successive related internet transaction is authorized or denied by said entity upon that authentication result.

As already said above, in internet transactions 4, 5 and 6 the transaction terminal is a virtual Point of Sale Terminal (vPOS(600/1) vPOS(600/2) and vPOS(600/3) respectively):

In an particular embodiment, in the context of internet transaction 4, vPOS(600/1) transmits to the multilayer security system of service provider 2 all the dynamic authentication credentials received, so $DC_{121}$(PIN), $DC_{122}$(trans_value) and $DC_{123}$(time_st) are transmitted from the transaction terminal to the multilayer security system of service provider 2, and received in the multilayer security system of service provider 2, and authenticated by one or more processing devices as already described above, using $S_{2R}$ authentication rules. If all the intermediate authentication results are successful, the security valuation SVT will be the sum of SV1, SV2 and SV3 that is the maximum for a given $S_2$ mobile-related internet transaction.

In a particular embodiment, in the context of internet transaction 5, vPOS(600/2) transmits to the multilayer security system of service provider 2 the first dynamic authentication credential and part of the additional dynamic authentication credentials received (in this embodiment vPOS(600/2) is associated to a merchant into the list of selected merchants: column (e) in $S_{2R}$ table). In particular, $DC_{121}$(PIN) and $DC_{123}$(time_st) are transmitted from the transaction terminal to the multilayer security system of service provider 2, and received in the multilayer security system of service provider 2, and authenticated by one or more processing devices as already described above, using $S_{2R}$ authentication rules. If the intermediate authentication results related to $DC_{121}$ and $DC_{123}$ are successful, the security valuation SVT will be the sum of SV1 and SV3.

In the embodiment above vPOS(600/1) is not associated to a merchant into the list of selected merchants so a successful overall result of the authentication $IT_4$-auth-$R_{TOTAL}$ of internet transaction 4 requires success on all the following intermediate authentication results ($IT_4$-auth-$R_{DC121(PIN)}$, $IT_4$-auth-$R_{DC123(time\_st)}$ and $IT_4$-auth-$R_{DC122(trans\_value)}$) associated to internet transaction 4.

According to some implementations part of the one or more additional dynamic authentication credentials generated by the mobile device are not received (e.g. $DC_{122}$ is not received from vPOS(600/2) in the multilayer security system of service provider 2, in the context of internet transaction 5) from the transaction terminal, and the result of the authentication (e.g. $IT_5$-auth-$R_{TOTAL}$) is based upon the result of the authentication of the first dynamic authentication credential (e.g. $IT_5$-auth-$R_{DC121(PIN)}$ in internet transaction 5) and, according to the authentication rules and associated authentication parameters, the result of the authentication of at least part of the one or more additional dynamic authentication credentials received (e.g. $IT_5$-auth-$R_{DC123(time\_st)}$ in internet transaction 5).

Advantageously the $S_{2R}$ authentication rules allows (as said above, vPOS(600/2) is associated to a merchant into the list of selected merchants) that the overall result of the authentication $IT_5$-auth-$R_{TOTAL}$ of internet transaction 5 will be only based on intermediate authentication results $IT_5$-auth-$R_{DC121(PIN)}$ and $IT_5$-auth-$R_{DC123(time\_st)}$, and not necessarily on the authentication of $DC_{122}$ (that has not been received in the multilayer security system of service provider 2 in the context of internet transaction 5). So in these implementations the authentication rules may permit generating a successful authentication result in connection to certain transactions received from transaction terminals belonging to a selected group of merchants, when part of the additional dynamic authentication credentials are not received. These group may refer e.g. to a set of merchants that are considered "more trusted" by the provider of authentication services or by the service provider in change to finally authorize or deny the internet transaction.

According to some implementations some mobile-related internet transactions associated to a given authentication service (e.g. $S_2$) are authorized or denied based on the result of authenticating a first set of mobile device generated dynamic authentication credentials (e.g. in internet transaction 4, the authorization requires a successful overall result of the authentication $IT_4$-auth-$R_{TOTAL}$; and a successful overall result of the authentication requires success on the following intermediate authentication results: $IT_4$-auth-$R_{DC121(PIN)}$, $IT_4$-auth-$R_{DC123(time\_st)}$ and $IT_4$-auth-$R_{DC122(trans\_value)}$) while other mobile-related internet transactions associated to the same authentication service ($S_2$) are authorized or denied based on the result of authenticating a different set of mobile device generated dynamic authentication credentials (e.g. in internet transaction 5, the authorization requires a successful overall result of the authentication $IT_5$-auth-$R_{TOTAL}$; and a successful overall result of the authentication requires success on the following intermediate authentication results: $IT_5$-auth-$R_{DC121(PIN)}$ and $IT_5$-auth-$R_{DC123(time\_st)}$), depending on the authentication parameters and the associated authentication rules, and also depending on the additional dynamic authentication credentials received.

Now an embodiment that uses $S_{2R}$ authentication rules is described, in reference to internet transactions 4 (processes differently than in the previous embodiment), and to internet transaction 6:

In this embodiment, in the context of internet transaction 4, vPOS(600/1) transmits to the multilayer security system of service provider 2 all the dynamic authentication credentials received, so $DC_{121}$(PIN), $DC_{122}$(trans_value) and $DC_{123}$(time_st) are transmitted from the transaction terminal to the multilayer security system of service provider 2, and received in the multilayer security system of service provider 2, and authenticated by one or more processing devices as already described above, using $S_{2R'}$ authentication rules. If all the intermediate authentication results are successful, the security valuation SVT will be the sum of SV1, SV2 and SV3 that is the maximum for a given $S_2$ mobile-related internet transaction.

In this embodiment, in the context of internet transaction 6, vPOS(600/3) transmits to the multilayer security system of service provider 2 the first dynamic authentication credential and none of the additional dynamic authentication credentials received (in this embodiment vPOS(600/3) is associated to a merchant into the list of selected merchants: column (e') in $S_{2R}$ table). In particular, $DC_{121}$(PIN) is transmitted from the transaction terminal to the multilayer security system of service provider 2, and received in the multilayer security system of service provider 2, and authenticated by one or more processing devices as already described above, using $S_{2R}$ authentication rules. If the intermediate authentication result related to $DC_{121}$ is successful, the security valuation SVT will be equal to SV1.

In this embodiment vPOS(600/1) is not associated to a merchant into the list of selected merchants so a successful overall result of the authentication of internet transaction 4 requires success on all the following intermediate authentication results ($IT_4$-auth-$R_{DC121}$(PIN), $IT_4$-auth-$R_{DC123(time\_st)}$ and $IT_4$-auth-$R_{DC122(trans\_value)}$) associated to internet transaction 4.

According to some implementations in connection to a first mobile-related internet transaction (e.g. internet transaction 6) associated to a given authentication service (e.g. $S_2$) none of the one or more additional dynamic authentication credentials generated by the mobile device are received from the transaction terminal (e.g. vPOS(600/3)), and in connection to a second mobile-related internet transaction (e.g. internet transaction 4) associated to said authentication service ($S_2$) the one or more additional dynamic authentication credentials generated by the mobile device are received ($DC_{122}$ and $DC_{123}$) from the same or another transaction terminal (e.g. vPOS(600/1)), and the authentication parameters and rules permits that the result of the authentication of the first mobile-related internet transaction ($IT_6$-auth-$R_{TOTAL}$) being based upon the result of the authentication of the first dynamic authentication credential ($IT_6$-auth-$R_{DC121(PIN)}$), while the result of the authentication of the second mobile-related internet transaction ($IT_4$-auth-$R_{TOTAL}$) being based upon the result of the authentication of the first dynamic authentication credential ($IT_4$-auth-$R_{DC121(PIN)}$) and one or more of the one or more additional dynamic authentication credentials ($IT_4$-auth-$R_{DC123(time\_st)}$ and $IT_4$-auth-$R_{DC122(trans\_value)}$).

Now an example that uses again $S_{2R}$ authentication rules is described, in reference to internet transactions 4 (processes differently than in the previous embodiments):

In this example vPOS(600/1) transmits to the multilayer security system of service provider 2 all the dynamic authentication credentials received, so $DC_{121}$(PIN), $DC_{122}$(trans_value) and $DC_{123}$(time_st) are transmitted from the transaction terminal to the multilayer security system of service provider 2, and received in the multilayer security system of service provider 2, and authenticated by one or more processing devices as already described above, using $S_{2R}$ authentication rules.

In this example vPOS(600/1) is associated to a merchant into the list of selected merchants so a successful overall result of the authentication $IT_4$-auth-$R_{TOTAL}$ of internet transaction 4 requires success on the following intermediate authentication results:

$IT_4$-auth-$R_{DC121(PIN)}$ and $IT_4$-auth-$R_{DC123(time\_st)}$.

In the example the result of the authentication of $DC_{122}$ (trans_value) in internet transaction 4, $IT_4$-auth-$R_{DC122(trans\_value)}$, is not successful and the one or more processing devices of the multilayer security system of service provider 2 will associate it to a wrong transaction value used in $DC_{122}$ calculation.

In step (8) the one or more processing devices sent, in connection to internet transaction 4, the intermediate authentication results ($IT_4$-auth-$R_{DC121}$(PIN), $IT_4$-auth-$R_{DC122(trans\_value)}$ and $IT_4$-auth-$R_{DC123(time\_st)}$), the overall result of the authentication ($IT_4$-auth-$R_{TOTAL}$) and the security valuations (SV1, SV2, . . . and SVT) for internet transaction 4.

In spite that $IT_4$-auth-$R_{DC122(trans\_value)}$ is not successful, $IT_4$-auth-$R_{TOTAL}$ is successful, and service provider 2 authorizes the mobile-related internet transaction based upon a successful $IT_4$-auth-$R_{TOTAL}$ result. In such an scenario, a notification may be sent to the user advising him/her about the failure in the transaction amount authentication. So according to some implementations the mobile-related internet transaction is authorized even when the authentication of the one or more additional dynamic authentication credentials received results in one or more authentication failures, and a notification is sent to the user's mobile device.

By receiving said notifications, the user may be aware that the transaction value applied by some merchants in connection to certain internet transactions could not always be the procurement transaction value, and it reduces the security of the internet transaction.

As already referred above, in internet transactions 9, 10 and 11 the transaction terminal is a virtual Automatic Teller Machine (vATM(700/2) vATM(700/3) and vATM(700/4) respectively):

In an particular embodiment, in the context of internet transaction 9, vATM(700/2) transmits to the multilayer security system of service provider 2 all the dynamic authentication credentials received, so $DC_{151}$(PIN), $DC_{152}$(trans_value), $DC_{153}$(msisdn_s) and $DC_{154}$(time_st) are transmitted from the transaction terminal to the multilayer security system of service provider 2, and received in the multilayer security system of service provider 2, and authenticated by one or more processing devices as already described above, using $S_{5R}$ authentication rules. If all the intermediate authentication results are successful, the security valuation SVT will be the sum of SV1, SV2, SV3 and SV4 that is the maximum for a given $S_5$ mobile-related internet transaction.

In a particular embodiment, in the context of internet transaction 10, vATM(700/3) transmits to the multilayer security system of service provider 2 all the dynamic authentication credentials received, so $DC_{151}$ (PIN), $DC_{152}$(trans_value) and $DC_{153}$(msisdn_s) are transmitted from the transaction terminal to the multilayer security system of service provider 2, and received in the multilayer security system of service provider 2, and authenticated by one or more processing devices as already described above, using $S_{5R}$ authentication rules. If the intermediate authentication results related to $DC_{151}$, $DC_{152}$ and $DC_{153}$ are successful, the security valuation SVT will be the sum of SV1, SV2 and SV3.

In a particular embodiment, in the context of internet transaction 11, vATM(700/4) transmits to the multilayer security system of service provider 2 all the dynamic authentication credentials received, so $DC_{151}$ (PIN), $DC_{152}$(trans_value) and $DC_{154}$(time_st) are transmitted from the transaction terminal to the multilayer security system of service provider 2, and received in the multilayer security system of service provider 2, and authenticated by one or more processing devices as already described above, using $S_{5R}$ authentication rules. If the intermediate authentication results related to $DC_{151}$, $DC_{152}$ and $DC_{154}$ are successful, the security valuation SVT will be the sum of SV1, SV2 and SV4.

So in the exemplary internet transactions 9, 10 and 11, all the dynamic authentication credentials received by the transaction terminal are transmitted to the multilayer security system of service provider 2, for authentication.

According to some implementations the set of one or more additional dynamic authentication credentials (e.g. $DC_{152}$, $DC_{153}$ and $DC_{154}$) received from a transaction terminal (e.g. vATM(700/2)) in connection to a first mobile-related internet transaction (e.g. internet transaction 9) associated to a first authentication service ($S_5$) is different than the set of one or more additional dynamic authentication credentials (e.g. $DC_{122}$ and $DC_{123}$) received from the same or from another transaction terminal (e.g. vPOS(600/1)) in connection to a second mobile-related internet transaction (e.g. internet transaction 4) associated to a second authentication service ($S_2$), and the one or more providers of authentication services (e.g. the multilayer security system of service provider 2) authenticate one or more additional dynamic authentication credentials of the first set based upon authentication rules ($S_{5R}$) and related authentication parameters associated to the first authentication service and authenticate one or more additional dynamic authentication credentials of the second set based upon authentication rules ($S_{2R}$) and related authentication parameters associated to the second authentication service.

FIG. 6 illustrates part of an implementation to authenticate mobile-related internet transactions by use of one or more processing devices, where the transactions are authenticated upon a set of individual authentications of user's mobile device generated dynamic authentication credentials, each dynamic authentication credential associated to a given individual input data. This implementation is associated with one or more providers of authentication services for internet transactions in connection with the use of a mobile device that generates dynamic authentication credentials and a transaction terminal that transmits at least part of the dynamic authentication credentials.

FIG. 6 illustrates a first mobile device with four mobile device applications, where the mobile device applications have been personalized to generate dynamic authentication credentials for one or more $S_i$ authentication services as already described in connection to FIG. 3.

FIG. 6 refers in particular to the authentication of dynamic authentication credentials related to $S_6$ authentication service. The registration for $S_6$ authentication service and the personalization of the third mobile device application in the first mobile device may be performed for $S_6$ authentication service by following a process equivalent to the one described in FIG. 2 in connection to $S_1$, but applied in this implementation to $S_6$ authentication service.

FIG. 6 illustrates in particular an extract of data stored in one or more memories that reside in one or more servers of the multilayer security system of service provider 3, related to the registration process of $S_6$ authentication service for a given mobile device and the related personalization of a mobile device application in said mobile device (e.g. data associated to the registration process of $S_6$ authentication service for the first mobile device and the related personalization of the third mobile device application in said first mobile device). So the multilayer security system of service provider 3 electronically stores in one or more memories data capable of linking the mobile device to one or more authentication services for internet transactions, the data including authentication parameters associated to dynamic credentials authentication rules and one or more identifiers related to the user and the one or more authentication services. FIG. 6 shows an embodiment where the hash ($AC_{S6}$) and the [$S_6$ ID/$S_6$ PAN], stored in the multilayer security system database of service provider 3, may be used as identifiers related to the user and to the authentication service $S_6$.

As shown in FIG. 6, the authentication service $S_6$ is associated to the authentication rules $S_{6R}$ to authenticate $S_6$ dynamic credentials. In this embodiment the referred associations and rules are defined in the credentials & authentication rules module. The dynamic credentials authentication rules of this embodiment use associated authentication parameters as those illustrated in FIG. 6a, stored in one or more memories of the multilayer security system of service provider 3. The dynamic credentials authentication rules and the usage of the associated authentication parameters is later described in the context of authenticating internet transactions 12 and 13 (illustrated in FIG. 6).

In the embodiment of FIG. 6, the $ID_{U1/S6}$ is constituted by an authentication service identifier plus a personal account number as follows, as illustrated in the data base of the multilayer security system of service provider 3:

$$ID_{U1/S6} = [S_6 \text{ ID}/S_6 \text{PAN}]$$

The $S_6$ PAN value is a unique identifier such that one or more processing devices of the multilayer security system of service provider 3 will be able to match a given mobile-related internet transaction with the user, the mobile device, the right customer reference(s) and data and parameters into the database of service provider 3. The $S_6$ ID permits the one or more processing devices to identify the authentication service the mobile-related internet transaction refers to.

In some services (considering not only the ones related to this embodiment but also the ones of any other embodiment of this invention), a given authentication service may relate to more than one user's product (e.g. $S_6$ may refer to authentication of peer to peer, peer to business and business to business mobile-related internet transactions and the user may have more than one account number to order instant money transfer from, registered into the multilayer security system of service provider 3 for mobile-related internet transaction authentication services). In this case a different unique identifier may be used to allow the one of more processing devices to assign a given mobile-related internet transaction to a specific account number to order instant money transfer from. In the example above, if the customer has e.g. two account numbers registered for $S_6$ authentication service (e.g. a first account number and a second account number), a different PAN may be assigned to each account number product: i.e. there would be a $S_6$ PAN1 and a $S_6$ PAN2. For simplicity, in this document there will generally only be a reference to one unique identifier per user, mobile device and authentication service, but it shall be noted that multiple identifiers, one per product registered for the authentication service, may be used without departing from the scope of the invention. As a particular example, a PAN may be calculated as a function of the device ID and an activation code, such that if the result was already assigned to other user and mobile device (/and product) for a given authentication service then the next available value will be assigned as PAN; many other methods can be used to calculate PAN values being unique identifiers.

Implementations above related to $ID_{U1/S6}$ identifiers are illustrative and are not exclusive of other possibilities to match in the multilayer security system of a given service provider by one or more processing devices a given mobile-related internet transaction with a user, a mobile device, an authentication service and a related product.

In FIG. 6, in connection to the illustrated mobile-related internet transactions, a first dynamic authentication credential ($DC_{161}$) is generated using the user's PIN associated to the third mobile device application authentication service in the first mobile device as input data; and some additional dynamic authentication credentials have been generated using as input data a msisdn of a beneficiary ($DC_{162a}$ in connection to internet transaction 12), an iban of the beneficiary ($DC_{162b}$ in connection to internet transaction 13), a transaction value ($DC_{163}$ in connection to internet transactions 12 and 13) or a time stamp ($DC_{164}$ in connection to internet transactions 12 and 13) (or a derivative of any of them). As detailed in the table of FIG. 6.*a*, in connection to some $S_6$ related internet transactions a $DC_{162c}$ additional dynamic authentication credential may be generated e.g. using the email of the beneficiary (email_b) as input data. According to some implementation user1 of the first mobile device will select, when selecting via the third mobile device application the beneficiary of e.g. an instant money transfer, whether an msisdn, iban or an email of the beneficiary will be used as input data to calculate the $DC_{1621}$ dynamic authentication credential.

So in this implementation the input data used to calculate an additional dynamic authentication credential is one of, or a derivative of one of, a transaction amount or a transaction related value, a time stamp, an MSISDN, an email, an IBAN or an account number.

The definition of dynamic credentials authentication rules ($S_{6R}$) and associated authentication parameters for authentication service $S_6$ has already been illustrated and explained in connection to FIG. 6.*a*.

According to FIG. 6.*a*, the personalization and/or configuration of the third mobile device application into the first mobile device for $S_6$ authentication service has been such that it is always able to generate $DC_{161}$, $DC_{162a}$/$DC_{162b}$, $DC_{162c}$, $DC_{163}$ and $DC_{164}$ for $S_6$ mobile-related internet transactions ($DC_{161}$, $DC_{163}$ and $DC_{164}$ are always generated; one of $DC_{162a}$, $DC_{162b}$ or $DC_{162c}$ is generated depending on whether an msisdn_b, an iban_b or an email_b is selected as input data during the preparation of the internet transaction in the mobile device).

In a particular example internet transaction 12 is a peer to merchant internet payment performed via a Payment Service Provider transaction terminal (PSP(800)); $DC_{162a}$ is generated using the msisdn of the beneficiary merchant as input data; the transaction value associated to $DC_{163}$ is the value of the amount being payed; the time stamp associated to $DC_{164}$ relates to the date/time/zone of the transaction.

In a particular example internet transactions 13 is a peer to peer internet payment that uses mobile-device generated dynamic authentication credentials; $DC_{162b}$ is generated using the iban of the beneficiary as input data; the transaction value associated to $DC_{163}$ is the value of the amount being payed; the time stamp associated to $DC_{164}$ relates to the date/time/zone of the transaction.

In the implementation of FIG. 6 the first and the additional dynamic authentication credentials generated for a given mobile-related internet transaction associated to $S_6$ authentication service are OTP results calculated upon the OTP keys and parameters personalized in the mobile device application for $S_6$ authentication service and an input data. In particular:

$DC_{161}(PIN)=OTP_{161}(PIN);$ $DC_{162a}(msisdn\_b)=OTP_{162a}(msisdn\_b);$ $DC_{162b}(iban\_b)=OTP_{162b}(iban\_b);$ $DC_{162c}(email\_b)=OTP_{162c}(email\_b);$ $DC_{163}(trans\_value)=OTP_{163}(trans\_value);$ $DC_{164}(time\_st)=OTP_{164}(time\_st);$ FIG. 6 shows in steps (1) and (2) the processes of receiving in the first mobile device input data from different sources, and the first mobile device using at least part of the input data received to generate dynamic authentication credentials for mobile-related internet transactions.

FIG. 6 shows in step (3), in connection to mobile-related internet transactions 12 and 13, the process of sending the first dynamic authentication credential (that uses a user's PIN as input data), the one or more additional dynamic authentication credentials (each one calculated by the mobile device upon a different input data), and at least one identifier related to the user and to the authentication service the dynamic authentication credentials relates to (referenced in the graphic as $ID_{U1/S6}$ in connection to User1/$S_6$), to the transaction terminal that transmits (in step 4) said first dynamic authentication credential, one or more of the one of more additional dynamic authentication credentials, and at least one of the identifiers received, to one or more servers of one or more providers of authentication services for internet transactions.

As illustrated in FIG. 6, in internet transactions 12 the transaction terminal is a terminal (I a system) of a Payment Service Provider (PSP(800)).

In connection to internet transaction 13, the transaction terminal that transmits the first dynamic authentication credential, one or more of the one of more additional dynamic authentication credentials, and at least one of the identifiers received, is the mobile device that generates the dynamic authentication credentials, so steps (3) and (4) are the same one.

In step (5) the dynamic authentication credentials and the at least one of the identifiers transmitted by the transaction terminal are received in the one or more servers of the multilayer security system of service provider 3. In FIG. 6 $ID_{U1/S6}$ is received in connection to internet transactions 12 and 13. As described above $ID_{U1/S6}=[S_6\ ID/S_6\ PAN]$.

So in this embodiment the one or more providers of authentication services for internet transactions receives from the transaction terminal a first dynamic authentication credential generated by the mobile device using as input data a user's Personal Identification Number (PIN), one or more additional dynamic authentication credentials, each one calculated by the mobile device upon a different input data, and at least one identifier related to the user and to the authentication service the dynamic authentication credentials refers to.

In step (6) $ID_{U1/S6}$ is used to match at the multilayer security system of service provider 3 the corresponding mobile-related internet transaction, with the right customer reference(s) and with the rest of the $S_6$ related data and parameters into the database of service provider 3 ($ID_{U1/S6}$ is used in connection to internet transactions 12 and 13).

Upon said matching the security module authenticates in step (7), for a given mobile related internet transaction, the first dynamic authentication credential and further authenticates, based on authentication rules and associated authentication parameters, one or more of the one or more additional dynamic authentication credentials by one or more processing devices having access to at least a portion of data capable of linking the mobile device to one or more authentication services for internet transactions. The authentication is performed using the appropriate data (keys, parameters, input data, etc.) as well as the authentication rules and associated parameters for $S_6$ authentication service. The authentication process is described herein below in the context of authenticating exemplary internet transactions 12 and 13.

Authenticating internet transaction 12, using $S_{6R}$ authentication rules (step 7):

As already detailed in connection to FIG. 6.*a*, receiving $DC_{161}(PIN)$ (field (4,b)) and obtaining a successful result of the authentication of $DC_{161}(PIN)$ (field (5,b)) is Mandatory to obtain an overall successful result of the authentication of the internet transaction. Once the above referred matching (using $ID_{U1/S6}$) has been performed the security module first authenticate the $DC_{161}$(PIN) received that, as above described, is an $OTP_{161}$(PIN) value. To perform said authentication, the one or more processing devices compares the $OTP_{161}$ value received with at least one OTP result calculated by the one or more processing devices using the user PIN (stored in the multilayer security system of service provider 3 in association to $ID_{U1/S6}$ and to $DC_{161}$ first dynamic authentication credential) as input data and OTP keys and parameters. Upon a successful matching the one or more processing devices interprets that the PIN inserted was correct and the result of the authentication of $DC_{161}(PIN)$ becomes successful. If there is not a successful matching the one or more processing devices will interpret that the PIN inserted was wrong and the result of the authentication will become unsuccessful. In this scenario a PIN error may be computed (an SMS or a notification could e.g. be sent to the user, alerting him/her about the computed PIN error; e.g. $S_6$ service could be temporarily blocked for said user after a defined number of consecutive PIN errors in $S_6$ mobile-related internet transactions). The result of the authentication of $DC_{161}(PIN)$ in internet transaction 12 is named $IT_{12}$-auth-$R_{DC161(PIN)}$.

As detailed in FIG. 6.*a*, receiving one of $DC_{162a}$(msisdn_b), $DC_{162b}$(iban_b) or $DC_{162c}$(email_b) (field (4, (c/b/e))) and obtaining a successful result of the authentication of the one of $DC_{162}$(msisdn_b), $DC_{162b}$(iban_b) or $DC_{162c}$(email_b) (field (5, (c/d/e))) is also Mandatory to obtain an overall successful result of the authentication of the internet transaction.

So according to some implementations the authentication rules and related authentication parameters associated to the least one identifier related to the user and to the authentication service the dynamic authentication credentials relates to (e.g. associated to $ID_{U1/S6}$), comprises at least one authentication parameter associated to at least one additional dynamic authentication credential (e.g. value in fields (4, (c/d/e)) and (5, (c/d/e)) associated to $DC_{162a}$, $D_{162b}$ and $DC_{162c}$).

In the context of internet transaction 12, the security module authenticates the received $DC_{162a}$(msisdn_b) that, as above described, is an $OTP_{162a}$(msisdn_b) value. To perform said authentication, the one or more processing devices compares the $OTP_{162a}$ value received with at least one OTP result calculated by the one or more processing devices using the msisdn_b received as input data and OTP keys and parameters. Upon a successful matching the one or more processing devices interprets that the msisdn_b used by the mobile device application was correctly authenticated and the result of the authentication of $DC_{162a}$(msisdn_b) becomes successful. If there is not a successful matching the one or more processing devices will interpret that the msisdn of the beneficiary, used in $DC_{162a}$ calculation, was wrong. The result of the authentication of $DC_{162a}$(msisdn_b) in internet transaction 12 is named $IT_{12}$-auth-$R_{DC162a(msisdn\_b)}$.

As detailed in FIG. 6.*a*, receiving $DC_{163}$(trans_value) (field (4,f)) and obtaining a successful result of the authentication of $DC_{163}$(trans_value) (field (5,f)) is also Mandatory to obtain an overall successful result of the authentication of the internet transaction. So the security module authenticates the received $DC_{163}$(trans_value) that, as above described, is an $OTP_{163}$(trans_value) value. To perform said authentication, the one or more processing devices compares the $OTP_{163}$ value received with at least one OTP result calculated by the one or more processing devices using the transaction value received as input data and OTP keys and parameters. Upon a successful matching the one or more processing devices interprets that the transaction value used by the mobile device application was correctly authenticated and the result of the authentication of $DC_{163}$(trans_value) becomes successful. If there is not a successful matching the one or more processing devices will interpret that the transaction value used in $DC_{163}$ calculation was wrong. The result of the authentication of $DC_{163}$(trans_value) in internet transaction 12 is named $IT_{12}$-auth-$R_{DC163(trans\_value)}$.

As detailed in FIG. 6.*a*, receiving $DC_{164}$(time_st) (field (4,g)) and obtaining a successful result of the authentication of $DC_{164}$(time_st) (field (5,g)) is also Mandatory to obtain an overall successful result of the authentication of the internet transaction. So the security module authenticates the received $DC_{164}$(time_st) that, as above described, is an $OTP_{164}$(time_st) value. To perform said authentication, the one or more processing devices compares the $OTP_{164}$ value received with at least one OTP result calculated by the one or more processing devices using a time stamp (calculated by the multilayer security system of service provider 3 in association to the current date/time/zone e.g. of the mobile telephone network) as input data and OTP keys and parameters. Upon a successful matching the one or more processing devices interprets that the time stamp calculated by the mobile device application was correct (thus, in the example above, the date/time/zone set in the mobile device is synchronized with the one of the mobile telephone network and the matching provides a proof of authenticity of the mobile device application) and the result of the authentication of $DC_{164}$(time_st) becomes successful. If there is not a successful matching, the one or more processing devices will interpret that the time stamp was not successfully authenticated. The result of the authentication of $DC_{164}$(time st) in internet transaction 12 is named $IT_{12}$-auth-$R_{DC164(time\_st)}$.

The overall result of the $S_{6R}$ based authentication of internet transaction 12 is named $IT_{12}$-auth-$R_{TOTAL}$.

According to the $S_{6R}$ authentication rules described above, and the associated authentication parameters, a successful overall result of the authentication of internet transaction 12 requires success on all the following intermediate authentication results associated to internet transaction 12:

[$IT_{12}$-auth-$R_{DC161(PIN)}$;$IT_{12}$-auth-$R_{DC163(trans\_value)}$;
    $IT_{12}$-auth-$R_{DC164(time\_st)}$]; and [$IT_{12}$-auth-
    $R_{DC162a(msisdn\_b)}$];

An equivalent process could be followed in connection to authenticating internet transaction 13 (considering that $DC_{162b}$ is received so the results of the authentication of $DC_{161}$(PIN), $DC_{162b}$(iban_b), $DC_{163}$(trans_value) and $DC_{164}$(time_st) will be obtained in the security module in connection to the context and input data of said internet transaction 13. According to the $S_{6R}$ authentication rules described above, and the associated authentication parameters, a successful overall result of the authentication of internet transaction 13 requires success on all the following intermediate authentication results associated to internet transaction 13:

[$IT_{13}$-auth-$R_{DC161(PIN)}$;$IT_{13}$-auth-$R_{DC163(trans\_value)}$;
    $IT_{13}$-auth-$R_{DC164(time\_st)}$]; and [$IT_{13}$-auth-
    $R_{DC162b(iban\_b)}$];

The overall result of the $S_{6R}$ based authentication of internet transaction 13 is named $IT_{13}$-auth-$R_{TOTAL}$.

In this embodiment the one or more processing devices of the multilayer security system of service provider 3 stores in one or more memories, for each mobile-related internet transaction authenticated, the intermediate authentication results, the overall result of the authentication and the security valuations already explained in connection to FIG. 6.a. (SV1, SV2 (shared between $DC_{162a}$, $DC_{162b}$ and $DC_{162c}$ for a given internet transaction because only one of them is received in the context of said given mobile related internet transaction associated to $S_6$), SV3, SV4 and SVT), in association to the corresponding $ID_{Uj/S6}$ identifier.

Also, in connection a given mobile-related internet transaction authenticated:
    the intermediate authentication results;
    the overall result of the authentication;
    and the security valuations (SV1, SV2, SV3, SV4 and SVT);
are sent in step (8) by the one or more processing devices of the multilayer security system of service provider 3 to the legacy system of service provider 3. The data are sent in association to one or more customer references allowing service provider 3 to match the authentications results and security valuations to a user account.

In step (8) the result of the authentication of the first dynamic authentication credential and the one or more of the one or more additional dynamic authentication credentials is sent to the entity in charge to authorize or deny the mobile related internet transaction, and in step (9) the mobile-related internet transaction being authorized or denied based upon that authentication result, where the transaction being authorized always requires a successful result of the authentication of the first dynamic authentication credential. In the particular embodiment of FIG. 6, the entity authorizing or denying the mobile-related internet transaction is (at least partly) the service provider 3, by using its legacy system.

According to some implementations the authorization or denial of the internet transaction may also depend on the authentication of other credentials that may be comprised into internet transaction data or may also be based on other additional transaction acceptance or denial criteria (e.g. risk criteria defined by the entity authorizing or denying the mobile-related internet transaction).

According to some implementations the above referred authorization or denial of the mobile-related internet transaction only refers to the part of the transaction that falls in the domain of the referred entity (service provider 3 in the example of FIG. 6); if that part is authorized by said entity, the internet transaction progress to the next step for further processing until completion. In a particular example the internet transaction is a peer to peer payment transaction and the beneficiary is not a customer of service provider 3 thus even if service provider 3 authorizes the first part of the transaction, the entity(s) acquiring the transaction and completing it may later deny the transaction (e.g. the acquiring entity later deny the transaction because when trying to match the msisdn of the beneficiary to an iban of the beneficiary via a peer to peer directory, it is noticed that the beneficiary iban account was already cancelled).

According to some implementations some mobile-related internet transactions associated to a given authentication service (e.g. $S_6$) are authorized or denied based on the result (e.g. $IT_{12}$-auth-$R_{TOTAL}$ related to internet transaction 12) of authenticating a first set of mobile device generated dynamic authentication credentials ($DC_{161}$, $DC_{162a}$, $DC_{163}$ and $DC_{164}$ related to internet transaction 12) while other mobile-related internet transactions associated to the same authentication service ($S_6$) are authorized or denied based on the result (e.g. $IT_{13}$-auth-$R_{TOTAL}$ related to internet transaction 13) of authenticating a different set of mobile device generated dynamic authentication credentials ($DC_{161}$, $DC_{162b}$, $DC_{163}$ and $DC_{164}$ related to internet transaction 13), depending on the authentication parameters and the associated authentication rules, and also depending on the additional dynamic authentication credentials received.

In a particular example of internet transaction 12, the result $IT_{12}$-auth-$R_{DC164(time\_st)}$ of the authentication of $DC_{164}$(time_st) has not been successful so, according to the $S_{6R}$ authentication rules the overall result $IT_{12}$-auth-$R_{TOTAL}$ of the authentication of internet transaction 12 is not successful. As already mentioned above, the service provider 3 receives, in connection e.g. to internet transaction 12, the intermediate authentication results, the overall result of the authentication and the security valuations. In this example, in spite that $IT_{12}$-auth-$R_{TOTAL}$ has not successful because $IT_{12}$-auth-$R_{DC164(time\_st)}$ has not been successful, the service provider 3 authorizes the mobile-related internet transaction 12 based upon a successful result of the authentication of the rest of the dynamic authentication credentials ($DC_{161}$, $DC_{162a}$ and $DC_{163}$ in connection to internet transaction 12). In such scenario, a notification may be sent to the user suggesting him/her the adjustment of the date/time/zone settings into his/her smartphone to be synchronized with the one of the mobile telephone network such that successive transactions may be also authorized based on success of the authentication of the timestamp related dynamic authentication credential. So according to some implementations the mobile-related internet transaction is authorized even when the authentication of the one or more additional dynamic authentication credentials received results in one or more authentication failures, and a notification is sent to the user's mobile device.

According to some implementations a second additional dynamic authentication credential generated by the mobile device upon a given input data is also calculated upon one or more other input data, the one or more other input data has been used to generate one or more first additional dynamic authentication credentials, and the one or more providers of authentication services first authenticates the one or more first additional dynamic authentication credentials by using one or more processing devices such that if the authentication of said one or more first additional dynamic authentication credentials were successful then an authentication failure on the second additional dynamic authentication credential can be univocally assigned by the one or more processing devices to an error in the input data. In a particular example, in a variation of internet transaction 12, $DC_{163}$ is calculated using trans_value as input data, and msisdn_b as other input data. $DC_{162a}$ has been successfully authenticated so a failure in the authentication of $DC_{163}$ can be univocally assigned to an error associated to the trans_value input data.

According to some implementations the other input data of the second additional dynamic authentication credential comprises the user's PIN such that if the authentication of the first dynamic authentication credential were successful then an authentication failure on the second additional dynamic authentication credential can be univocally assigned by the one or more processing devices to an error in the input data. In a particular example, in other variation of internet transaction 12, $DC_{163}$ is calculated using trans_value as input data and the user's PIN as other input data. $DC_{161}$ and $DC_{162a}$ has been successfully authenticated so a failure in the authentication of $DC_{163}$ can be univocally assigned to an error associated to the trans_value input data.

FIG. 7 illustrates part of an implementation to authenticate mobile-related internet transactions by use of one or more processing devices, where the transactions are authenticated upon a set of individual authentications of user's mobile device generated dynamic authentication credentials, each dynamic authentication credential associated to a given individual input data. This implementation is associated with one or more providers of authentication services for internet transactions in connection with the use of a mobile device that generates dynamic authentication credentials and a transaction terminal that transmits at least part of the dynamic authentication credentials.

FIG. 7 illustrates a first mobile device with four mobile device applications, where the mobile device applications have been personalized to generate dynamic authentication credentials for one or more $S_i$ authentication services as already described in connection to FIG. 3.

FIG. 7 refers in particular to the authentication of dynamic authentication credentials related to $S_7$ authentication service. The registration for $S_7$ authentication service and the personalization of the fourth mobile device application in the first mobile device may be performed for $S_7$ authentication service by following a process equivalent to the one described in FIG. 2 in connection to $S_1$, but applied in this implementation to $S_7$ authentication service.

FIG. 7 illustrates in particular an extract of data stored in one or more memories that reside in one or more servers of the multilayer security system of service provider 4, related to the registration process of $S_7$ authentication service for a given mobile device and the related personalization of a mobile device application in said mobile device (e.g. data associated to the registration process of $S_7$ authentication service for the first mobile device and the related personalization of the fourth mobile device application in said first mobile device). So the multilayer security system of service provider 4 electronically stores in one or more memories data capable of linking the mobile device to one or more authentication services for internet transactions, the data including authentication parameters associated to dynamic credentials authentication rules and one or more identifiers related to the user and the one or more authentication services. FIG. 7 shows an embodiment where the hash ($AC_{S7}$) and the hash(Device ID & $AC_{S7}$), stored in the multilayer security system database of service provider 4, may be used as identifiers related to the user and to the authentication service $S_7$.

As shown in FIG. 7, the authentication service $S_7$ is associated to the authentication rules $S_{7R}$ to authenticate $S_7$ dynamic credentials. In this embodiment the referred associations and rules are defined in the credentials & authentication rules module. The dynamic credentials authentication rules of this embodiment use associated authentication parameters as those illustrated in FIG. 7.*a*, stored in one or more memories of the multilayer security system of service provider 4. The dynamic credentials authentication rules and the usage of the associated authentication parameters is later described in the context of authenticating internet transactions 14 and 15 (illustrated in FIG. 7).

In the embodiment of FIG. 7, $ID_{U1/S7}$=hash(Device ID & $AC_{S7}$) for user1 and $S_7$ authentication service. The has value is a unique identifier such that one or more processing devices of the multilayer security system of service provider 4 will be able to match a given mobile-related internet transaction with the authentication service, the user, the mobile device, the right customer reference(s) and the data and parameters into the database of service provider 4. So if when the hash value is calculated e.g. during the process of registering a user and a mobile device for a $S_7$ authentication service, the one or more processing devices identify that said value was already assigned to other user, mobile device and authentication service then the next consecutive available value is assigned to the user, mobile device and authentication service in the context of registering said user and mobile device for the referred authentication service. Many other possibilities to generate account identifiers exists, and the one described in this embodiment is not exclusive of other means to generate account identifiers for the purpose to match a given mobile-related internet transaction with a given user, authentication service and mobile device.

In the context of FIG. 7 the user1 is performing an internet transaction via the legacy system of service provider 4, and he/she selects authenticating the transaction via the fourth mobile device application in the first mobile device. A transaction ID (that is a unique identifier, typically valid only for a limited period of time) is assigned to the internet transaction and send from the legacy system of service provider 4 to the multilayer security system of service provider 4, together with transaction data, and they are stored in one or more memories of the multilayer security system of service provider 4.

In a particular example the transaction ID received is ciphered in the multilayer security system of service provider 4 (before being sent to the first mobile device) with a key that is hard-coded in the fourth mobile device application in the first mobile device, and the hard-coded key will be used by the fourth mobile device application to decipher said transaction ID before using it as input data to calculate dynamic authentication credential $DC_{172}$ (illustrated in FIG. 7). So according to some implementations the input data used to calculate an additional dynamic authentication credential, or a derivative of the input data, has been previously sent by the one or more providers of authentication services and received by the mobile device and stored in one or more memories of the mobile device.

The transaction ID (that is a token), together with transaction data, is send (e.g. via a push notification) from the multilayer security system of service provider 4 to the first mobile device and stored in a data base associated to the fourth mobile device application, for the fourth mobile device application later using said transaction ID for a dynamic authentication credential ($DC_{172}$) generation. Upon receiving the data and the transaction ID a message is displayed to user1 via the first mobile device, including data about the transaction that user1 is performing via the legacy system of service provider 4, and the user is asked about whether he/she wants to confirm ("e-sign") the internet transaction.

If user1 wants to confirm the internet transaction he/she must insert his/her PIN selected for $S_7$ authentication service in the first mobile device and the fourth mobile device application will use it to generate the first dynamic authentication credential ($DC_{171}$) of internet transaction 14 (that in this example is used to authenticate, together with the related additional dynamic authentication credentials, the internet transaction that user1 is performing via the legacy system of service provider 4).

In this example the internet transaction that user1 is performing via the legacy system of service provider 4 has an associated transaction value (e.g. the internet transaction may refer to user1 ordering a banking transfer via the web portal of service provider 4) that has been received by the first mobile device together with the transaction ID and the rest of the above referred transaction data. The additional dynamic authentication credentials $DC_{172}$ and $DC_{173}$ associated to internet transaction 14 are generated using as input data the transaction ID and the transaction value respectively (or a derivative of any of them).

FIG. 7 also refers to the context of user1 performing other internet transaction via the legacy system of service provider 4. The processes related to the transaction ID and the transaction data would be equivalent to those already described above, but now related to a different internet transaction performed by user1 (that does not have an associated transaction value, as detailed herein below) and to internet transaction 15 associated to $S_7$ authentication service.

If user1 wants to confirm the internet transaction he/she must insert his/her PIN selected for $S_7$ authentication service in the first mobile device and the fourth mobile device application will use it to generate the first dynamic authentication credential ($DC_{171}$) of internet transaction 15 (that in this example is used to authenticate, together with the related additional dynamic authentication credential, the internet transaction that user1 is performing via the legacy system of service provider 4).

In this example the internet transaction that user1 is performing via the legacy system of service provider 4 has not an associated transaction value (e.g. the internet transaction may refer to the activation of a previously received credit card via the web portal of service provider 4), so it has not been included within the transaction data sent from the multilayer security system of service provider 4 to the first mobile device, together with the transaction ID. As illustrated in FIG. 7, the additional dynamic authentication credential $DC_{172}$ associated to internet transaction 15 is generated using as input data the transaction ID (or a derivative of it).

So according to some implementations the input data used to calculate an additional dynamic authentication credential is one of, or a derivative of one of, a transaction amount or a transaction related value or a token.

The definition of dynamic credentials authentication rules ($S_{7R}$) and associated authentication parameters for authentication service $S_7$ has already been illustrated and explained in connection to FIG. 7.a.

According to FIG. 7.a, the personalization and/or configuration of the fourth mobile device application into the first mobile device for $S_7$ authentication service has been such that it is always able to generate $DC_{171}$, $DC_{172}$ and $DC_{173}$ for $S_7$ mobile-related internet transactions ($DC_{171}$ and $DC_{172}$ are always generated; $DC_{173}$ is generated in case the transaction value is received from the multilayer security system of service provider 4 within the transaction data received).

In the implementation of FIG. 7 the first and the additional dynamic authentication credentials generated for a given mobile-related internet transaction associated to $S_7$ authentication service are OTP results calculated upon the OTP keys and parameters personalized in the mobile device application for $S_7$ authentication service and an input data. In particular:

$DC_{171}(PIN)=OTP_{171}(PIN);$ $DC_{172}(transac\_ID)=OTP_{172}(transac\_ID);$ $DC_{173}(trans\_value)=OTP_{173}(trans\_value);$ FIG. 7 shows in steps (1) and (2) the processes of receiving in the first mobile device input data from different sources, and the first mobile device using at least part of the input data received to generate dynamic authentication credentials for mobile-related internet transactions.

FIG. 7 shows in step (3), in connection to mobile-related internet transactions 14 and 15, the process of sending the first dynamic authentication credential (that uses a user's PIN as input data), the one or more additional dynamic authentication credentials (each one calculated by the mobile device upon a different input data), and at least one identifier related to the user and to the authentication service the dynamic authentication credentials relates to (referenced in the graphic as $ID_{U1/S7}$ in connection to User1/$S_7$), to the transaction terminal that transmits (in step 4) said first dynamic authentication credential, one or more of the one of more additional dynamic authentication credentials, and at least one of the identifiers received, to one or more servers of one or more providers of authentication services for internet transactions.

In the implementation illustrated in FIG. 7 the transaction terminal that transmits the first dynamic authentication credential, one or more of the one of more additional dynamic authentication credentials, and at least one of the identifiers received, is the mobile device that generates the dynamic authentication credentials, so steps (3) and (4) are the same one.

In step (5) the dynamic authentication credentials and the at least one of the identifiers transmitted by the transaction terminal are received in the one or more servers of the multilayer security system of service provider 4. In FIG. 7 $ID_{U1/S7}$ is received in connection to internet transactions 14 and 15. As described above $ID_{U1/S7}$=hash(Device ID & $AC_{S7}$).

So in this embodiment the one or more providers of authentication services for internet transactions receives from the transaction terminal a first dynamic authentication credential generated by the mobile device using as input data a user's Personal Identification Number (PIN), one or more additional dynamic authentication credentials, each one calculated by the mobile device upon a different input data, and at least one identifier related to the user and to the authentication service the dynamic authentication credentials refers to.

In step (6) $ID_{U1/S7}$ is used to match at the multilayer security system of service provider 4 the corresponding mobile-related internet transaction, with the right customer reference(s) and with the rest of the $S_7$ related data and parameters into the database of service provider 4 ($ID_{U1/S7}$ is used in connection to internet transactions 14 and 15).

Upon said matching the security module authenticates in step (7), for a given mobile related internet transaction, the first dynamic authentication credential and further authenticates, based on authentication rules and associated authentication parameters, one or more of the one or more additional dynamic authentication credentials by one or more processing devices having access to at least a portion of data capable of linking the mobile device to one or more authentication services for internet transactions. The authentication is performed using the appropriate data (keys, parameters, input data, etc.) as well as the authentication rules and associated parameters for $S_7$ authentication service. The authentication process is described herein below in the context of authenticating exemplary internet transactions 14 and 15.

Authenticating internet transaction 14, using $S_{7R}$ authentication rules (step 7):

As already detailed in connection to FIG. 7.a, receiving $DC_{171}$(PIN) (field (4,b)) and obtaining a successful result of the authentication of $DC_{171}$(PIN) (field (5,b)) is Mandatory to obtain an overall successful result of the authentication of the internet transaction. Once the above referred matching (using $ID_{U1/S7}$) has been performed the security module first authenticate the $DC_{171}$ (PIN) received that, as above described, is an $OTP_{171}$ (PIN) value. To perform said authentication, the one or more processing devices compares the $OTP_{171}$ value received with at least one OTP result calculated by the one or more processing devices using the user PIN (stored in the multilayer security system of service provider 4 in association to $ID_{U1/S7}$ and to $DC_{171}$ first dynamic authentication credential) as input data and OTP keys and parameters. Upon a successful matching the one or more processing devices interprets that the PIN inserted was correct and the result of the authentication of $DC_{171}$(PIN) becomes successful. If there is not a successful matching the one or more processing devices will interpret that the PIN inserted was wrong and the result of the authentication will become unsuccessful. In this scenario a PIN error may be computed (an SMS or a notification could e.g. be sent to the user, alerting him/her about the computed PIN error; e.g. $S_7$ service could be temporarily blocked for said user after a defined number of consecutive PIN errors in $S_7$ mobile-related internet transactions). The result of the authentication of $DC_{171}$(PIN) in internet transaction 14 is named $IT_{14}$-auth-$R_{DC171(PIN)}$.

As detailed in FIG. 7.a, receiving $DC_{172}$(transac_ID) (field (4,c)) and obtaining a successful result of the authentication of $DC_{172}$(transac_ID) (field (5,c)) is also Mandatory to obtain an overall successful result of the authentication of the internet transaction. So the security module authenticates the received $DC_{172}$ (transac_ID) that, as above described, is an $OTP_{172}$ (transac_ID) value. To perform said authentication, the one or more processing devices compares the $OTP_{172}$ value received with at least one OTP result calculated by the one or more processing devices using the transaction ID (stored in one or more memories of the multilayer security system of service provider 4; in a particular example verification about whether the transaction ID token has not expired is performed) as input data and OTP keys and parameters. Upon a successful matching (and the transaction ID token not being expired) the one or more processing devices interprets that the transaction ID used by the mobile device application was correctly authenticated and the result of the authentication of $DC_{172}$(transact_ID) becomes successful. If there is not a successful matching (or the transaction ID token being expired) the one or more processing devices will interpret that the transaction ID used in $DC_{172}$ calculation was wrong. The result of the authentication of $DC_{172}$(transac_ID) in internet transaction 14 is named $IT_{14}$-auth-$R_{DC172(transac\_ID)}$.

As detailed in FIG. 7.a, $DC_{173}$ is generated by the fourth mobile device application in the first mobile device (in the context of a given mobile-related internet transaction) when the transaction value has been sent from the multilayer security system of service provider 4 within the transaction data sent to the first mobile device, and has then been received by the first mobile device (it is the case in internet transaction 14). In this embodiment $S_{7R}$ authentication rules are stablished such that successfully authenticating $DC_{173}$ may be Optional, in connection to a given $S_7$ mobile-related internet transaction, when the transaction value associated to said transaction has not been sent from the multilayer security system of service provider 4 (in that case $DC_{173}$ will not be generated), and be Mandatory for the rest. In connection to internet transaction 14, the transaction value has been sent, and then received by the first mobile device, and used to generate $DC_{173}$ (as illustrated in FIG. 7).

As detailed in FIG. 7.a, receiving $DC_{173}$(trans_value) (field (4,d)) and obtaining a successful result of the authentication of $DC_{173}$(trans_value) (field (5,d)) is Optional (according to above explanations) to obtain an overall successful result of the authentication of the internet transaction. If $DC_{173}$ is received in the context of internet transaction 14, the security module authenticates the received $DC_{173}$(trans_value) that, as above described, is an $OTP_{173}$(trans_value) value. To perform said authentication, the one or more processing devices compares the $OTP_{173}$ value received with at least one OTP result calculated by the one or more processing devices using the transaction value (stored in the multilayer security system of service provider 4) as input data and OTP keys and parameters. Upon a successful matching the one or more processing devices interprets that the transaction value used by the mobile device application was correctly authenticated and the result of the authentication of $DC_{173}$(trans_value) becomes successful. If $DC_{173}$ was not received (e.g. because even the transaction value was sent to the first mobile device it was not received, so $DC_{173}$ was not generated by the fourth mobile device application, as above detailed) or there is not a successful matching, the one or more processing devices will interpret that the transaction value was not successfully authenticated. The result of the authentication of $DC_{173}$ (trans_value) in internet transaction 14 is named $IT_{14}$-auth-$R_{DC173(trans\_value)}$.

The overall result of the $S_{7R}$ based authentication of internet transaction 14 is named $IT_{14}$-auth-$R_{TOTAL}$.

Considering above explanations, according to some implementations the authentication rules and related authentication parameters associated to the least one identifier related to the user and to the authentication service the dynamic authentication credentials relates to (e.g. associated to $ID_{U1/S7}$), comprises at least one authentication parameter associated to each additional dynamic authentication credential (e.g. value in fields (4, c) and (5, c) associated to $DC_{172}$; and value in fields (4, d) and (5, d) associated to $DC_{173}$).

According to the $S_{7R}$ authentication rules described above, and the associated authentication parameters, a successful overall result of the authentication of internet transaction 14 requires success on all the following intermediate authentication results associated to internet transaction 14:

[$IT_{14}$-auth-$R_{DC171(PIN)}$;$IT_{14}$-auth-$R_{DC172(transac\_ID)}$];

and success also on [$IT_{14}$-auth-$R_{DC173(trans\_value)}$] (as the transaction value was sent by the multilayer security system of service provider 4 within the transaction data sent to the first mobile device);

An equivalent process could be followed in connection to authenticating internet transaction 15 (considering that the transaction value was not sent from the multilayer security system of service provider 4 within the transaction data sent to the first mobile device, so $DC_{173}$ has not been generated by the fourth mobile device application). According to the $S_{7R}$ authentication rules described above, and the associated authentication parameters, a successful overall result of the authentication of internet transaction 15 requires success on all the following intermediate authentication results associated to internet transaction 15:

[$IT_{15}$-auth-$R_{DC171(PIN)}$;$IT_{15}$-auth-$R_{DC172(transac\_ID)}$];

The overall result of the $S_{7R}$ based authentication of internet transaction 15 is named $IT_{15}$-auth-$R_{TOTAL}$.

In this embodiment the one or more processing devices of the multilayer security system of service provider 4 stores in one or more memories, for each mobile-related internet transaction authenticated, the intermediate authentication results, the overall result of the authentication and the security valuations already explained in connection to FIG. 7.a. (SV1, SV2, SV3 and SVT), in association to the corresponding $D_{Uj/S7}$ identifier.

Also, in connection a given mobile-related internet transaction authenticated:
the intermediate authentication results;
the overall result of the authentication;
and the security valuations (SV1, SV2, SV3 and SVT);

are sent in step (8) by the one or more processing devices of the multilayer security system of service provider 4 to the legacy system of service provider 4. The data are sent in association to one or more customer references allowing service provider 4 to match the authentications results and security valuations to a user account.

In step (8) the result of the authentication of the first dynamic authentication credential and the one or more of the one or more additional dynamic authentication credentials is sent to the entity in charge to authorize or deny the mobile related internet transaction, and in step (9) the mobile-related internet transaction being authorized or denied based upon that authentication result, where the transaction being authorized always requires a successful result of the authentication of the first dynamic authentication credential. In the particular embodiment of FIG. 7, the entity authorizing or denying the mobile-related internet transaction is the service provider 4, by using its legacy system.

According to some implementations the authorization or denial of the internet transaction may also depend on the authentication of other credentials that may be comprised into internet transaction data or may also be based on other additional transaction acceptance or denial criteria (e.g. risk or eligibility criteria defined by the entity authorizing or denying the mobile-related internet transaction).

As detailed in connection to FIG. 7 and FIG. 7.a, according to some implementations some mobile-related internet transactions associated to a given authentication service (e.g. $S_7$) are authorized or denied based on the result (e.g. $IT_{14}$-auth-$R_{TOTAL}$ related to internet transaction 14) of authenticating a first set of mobile device generated dynamic authentication credentials ($DC_{171}$, $DC_{172}$ and $DC_{173}$ related to internet transaction 14) while other mobile-related internet transactions associated to the same authentication service ($S_7$) are authorized or denied based on the result (e.g. $IT_{15}$-auth-$R_{TOTAL}$ related to internet transaction 15) of authenticating a different set of mobile device generated dynamic authentication credentials ($DC_{171}$ and $DC_{172}$ related to internet transaction 15), depending on the authentication parameters and the associated authentication rules, and also depending on the additional dynamic authentication credentials received.

So this invention provides a huge number of methods and techniques to authenticate by use of one or more processing devices mobile-related internet transactions, where the transactions are authenticated upon a set of individual authentications of user's mobile device generated dynamic credentials, each dynamic credential associated to a given individual input data.

Although exemplary implementations have been described in detail for the purpose of illustration, it is understood that such detail is solely for that purpose, and variations can be made therein by those skilled in the art without departing from the scope of the invention.

Further, although the implementations disclosed herein with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

Clause 1: According to one implementation what is provided is a method associated with one or more providers of authentication services for internet transactions in connection with the use of a mobile device that generates dynamic authentication credentials and a transaction terminal that transmits at least part of the dynamic authentication credentials, the method comprising: electronically storing in one or more memories data capable of linking the mobile device to one or more authentication services for internet transactions, the data including authentication parameters associated to dynamic credentials authentication rules and one or more identifiers related to the user and the one or more authentication services; receiving from the transaction terminal a first dynamic authentication credential generated by the mobile device using as input data a user's Personal Identification Number (PIN), one or more additional dynamic authentication credentials, each one calculated by the mobile device upon a different input data, and at least one identifier related to the user and to the authentication service the dynamic authentication credentials refers to; authenticating the first dynamic authentication credential and further authenticating, based on authentication rules and associated authentication parameters, one or more of the one or more additional dynamic authentication credentials by one or more processing devices having access to at least a portion of the data; and sending the result of the authentication of the first dynamic authentication credential and the one or more of the one or more additional dynamic authentication credentials, and the mobile-related internet transaction being authorized or denied based upon that authentication result, where the transaction being authorized always requires a successful result of the authentication of the first dynamic authentication credential.

Clause 2: According to one implementation what is provided is a method according to clause 1 wherein the authentication rules and related authentication parameters associated to the least one identifier related to the user and to the authentication service the dynamic authentication credentials relates to, comprises at least one authentication parameter associated to the first dynamic authentication credential.

Clause 3: According to one implementation what is provided is a method according to clause 1 wherein the authentication rules and related authentication parameters associated to the least one identifier related to the user and to the authentication service the dynamic authentication credentials relates to, comprises at least one authentication parameter associated to at least one additional dynamic authentication credential.

Clause 4: According to one implementation what is provided is a method according to clause 1 wherein the authentication rules and related authentication parameters associated to the least one identifier related to the user and to the authentication service the dynamic authentication credentials relates to, comprises at least one authentication parameter associated to each additional dynamic authentication credential.

Clause 5: According to one implementation what is provided is a method according to clause 1 wherein the data stored in the one or more memories related to a first authentication service is stored in a first memory or set of memories of a first provider of authentication services for mobile-related internet transactions and the data stored in the one or more memories related to a second authentication service is stored in a second memory or set of memories of a second provider of authentication services for mobile-related internet transactions.

Clause 6: According to one implementation what is provided is a method according to clause 1 wherein the one or more processing devices include a first processing device associated with a first provider of authentication services for mobile-related internet transactions and a second processing device associated with a second provider of authentication services for mobile-related internet transactions.

Clause 7: According to one implementation what is provided is a method according to clause 1 wherein the one or more memories and the one or more processing devices reside in one or more servers of the one or more providers of authentication services for mobile-related internet transactions.

Clause 8: According to one implementation what is provided is a method according to clause 1 wherein the entity authorizing or denying the mobile-related internet transaction is the same entity than one of the one or more providers of authentication services.

Clause 9: According to one implementation what is provided is a method according to clause 1 wherein the PIN is inserted by the user in the mobile device for the mobile device calculating the first dynamic authentication credential.

Clause 10: According to one implementation what is provided is a method according to clause 1 wherein the PIN is a biometric-PIN that is stored in a memory associated to the mobile device, and the mobile device using it as input data to calculate the first dynamic authentication credential requires a previous successful verification by the mobile device of user's fingerprint data captured by the mobile device.

Clause 11: According to one implementation what is provided is a method according to clause 1 wherein the input data used to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

Clause 12: According to one implementation what is provided is a method according to clause 1 wherein the input data used to calculate an additional dynamic authentication credential, or a derivative of the input data, has been previously sent by the one or more providers of authentication services and received by the mobile device for storage.

Clause 13: According to one implementation what is provided is a method according to clause 1 wherein an input data based derivative of a dynamic authentication credential has been calculated by the one or more providers of authentication services and it is sent to the mobile device, and the mobile device generates the dynamic authentication credential using the input data.

Clause 14: According to one implementation what is provided is a method according to clause 1 wherein the transaction terminal that transmits the dynamic authentication credentials is the mobile device that generates the dynamic authentication credentials.

Clause 15: According to one implementation what is provided is a method according to clause 1 wherein part of the one or more additional dynamic authentication credentials generated by the mobile device are not received from the transaction terminal, and the result of the authentication is based upon the result of the authentication of the first dynamic authentication credential and, according to the authentication rules and associated authentication parameters, the result of the authentication of at least part of the one or more additional dynamic authentication credentials received.

Clause 16: According to one implementation what is provided is a method according to clause 1 wherein in connection to a first mobile-related internet transaction associated to a given authentication service none of the one or more additional dynamic authentication credentials generated by the mobile device are received from the transaction terminal, and in connection to a second mobile-related internet transaction associated to said authentication service the one or more additional dynamic authentication credentials generated by the mobile device are received from the same or another transaction terminal, and the authentication parameters and rules permits that the result of the authentication of the first mobile-related internet transaction being based upon the result of the authentication of the first dynamic authentication credential, while the result of the authentication of the second mobile-related internet transaction being based upon the result of the authentication of the first dynamic authentication credential and one or more of the one or more additional dynamic authentication credentials.

Clause 17: According to one implementation what is provided is a method according to clause 1 wherein some mobile-related internet transactions associated to a given authentication service are authorized or denied based on the result of authenticating a first set of mobile device generated dynamic authentication credentials while other mobile-related internet transactions associated to the same authentication service are authorized or denied based on the result of authenticating a different set of mobile device generated dynamic authentication credentials, depending on the authentication parameters and the associated authentication rules, and also depending on the additional dynamic authentication credentials received.

Clause 18: According to one implementation what is provided is a method according to clause 1 wherein the mobile-related internet transaction is authorized even when the authentication of the one or more additional dynamic authentication credentials received results in one or more authentication failures, and a notification is sent to the user's mobile device.

Clause 19: According to one implementation what is provided is a method according to clause 1 wherein the set of one or more additional dynamic authentication credentials received from a transaction terminal in connection to a first mobile-related internet transaction associated to a first authentication service is different than the set of one or more additional dynamic authentication credentials received from the same or from another transaction terminal in connection to a second mobile-related internet transaction associated to a second authentication service, and the one or more providers of authentication services authenticate one or more additional dynamic authentication credentials of the first set based upon authentication rules and related authentication parameters associated to the first authentication service and authenticate one or more additional dynamic authentication credentials of the second set based upon authentication rules and related authentication parameters associated to the second authentication service.

Clause 20: According to one implementation what is provided is a method according to clause 1 wherein the set of one or more additional dynamic authentication credentials, generated in a first mobile device with a first personalization and/or configuration and received from a transaction terminal in connection to a first mobile-related internet transaction associated to a first authentication service is different than the set of one or more additional dynamic authentication credentials, generated in a second mobile device with a second personalization and/or configuration and received from a transaction terminal in connection to a second mobile-related internet transaction associated to the first authentication service, and the one or more providers of authentication services authenticate in connection to the first mobile-related internet transaction one or more additional dynamic authentication credentials of the first set based upon authentication rules associated to the first mobile device personalization and/or configuration for the first authentication service and authenticate in connection to the second mobile-related internet transaction one or more additional dynamic authentication credentials of the second set based upon authentication rules associated to the second mobile device personalization and/or configuration for the first authentication service.

Clause 21: According to one implementation what is provided is a method according to clause 1 wherein some mobile-related internet transactions associated to a given authentication service and to a first mobile device are authorized or denied based on the result of authenticating a first set of mobile device generated dynamic authentication credentials while other mobile-related internet transactions associated to the same authentication service and to a second mobile device are authorized or denied based on the result of authenticating a different set of mobile device generated dynamic authentication credentials, depending on the authentication parameters and the associated authentication rules, and also depending on the personalization and/or configuration of the first and second mobile device respectively.

Clause 22: According to one implementation what is provided is a method according to clause 1 wherein the one or more providers of authentication services for internet transactions sends a notification to the user's mobile device to inform that more additional dynamic authentication credentials associated to a given authentication service could be generated by the mobile device, the notification related to modifying the personalization and/or configuration of the mobile device for the mobile device to generate said more additional dynamic authentication credentials, each one calculated by the mobile device upon different input data, in successive mobile-related internet transactions.

Clause 23: According to one implementation what is provided is a method according to clause 1 wherein a second additional dynamic authentication credential generated by the mobile device upon a given input data is also calculated upon one or more other input data, the one or more other input data has been used to generate one or more first additional dynamic authentication credentials, and the one or more providers of authentication services first authenticates the one or more first additional dynamic authentication credentials by using one or more processing devices such that if the authentication of said one or more first additional dynamic authentication credentials were successful then an authentication failure on the second additional dynamic authentication credential can be univocally assigned by the one or more processing devices to an error in the input data.

Clause 24: According to one implementation what is provided is a method according to clause 23 wherein the other input data of the second additional dynamic authentication credential comprises the user's PIN such that if the authentication of the first dynamic authentication credential were successful then an authentication failure on the second additional dynamic authentication credential can be univocally assigned by the one or more processing devices to an error in the input data.

Clause 25: According to one implementation what is provided is a method according to clause 1 wherein the authorization or denial relates to a first part of the internet transaction and completion of the internet transaction authorization or denial process requires further processing by one or more entities.

Clause 26: According to one implementation what is provided is a method according to clause 1 wherein a first mobile-related internet transaction associated to the least one identifier related to the user and to the authentication service the dynamic authentication credentials relates to, has been authorized upon a successful authentication result and one or more successive related internet transactions later obtain a successful authentication result by one or more processing devices of one or more service providers based on the successful authentication result of the first transaction.

Clause 27: According to one implementation what is provided is a method according to clause 26 wherein the result of the authentication of a successive related internet transaction is sent to the entity that authorized the first mobile-related transaction and the successive related internet transaction is authorized or denied by said entity upon that authentication result.

Clause 28: According to one implementation what is provided is a method associated with the use of a mobile device that generates dynamic authentication credentials to be used for internet transactions and a transaction terminal that transmits at least part of the dynamic authentication credentials, the method comprising: generating by the mobile device a first dynamic authentication credential using as input data a user's Personal Identification Number (PIN) and generating by the mobile device one or more additional dynamic authentication credentials, each one calculated by the mobile device upon a different input data; and sending the first dynamic authentication credential, the one or more additional dynamic authentication credentials, and at least one identifier related to the user and to the authentication service the dynamic authentication credentials relates to, to the transaction terminal that transmits said first dynamic authentication credential, one or more of the one or more additional dynamic authentication credentials, and at least one of the identifiers received, to one or more servers of one or more providers of authentication services for internet transactions.

Clause 29: According to one implementation what is provided is a method according to clause 28 wherein the mobile device receives a PIN that is used as input data to calculate the first dynamic authentication credential.

Clause 30: According to one implementation what is provided is a method according to clause 28 wherein the PIN is stored in a memory of the mobile device and subsequently deleted from the memory after the conclusion of the first dynamic authentication credential generation.

Clause 31: According to one implementation what is provided is a method according to clause 28 wherein the PIN is a biometric-PIN that is stored in a memory associated to the mobile device, and the mobile device using it as input data to calculate the first dynamic authentication credential requires a previous successful verification by the mobile device of user's fingerprint data captured by the mobile device.

Clause 32: According to one implementation what is provided is a method according to clause 28 wherein the input data used to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

Clause 33: According to one implementation what is provided is a method according to clause 28 wherein the input data used to calculate an additional dynamic authentication credential, or a derivative of the input data, has been previously received by the mobile device from the one or more providers of authentication services and stored in a memory of the mobile device.

Clause 34: According to one implementation what is provided is a method according to clause 28 wherein an input data based derivative of a dynamic authentication credential calculated by the one or more providers of authentication services is received by the mobile device and stored in a memory, and the mobile device generates the dynamic authentication credential using the input data.

Clause 35: According to one implementation what is provided is a method according to clause 28 wherein the transaction terminal that transmits the first dynamic authentication credential, one or more of the one of more additional dynamic authentication credentials, and at least one of the identifiers received, is the mobile device that generates the dynamic authentication credentials.

Clause 36: According to one implementation what is provided is a method according to clause 28 wherein part of the one or more additional dynamic authentication credentials generated by the mobile device and sent by the mobile device to the transaction terminal are not transmitted by the transaction terminal to the one or more servers of the one or more providers of authentication services.

Clause 37: According to one implementation what is provided is a method according to clause 28 wherein a notification is received by the mobile device from the one or more providers of authentication services, the notification related to modifying the configuration of the mobile device to make an additional dynamic authentication credential being successfully authenticated in successive mobile-related internet transactions.

Clause 38: According to one implementation what is provided is a method according to clause 28 wherein the set of one or more additional dynamic authentication credentials generated by the mobile device, sent by the mobile device to the transaction terminal and at least partly transmitted by the transaction terminal to the one or more servers of one or more providers of authentication services in connection to a first mobile-related internet transaction associated to a first authentication service is different than the set of one or more additional dynamic authentication credentials generated by the mobile device, sent by the mobile device to the same or to another transaction terminal and at least partly transmitted by the transaction terminal to the one or more servers of one or more providers of authentication services in connection to a second mobile-related internet transaction associated to a second authentication service.

Clause 39: According to one implementation what is provided is a method according to clause 28 wherein the set of one or more additional dynamic authentication credentials generated in a first mobile device with a first personalization and/or configuration, sent by the mobile device to a transaction terminal and at least partly transmitted by the transaction terminal to the one or more servers of one or more providers of authentication services in connection to a first mobile-related internet transaction associated to a first authentication service is different than the set of one or more additional dynamic authentication credentials generated in a second mobile device with a second personalization and/or configuration, sent by the mobile device to a transaction terminal and at least partly transmitted by the transaction terminal to the one or more servers of one or more providers of authentication services in connection to a second mobile-related internet transaction associated to the first authentication service.

Clause 40: According to one implementation what is provided is a method according to clause 28 wherein a notification is received by the mobile device from the one or more providers of authentication services, the notification related to modifying the personalization and/or configuration of the mobile device for the mobile device to generate more additional dynamic authentication credentials associated to a given authentication service, each one calculated by the mobile device upon different input data, in successive mobile-related internet transactions.

Clause 41: According to one implementation what is provided is a non-transitory computer readable medium storing computer readable program code for causing a processor of a mobile device to perform a method associated with the use of a mobile device that generates dynamic authentication credentials to be used for internet transactions and a transaction terminal that transmits at least part of the dynamic authentication credentials, the method comprising: generating by the mobile device a first dynamic authentication credential using as input data a user's Personal Identification Number (PIN) and generating by the mobile device one or more additional dynamic authentication credentials, each one calculated by the mobile device upon a different input data; and sending the first dynamic authentication credential, the one or more additional dynamic authentication credentials, and at least one identifier related to the user and to the authentication service the dynamic authentication credentials relates to, to the transaction terminal that transmits said first dynamic authentication credential, one or more of the one or more additional dynamic authentication credentials, and at least one of the identifiers received, to one or more servers of one or more providers of authentication services for internet transactions.

Clause 42: According to one implementation what is provided is a non-transitory computer readable medium storing computer readable program code according to clause 41 that causes the mobile device using a received PIN as input data to calculate the first dynamic authentication credential.

Clause 43: According to one implementation what is provided is a non-transitory computer readable medium storing computer readable program code according to clause 41 that causes the PIN being stored in a memory of the mobile device and subsequently being deleted from the memory after the conclusion of the first dynamic authentication credential generation.

Clause 44: According to one implementation what is provided is a non-transitory computer readable medium storing computer readable program code according to clause 41 that causes the mobile device using a biometric-PIN stored in a memory associated to the mobile device as input data to calculate the first dynamic authentication credential upon a previous successful verification by the mobile device of user's fingerprint data captured by the mobile device.

Clause 45: According to one implementation what is provided is a non-transitory computer readable medium storing computer readable program code according to clause 41 that causes using one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number, as input data to calculate an additional dynamic authentication credential.

Clause 46: According to one implementation what is provided is a non-transitory computer readable medium storing computer readable program code according to clause 41 that causes calculating an additional dynamic authentication credential based on input data, or a derivative of the input data, that has been previously received by the mobile device from the one or more providers of authentication services and is stored in a memory of the mobile device.

Clause 47: According to one implementation what is provided is a non-transitory computer readable medium storing computer readable program code according to clause 41 that causes the mobile device generating a dynamic authentication credential using an input data and an input data based derivative of the dynamic authentication credential calculated by the one or more providers of authentication services, previously received by the mobile device and stored in a memory.

Clause 48: According to one implementation what is provided is a non-transitory computer readable medium storing computer readable program code according to clause 41 that causes that the set of one or more additional dynamic authentication credentials generated by the mobile device, sent by the mobile device to the transaction terminal and at least partly transmitted by the transaction terminal to the one or more servers of one or more providers of authentication services in connection to a first mobile-related internet transaction associated to a first authentication service is different than the set of one or more additional dynamic authentication credentials generated by the mobile device, sent by the mobile device to the same or to another transaction terminal and at least partly transmitted by the transaction terminal to the one or more servers of one or more providers of authentication services in connection to a second mobile-related internet transaction associated to a second authentication service.

Clause 49: According to one implementation what is provided is a non-transitory computer readable medium storing computer readable program code according to clause 41 that causes that the set of one or more additional dynamic authentication credentials generated in a first mobile device with a first personalization and/or configuration, sent by the mobile device to a transaction terminal and at least partly transmitted by the transaction terminal to the one or more servers of one or more providers of authentication services in connection to a first mobile-related internet transaction associated to a first authentication service is different than the set of one or more additional dynamic authentication credentials generated in a second mobile device with a second personalization and/or configuration, sent by the mobile device to a transaction terminal and at least partly transmitted by the transaction terminal to the one or more servers of one or more providers of authentication services in connection to a second mobile-related internet transaction associated to the first authentication service.

Clause 50: According to one implementation what is provided is a mobile device capable to generate dynamic authentication credentials to be used for internet transactions and a transaction terminal that transmits at least part of the dynamic authentication credentials, the mobile device comprising: (i) an electronic storage medium that stores input data; and (ii) a processor adapted to: generate a first dynamic authentication credential using as input data a user's Personal Identification Number (PIN) and to generate one or more additional dynamic authentication credentials, each one calculated upon a different input data, and the processor further adapted to send the first dynamic authentication credential, the one or more additional dynamic authentication credentials, and at least one identifier related to the user and to the authentication service the dynamic authentication credentials relates to, to the transaction terminal that transmits said first dynamic authentication credential, one or more of the one or more additional dynamic authentication credentials, and at least one of the identifiers received, to one or more servers of one or more providers of authentication services for internet transactions.

Clause 51: According to one implementation what is provided is a mobile device according to clause 50 wherein the processor is adapted to receive a PIN that is used as input data to calculate the first dynamic authentication credential.

Clause 52: According to one implementation what is provided is a mobile device according to clause 50 wherein a PIN is stored in a memory of the mobile device and subsequently deleted from the memory by the processor after the conclusion of the first dynamic authentication credential generation.

Clause 53: According to one implementation what is provided is a mobile device according to clause 50 wherein the input data used by the processor to calculate an additional dynamic authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

Clause 54: According to one implementation what is provided is a mobile device according to clause 50 wherein the input data used by the processor to calculate an additional dynamic authentication credential, or a derivative of the input data, has been previously received by the mobile device from the one or more providers of authentication services and stored in a memory of the mobile device.

Clause 55: According to one implementation what is provided is a mobile device according to clause 50 wherein an input data based derivative of a dynamic authentication credential calculated by the one or more providers of authentication services is received by the mobile device and stored in a memory, and the processor generates the dynamic authentication credential using the input data.

What is claimed is:

1. A method associated with one or more providers of authentication services for internet transactions in connection with use of a mobile device having an active generator that generates at transaction time dynamic non-mobile-device-pre-stored authentication credentials calculated by the mobile device upon a different input data, and a transaction terminal that transmits at least part of the dynamic non-mobile-device-pre-stored authentication credentials, the method comprising:

electronically storing in one or more server memories data capable of linking the mobile device to one or more authentication services for internet transactions, the data including authentication parameters associated to server dynamic authentication rules of dynamic credentials and one or more identifiers related to a user and the one or more authentication services, the server dynamic authentication rules indicating for each related dynamic non-mobile-device-pre-stored authentication credential whether success in its authentication is mandatory or optional to obtain a successful result of an authentication of a mobile-related internet transaction, receiving from the transaction terminal a first dynamic non-mobile-device-pre-stored authentication credential generated by the mobile device at the time of a first transaction using in the context of the first transaction as input data a user's Personal Identification Number (PIN), one or more additional dynamic non-mobile-device-pre-stored authentication credentials, each one calculated by the mobile device at the time of the first transaction upon a different input data related to the context of the first transaction, and at least one identifier related to the user and to the authentication service the dynamic non-mobile-device-pre-stored authentication credentials refers to, wherein neither an additional dynamic non-mobile-device-pre-stored authentication credential nor the input data used to calculate it are respectively within a predetermined tolerance of the first dynamic non-mobile-device-pre-stored authentication credential or the user's PIN, authenticating the first dynamic non-mobile-device-pre-stored authentication credential and, based on the server dynamic authentication rules and associated authentication parameters, further authenticating one or more of the one or more additional dynamic non-mobile-device-pre-stored authentication credentials and generating an authentication result of the first mobile-related internet transaction by one or more processing devices having access to at least a portion of the data, wherein the authentication of each authenticated dynamic non-mobile-device-pre-stored authentication credential is used to validate the corresponding input data, and sending, to one or more service providers that authorize or deny the first mobile-related internet transaction based upon that authentication result, the result of the authentication of the first mobile-related internet transaction, related to the authentication of the first dynamic non-mobile-device-pre-stored authentication credential and the one or more of the one or more additional dynamic non-mobile-device-pre-stored authentication credentials, where the first mobile-related internet transaction being authorized requires a successful result of the authentication of one or more of the authenticated dynamic non-mobile-device-pre-stored authentication credentials, depending on the server dynamic authentication rules and associated authentication parameters, the one or more of the authenticated dynamic non-mobile-device-pre-stored authentication credentials always comprising the first dynamic non-mobile-device-pre-stored authentication credential.

2. A method according to claim 1, wherein the dynamic authentication rules and related authentication parameters associated to the least one identifier related to the user and to the authentication service the dynamic non-mobile-device-pre-stored authentication credentials relates to, comprises at least one authentication parameter associated to the first dynamic non-mobile-device-pre-stored authentication credential.

3. A method according to claim 1, wherein the dynamic authentication rules and related authentication parameters associated to the least one identifier related to the user and to the authentication service the dynamic non-mobile-device-pre-stored authentication credentials relates to, comprises at least one authentication parameter associated to at least one additional dynamic non-mobile-device-pre-stored authentication credential.

4. A method according to claim 1, wherein the dynamic authentication rules and related authentication parameters associated to the least one identifier related to the user and to the authentication service the dynamic non-mobile-device-pre-stored authentication credentials relates to, comprises at least one authentication parameter associated to each additional dynamic non-mobile-device-pre-stored authentication credential.

5. A method according to claim 1, wherein the data stored in the one or more memories related to a first authentication service is stored in a first memory or set of memories of a first provider of authentication services for mobile-related internet transactions and the data stored in the one or more memories related to a second authentication service is stored in a second memory or set of memories of a second provider of authentication services for mobile-related internet transactions.

6. A method according to claim 1, wherein the one or more processing devices include a first processing device associated with a first provider of authentication services for mobile-related internet transactions and a second processing device associated with a second provider of authentication services for mobile-related internet transactions.

7. A method according to claim 1, wherein the one or more memories and the one or more processing devices reside in one or more servers of the one or more providers of authentication services for mobile-related internet transactions.

8. A method according to claim 1, wherein an entity authorizing or denying the first mobile-related internet transaction is a same entity as one of the one or more providers of authentication services.

9. A method according to claim 1, wherein the PIN is inserted by the user in the mobile device for the mobile device calculating the first dynamic non-mobile-device-pre-stored authentication credential.

10. A method according to claim 1, wherein the PIN is a biometric-PIN that is stored in a memory associated to the mobile device, and the mobile device using it as input data to calculate the first dynamic non-mobile-device-pre-stored authentication credential requires a previous successful verification by the mobile device of user's fingerprint data captured by the mobile device.

11. A method according to claim 1, wherein the input data used to calculate an additional dynamic non-mobile-device-pre-stored authentication credential is one of, or a derivative of one of, a transaction amount or a transaction related value, a time stamp, a device ID, geographic coordinates, a hard-coded key, a token, a wireless device ID, an identifier associated to an aggrupation of one or more wireless devices, an MSISDN, an email, an IBAN or an account number.

12. A method according to claim 1, wherein the input data used to calculate an additional dynamic non-mobile-device-pre-stored authentication credential, or a derivative of the input data, is made available for a limited period of time and has been previously sent by the one or more providers of authentication services and received by the mobile device for storage.

13. A method according to claim 1, wherein an input data based derivative of a dynamic non-mobile-device-pre-stored authentication credential that is made available for a limited period of time has been calculated by the one or more providers of authentication services and it is sent to the mobile device, and the mobile device generates the dynamic non-mobile-device-pre-stored authentication credential using the input data.

14. A method according to claim 1, wherein the transaction terminal that transmits the dynamic non-mobile-device-pre-stored authentication credentials is the mobile device that generates the dynamic non-mobile-device-pre-stored authentication credentials.

15. A method according to claim 1, wherein part of the one or more additional dynamic non-mobile-device-pre-stored authentication credentials generated by the mobile device are not received from the transaction terminal, and the result of the authentication of the first mobile-related internet transaction is based upon the result of the authentication of the first dynamic non-mobile-device-pre-stored authentication credential and, according to the dynamic authentication rules and associated authentication parameters, the result of the authentication of at least part of the one or more additional dynamic non-mobile-device-pre-stored authentication credentials received.

16. A method according to claim 1, wherein in connection to a first mobile-related internet transaction associated to a given authentication service none of the one or more additional dynamic non-mobile-device-pre-stored authentication credentials generated by the mobile device are received from the transaction terminal, and in connection to a second mobile-related internet transaction associated to said authentication service the one or more additional dynamic non-mobile-device-pre-stored authentication credentials generated by the mobile device are received from the same or another transaction terminal, and the authentication parameters and dynamic authentication rules permit that the result of the authentication of the first mobile-related internet transaction being based upon the result of the authentication of the first dynamic non-mobile-device-pre-stored authentication credential, while the result of the authentication of the second mobile-related internet transaction being based upon the result of the authentication of the first dynamic non-mobile-device-pre-stored authentication credential and one or more of the one or more additional dynamic non-mobile-device-pre-stored authentication credentials.

17. A method according to claim 1, wherein some mobile-related internet transactions associated to a given authentication service are authorized or denied based on the result of authenticating a first set of mobile device generated dynamic non-mobile-device-pre-stored authentication credentials while other mobile-related internet transactions associated to the same authentication service are authorized or denied based on the result of authenticating a different set of mobile device generated dynamic non-mobile-device-pre-stored authentication credentials, depending on the authentication parameters and the associated dynamic authentication rules, and also depending on the additional dynamic non-mobile-device-pre-stored authentication credentials received.

18. A method according to claim 1, wherein the first mobile-related internet transaction is authorized even when the authentication of the one or more additional dynamic non-mobile-device-pre-stored authentication credentials received results in one or more authentication failures, and a notification is sent to the user's mobile device.

19. A method according to claim 1, wherein a first set of one or more additional dynamic non-mobile-device-pre-stored authentication credentials received from a transaction terminal in connection to a first mobile-related internet transaction associated to a first authentication service is different than a second set of one or more additional dynamic non-mobile-device-pre-stored authentication credentials received from the same or from another transaction terminal in connection to a second mobile-related internet transaction associated to a second authentication service, and the one or more providers of authentication services authenticate one or more additional dynamic non-mobile-device-pre-stored authentication credentials of the first set based upon dynamic authentication rules and related authentication parameters associated to the first authentication service and authenticate one or more additional dynamic non-mobile-device-pre-stored authentication credentials of the second set based upon dynamic authentication rules and related authentication parameters associated to the second authentication service.

20. A method according to claim 1, wherein a first set of one or more additional dynamic non-mobile-device-pre-stored authentication credentials, generated in a first mobile device with a first personalization and/or configuration and received from a transaction terminal in connection to a first mobile-related internet transaction associated to a first authentication service is different than a second set of one or more additional dynamic non-mobile-device-pre-stored authentication credentials, generated in a second mobile device with a second personalization and/or configuration and received from a transaction terminal in connection to a second mobile-related internet transaction associated to the first authentication service, and the one or more providers of authentication services authenticate in connection to the first mobile-related internet transaction one or more additional dynamic non-mobile-device-pre-stored authentication credentials of the first set based upon dynamic authentication rules associated to the first mobile device personalization and/or configuration for the first authentication service and authenticate in connection to the second mobile-related internet transaction one or more additional dynamic non-mobile-device-pre-stored authentication credentials of the second set based upon dynamic authentication rules associated to the second mobile device personalization and/or configuration for the first authentication service.

21. A method according to claim 1, wherein some mobile-related internet transactions associated to a given authentication service and to a first mobile device are authorized or denied based on a result of authenticating a first set of mobile device generated dynamic non-mobile-device-pre-stored authentication credentials while other mobile-related internet transactions associated to the same authentication service and to a second mobile device are authorized or denied based on a result of authenticating a different set of mobile device generated dynamic non-mobile-device-pre-stored authentication credentials, depending on the authentication parameters and the associated dynamic authentication rules, and also depending on a personalization and/or configuration of the first and second mobile device respectively.

22. A method according to claim 1, wherein the one or more providers of authentication services for internet transactions sends a notification to the user's mobile device to inform that more additional dynamic non-mobile-device-pre-stored authentication credentials associated to a given authentication service are to be generated by the mobile device, the notification related to modifying a personalization and/or configuration of the mobile device for the mobile device to generate said more additional dynamic non-mobile-device-pre-stored authentication credentials, each one calculated by the mobile device upon different input data, in successive mobile-related internet transactions.

23. A method according to claim 1, wherein the authorization or denial of the first mobile-related internet transaction relates to a first part of the mobile-related internet transaction and completion of the authorization or denial of the first mobile-related internet transaction requires further processing by other one or more entities acquiring the first mobile-related internet transaction.

24. A method according to claim 1, wherein part of the authentication of the first mobile-related internet transaction is performed by a first provider of authentication services and another part of the authentication of the first mobile-related internet transaction is performed by a second provider of authentication services.

\* \* \* \* \*